United States Patent
Nakagami

(10) Patent No.: US 10,674,145 B2
(45) Date of Patent: Jun. 2, 2020

(54) IMAGE ENCODING DEVICE AND METHOD, AND IMAGE DECODING DEVICE AND METHOD

(71) Applicant: SONY CORPORATION, Tokyo (JP)

(72) Inventor: Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 112 days.

(21) Appl. No.: 15/315,563

(22) PCT Filed: Jun. 5, 2015

(86) PCT No.: PCT/JP2015/066289
§ 371 (c)(1),
(2) Date: Dec. 1, 2016

(87) PCT Pub. No.: WO2015/194394
PCT Pub. Date: Dec. 23, 2015

(65) Prior Publication Data
US 2017/0118466 A1    Apr. 27, 2017

(30) Foreign Application Priority Data
Jun. 20, 2014   (JP) .................. 2014-127683

(51) Int. Cl.
*H04N 19/105*        (2014.01)
*H04N 19/134*        (2014.01)
(Continued)

(52) U.S. Cl.
CPC ......... *H04N 19/105* (2014.11); *H04N 19/134* (2014.11); *H04N 19/174* (2014.11);
(Continued)

(58) Field of Classification Search
None
See application file for complete search history.

(56) References Cited

U.S. PATENT DOCUMENTS

| 2009/0074053 A1 | 3/2009 | Narasimhan et al. |
| 2013/0107952 A1* | 5/2013 | Coban .......... H04N 19/105 375/240.12 |

(Continued)

FOREIGN PATENT DOCUMENTS

| CN | 102687510 A | 9/2012 |
| JP | 2011-517227 A | 5/2011 |

(Continued)

OTHER PUBLICATIONS

Li et al., "On Intra BC Mode," Joint Collaborative Team on Video Coding (JCT-VC) of ITU-T SG 16 WP 3 and ISO/IEC JTC 1/SC 29/WG 11, 15th Meeting, Geneva, CH, Oct. 23-Nov. 1, 2013, pp. 2-13. (Year: 2013).*

(Continued)

*Primary Examiner* — Christopher Braniff
(74) *Attorney, Agent, or Firm* — Chip Law Group

(57) ABSTRACT

The present disclosure relates to an image encoding device and a method, and an image decoding device and a method that are designed to improve encoding efficiency in IntraBC. In an example according to the present technology, a screen is divided into four slices (Slices #0 through #3). In a case where reference to a different slice is prohibited, the range that can be referred to from the current CTU in Slice #2 is only the decoded portion in Slice #2, and therefore, any block in Slice #1 cannot be referred to, for example. In the case of the present technology, on the other hand, decoded different slices (Slice #0 and Slice #1) are included in the referable range, and accordingly, a block in Slice #1 can be referred to from the current CTU in Slice #2, for example, as shown in FIG. 5. The present disclosure can be applied to image processing devices, for example.

13 Claims, 43 Drawing Sheets

(51) Int. Cl.
*H04N 19/174* (2014.01)
*H04N 19/593* (2014.01)
*H04N 19/51* (2014.01)
*H04N 19/70* (2014.01)

(52) U.S. Cl.
CPC .......... *H04N 19/51* (2014.11); *H04N 19/593* (2014.11); *H04N 19/70* (2014.11)

(56) References Cited

U.S. PATENT DOCUMENTS

| | | | | |
|---|---|---|---|---|
| 2015/0023409 | A1* | 1/2015 | Schierl | H04N 19/70 375/240.02 |
| 2015/0195526 | A1* | 7/2015 | Zhu | H04N 19/105 375/240.14 |

FOREIGN PATENT DOCUMENTS

| | | | |
|---|---|---|---|
| JP | 2011-217082 | A | 10/2011 |
| JP | 2012-028863 | A | 2/2012 |
| WO | 2013/065673 | A1 | 5/2013 |
| WO | 2013/109382 | A2 | 7/2013 |
| WO | 2013/153226 | A2 | 10/2013 |

OTHER PUBLICATIONS

Li et al., "On Intra BC mode", Joint Collaborative Team on Video Coding (JCT-VC) of ITU-T SG 16 WP 3 and ISO/IEC JTC 1/SC 29/WG 11, 15th Meeting, Geneva, CH, Oct. 23-Nov. 1, 2013, pp. 1-12.

Hattori et al., "HLS: Extensions to Motion-constrained tile sets SEI message", Joint Collaborative Team on Video Coding (JCT-VC) of ITU-T SG 16 WP 3 and ISO/IEC JTC 1/SC 29/WG 11, 14th Meeting, Vienna, Austria, AT, Jul. 29-Aug. 2, 2013, pp. 1-4.

Pang et al.,"Intra Block Copy With Larger Search Region" Joint Collaborative Team on Video Coding (JCT-VC) of ITU-T SG 16 WP 3 and ISO/IEC JTC 1/SC 29/WG 11, 17th Meeting, Valencia, ES, Mar. 27-Apr. 4, 2014, pp. 1-6.

Chuang et al., "CE2-related: IntraBC constraint for multiple slices", Joint Collaborative Team on Video Coding (JCT-VC) ITU-T SG 16 WP 3 and ISO/IEC JTC 1/SC 29/WG 11, 20th Meeting, Geneva, CH, Feb. 10-18, 2015, pp. 1-5.

Flynn et al., "High Efficiency Video Coding (HEVC) Range Extensions text specification: Draft 4", Joint Collaborative Team on Video Coding (JCT-VC) of ITU-T SG 16 WP 3 and ISO/IEC JTC 1/SC 29/WG 11,13th Meeting, Incheon, KR, Apr. 18-26, 2013, pp. 01-311.

Extended European Search Report of EP Patent Application No. 15808945.8, dated Oct. 17, 2017, 11 pages.

Li, et al., "On Intra BC Mode", Joint Collaborative Team on Video Coding (JCT-VC) of ITU-T SG 16 WP 3 and ISO/IEC JTC 1/SC 29/WG 11, Oct. 23-Nov. 1, 2013, 12 pages.

Office Action for CN Patent Application No. 201580031473.0, dated Dec. 3, 2018, 11 pages of Office Action and 08 pages of English Translation.

Bin, et al., "On Intra BC Mode", Joint Collaborative Team on Video Coding (JCT-VC) of ITU-T SG16 WP3 and ISO/IEC JTC1/SC29/WG11, 15 meeting, Geneva, JCTVC-O0183, Oct. 23- Nov. 1, 2013 12 pages.

Office Action for JP Patent Application No. 2016-529237, dated Apr. 16, 2019, 07 pages of Office Action and 05 pages of English Translation.

Pang, et al., "Non-RCE3: Intra Motion Compensation With 2-D MVs", Joint Collaborative Team on Video Coding (JCT-VC) of ITU-T SG16 WP3 and ISO/IEC JTC1/SC29/WG11, 14 Meeting, Vienna, JCTVC-N0256, Jul. 25-Aug. 2, 2013, 13 pages.

Li, et al., "On Intra BC Mode", Joint Collaborative Team on Video Coding (JCT-VC) of ITU-T SG16 WP3 and ISO/IEC JTC1/SC29/WG11, 15 Meeting, Geneva, JCTVC-O0183_r1, Oct. 23-Nov. 1, 2013, pp. 1-13.

Yu, et al., "New Intra Prediction Using Intra-Macroblock Motion Compensation", Joint Video Team (JVT) of ISO/IEC MPEG & ITU-T VCEG (ISO/IEC JTC1/SC29/ WG11 and ITU-T SG16 Q.6), 3 Meeting, Fairfex, Virginia, JVT-C151, May 6-10, 2002, 04 pages.

Hattori, et al., "HLS: Extensions to Motion-Constrained Tile Sets SEI Message", Joint Collaborative Team on Video Coding (JCT-VC) of ITU-T SG16 WP3 and ISO/IEC JTC1/SC29/WG11, 14 Meeting, Vienna, Jul. 29-Aug. 2, 2013, JCTVC-N0117, pp. 1-5.

Office Action for CN Patent Application No. 2015800314730, dated Apr. 28, 2019, 11 pages of Office Action and 07 pages of English Translation.

* cited by examiner

FIG. 3

- sps_crossslice_intraBC_enable_flag equal to 1 indicates that intraBC_rev_prev_slice_flag may have the value equal to 1 in the CVS.

- intraBC_ref_prev_slice_flag equal to 1 indicates that a prediction unit which coding mode is IntraBC (=predModeIntraBc is equal to 1) in the current slice may refer the previously decoded slice data which proceed the current slice in the decoding order in the current picture. intraBC_ref_prev_slice_flag equal to 0 indicates that a prediction unit which coding mode is IntraBC shall not refer the previously decoded slice data. When not present, the value of intraBC_ref_prev_slice_flag is inferred to 0.

- intraBC_ref_prev_slice_num indicates one or more slice segment that may be referred by a prediction unit which coding mode is IntraBC in the current slice. The set of slice segment is derived as follows.

Let C be the order of the slice in the current picture (e.g. 0 for the 1st slice). And A is calculated as follows.

A = (C - intraBC_ref_prev_slice_num) < 0 ? 0 : (C - intraBC_ref_prev_slice_num)

Then, the X-th slice segment, where X is in the range of A to C, is the target slice segment indicated by the syntax.

FIG. 4

| video_parameter_set_rbsp( ) { | Descriptor |
|---|---|
| for( i=0; i< max_layer_num; i++) | |
|   vps_crossslice_intraBC_enable_flag[i] | u(1) |

FIG. 10

| | WHERE REFERENCE TO DIFFERENT SLICE IS PROHIBITED | PRESENT TECHNOLOGY |
|---|---|---|
| INDEPENDENT DECODING BETWEEN SLICES | ○ | × (BECAUSE IntraBC CANNOT BE PERFORMED UNLESS DESIGNATED SLICE IS COMPLETELY DECODED) |
| ENCODING PERFORMANCE | × (BECAUSE IntraBC CANNOT REFER TO PAST SLICES) | ○ |

FIG. 12

NOTE – When intraBC_ref_prev_slice_flag is equal to 1, intra block copy process may need the decoding dependency among the tiles. It is encouraged for encoders to set intraBC_ref_prev_slice_flag equal to 0 in the tiles which is selected by a temporal motion-constrained tile set.

IMAGE ENCODING DEVICE AND METHOD, AND IMAGE DECODING DEVICE AND METHOD

CROSS REFERENCE TO RELATED APPLICATIONS

This application is a U.S. National Phase of International Patent Application No. PCT/JP2015/066289 filed on Jun. 5, 2015, which claims priority benefit of Japanese Patent Application No. JP 2014-127683 filed in the Japan Patent Office on Jun. 20, 2014. Each of the above-referenced applications is hereby incorporated herein by reference in its entirety.

TECHNICAL FIELD

The present disclosure relates to image encoding devices and methods, and image decoding devices and methods. More particularly, the present disclosure relates to an image encoding device and a method, and an image decoding device and a method that can improve encoding efficiency in IntraBC.

BACKGROUND ART

In recent years, apparatuses that compress images by implementing an encoding method for compressing image information through orthogonal transform such as discrete cosine transform and motion compensation by using redundancy inherent to image information, have been spreading so as to handle image information as digital information and achieve high-efficiency information transmission and accumulation in doing do. This encoding method may be Moving Picture Experts Group (MPEG), H.264, MPEG-4 Part 10 (Advanced Video Coding, which will be hereinafter referred to as AVC), or the like.

At present, to achieve higher encoding efficiency than that of H.264/AVC, a coding method called High Efficiency Video Coding (HEVC) is being developed as a standard by JCTVC (Joint Collaboration Team-Video Coding), which is a joint standards organization of ITU-T and ISO/IEC.

Also, in HEVC, range extensions (HEVC Range Extensions) are being considered so as to support high-end formats, such as images in chrominance signal formats like 4:2:2 and 4:4:4, and profiles for screen content (see Non-Patent Document 1, for example).

Meanwhile, IntraBlockCopy (IntraBC) is an encoding tool for performing motion compensation in a screen. IntraBC is known as a tool that contributes to improvement of efficiency in encoding an artificial image, such as a computer screen or a CG image.

However, IntraBC is not used as a technology for the above described HEVC Range Extensions, and is being considered as a standardized technology for screen content coding (SCC) extensions.

CITATION LIST

Non-Patent Document

Non-Patent Document 1: David Flynn, Joel Sole, and Teruhiko Suzuki, "High Efficiency Video Coding (HEVC), Range Extension text specification: Draft 4", JCTVC-N1005_v1, 2013.8.8

SUMMARY OF THE INVENTION

Problems to be Solved by the Invention

Here, low delays are the key in SCC applications. Therefore, in an HEVC scheme, it is necessary to use slice dividing.

However, in cases where a screen is divided into slices, the improvement of encoding efficiency in IntraBC becomes dramatically smaller. This is because IntraBC cannot refer to any data other than the current slice.

The present disclosure is made in view of those circumstances, and is to improve encoding efficiency in IntraBC.

Solutions to Problems

An image encoding device of one aspect of the present disclosure includes: a setting unit that sets control information for controlling in-screen motion prediction across slices; an encoding unit that encodes an image to generate a bitstream in accordance with the control information set by the setting unit; and a transmission unit that transmits the control information set by the setting unit and the bitstream generated by the encoding unit.

The setting unit may set a reference permission flag as the control information, the reference permission flag indicating a permission for reference to a result of decoding of the current slice and the slice before the current slice in the raster scan order.

The setting unit may set the reference permission flag in a picture parameter set (PPS).

The setting unit may set a parameter as the control information, the parameter indicating the number of previous slices having referable decoding results.

The setting unit may set an on/off flag as the control information, the on/off flag indicating whether the in-screen motion prediction across the slices can be performed.

The setting unit may set the on/off flag in a sequence parameter set (SPS) or a video parameter set (VPS).

When wavefront parallel processing (WPP) is "on", the setting unit may limit a range of the reference, and set the reference permission flag.

When tile dividing is "on", the setting unit may set the reference permission flag.

When temporal motion constrained tile set SEI (MCTS-SEI) is "on", the setting unit may set the reference permission flag to "off".

An image encoding method of one aspect of the present disclosure is implemented by an image encoding device, and includes: setting control information for controlling in-screen motion prediction across slices; encoding an image to generate a bitstream in accordance with the set control information; and transmitting the set control information and the generated bitstream.

An image decoding device of another aspect of the present disclosure includes: a reception unit that receives a bitstream generated by encoding an image; an extraction unit that extracts control information from the bitstream received by the reception unit, the control information being designed for controlling in-screen motion prediction across slices; and a decoding unit that decodes the bitstream received by the reception unit to generate an image, using the control information extracted by the extraction unit.

The extraction unit may extract a reference permission flag as the control information, the reference permission flag indicating a permission for reference to a result of decoding of the current slice and the slice before the current slice in the raster scan order.

The extraction unit may extract the reference permission flag from a picture parameter set (PPS).

The extraction unit may extract a parameter as the control information, the parameter indicating the number of previous slices having referable decoding results.

The extraction unit may extract an on/off flag as the control information, the on/off flag indicating whether the in-screen motion prediction across the slices can be performed.

The extraction unit may extract the on/off flag from a sequence parameter set (SPS) or a video parameter set (VPS).

When wavefront parallel processing (WPP) is "on", the extraction unit may limit a range of the reference, and extract the reference permission flag.

When tile dividing is "on", the extraction unit may extract the reference permission flag.

When temporal motion constrained tile set SEI (MCTS-SEI) is "on", the extraction unit may extract the reference permission flag set to "off".

An image decoding method of another aspect of the present disclosure is implemented by an image decoding device, and includes: receiving a bitstream generated by encoding an image; extracting control information from the received bitstream, the control information being designed for controlling in-screen motion prediction across slices; and decoding the received bitstream to generate an image, using the extracted control information.

In one aspect of the present disclosure, control information for controlling in-screen motion prediction across slices is set, and an image is encoded in accordance with the set control information, to generate a bitstream. The set control information and the generated bitstream are then transmitted.

In another aspect of the present disclosure, a bitstream generated by encoding an image is received, and control information for controlling in-screen motion prediction across slices is extracted from the received bitstream. The received bitstream is then decoded with the use of the extracted control information, and an image is generated.

It should be noted that the above described image encoding device and image decoding device may be independent image processing devices, or may be internal blocks forming an image encoding device and an image decoding device.

Effects of the Invention

According to one aspect of the present disclosure, images can be encoded. Particularly, encoding efficiency in IntraBC can be improved.

According to another aspect of the present disclosure, images can be decoded. Particularly, encoding efficiency in IntraBC can be improved.

It should be noted that the effects of the present technology are not limited to the effects described herein, and may include any of the effects described in the present disclosure.

BRIEF DESCRIPTION OF DRAWINGS

FIG. 3 is a table showing an example of semantics according to the present technology.

FIG. 4 is a table showing an example syntax of a VPS.

FIG. 10 is a table for explaining advantageous effects.

FIG. 12 is a table showing an example of NOTE to be added to the semantics of an MCTS-SEI message.

MODES FOR CARRYING OUT THE INVENTION

The following is a description of modes for carrying out the present disclosure (hereinafter referred to as the embodiments). It should be noted that explanation will be made in the following order.

0. Outline
1. First Embodiment (Encoding Device and Decoding Device)
2. Second Embodiment (Computer)
3. Third Embodiment (Multi-View Image Encoding Device and Multi-View Image Decoding Device)
4. Fourth Embodiment (Hierarchical Image Encoding Device and Hierarchical Image Decoding Device)
5. Fifth Embodiment (Television Apparatus)
6. Sixth Embodiment (Portable Telephone Apparatus)
7. Seventh Embodiment (Recording/Reproducing Apparatus)
8. Eighth Embodiment (Imaging Apparatus)
9. Example Applications of Scalable Encoding
10. Other Examples of Embodiments <Outline>
(Encoding Method)

The present technology is described below in conjunction with an example case where High Efficiency Video Coding (HEVC) is applied to image encoding and decoding.

<Explanation of Encoding Unit>

Figure 1:
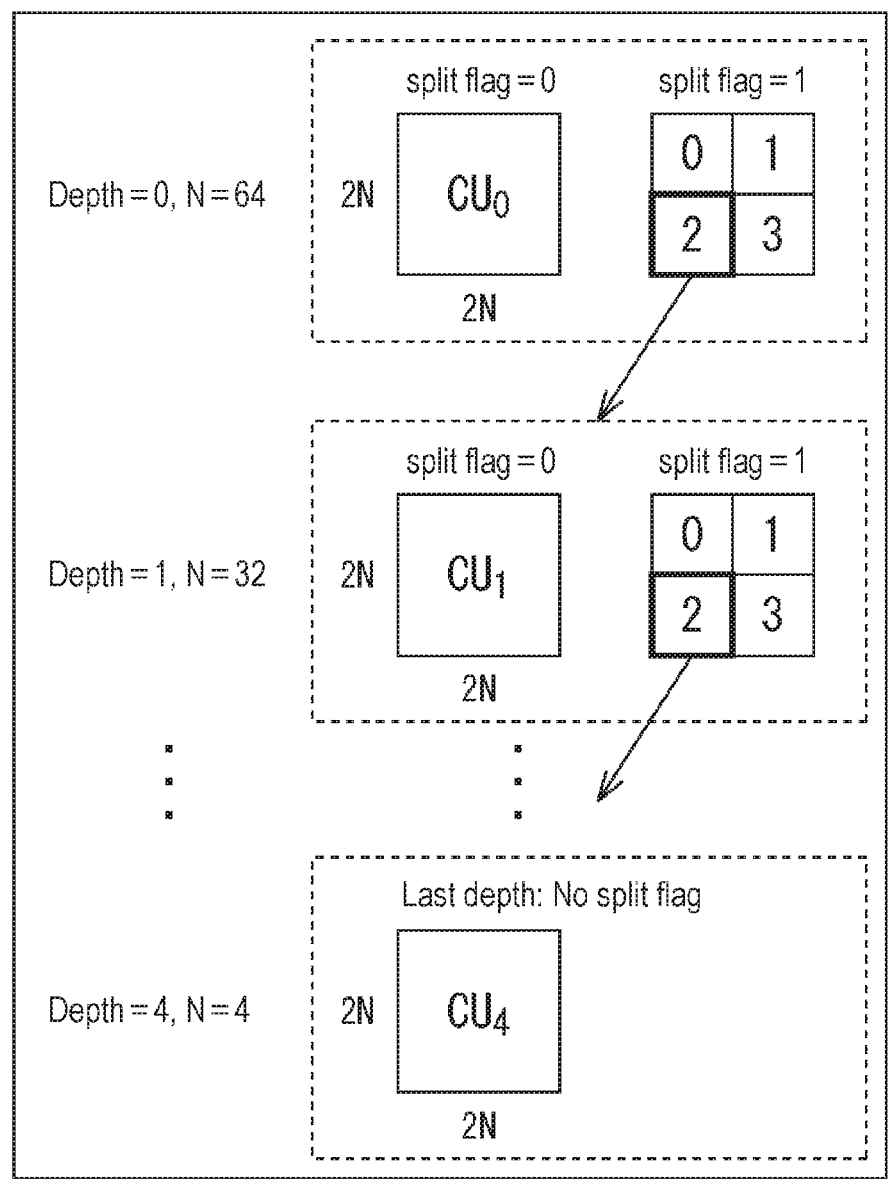
FIG. 1 is a diagram for explaining example structures of coding units.

FIG. 1 is a diagram for explaining coding units (CUs) that are encoding units in HEVC.

In HEVC, images with large image frames, such as 4000×2000 pixels ultra high definition (UHD) images, are to be processed, and therefore, fixing the encoding unit size to 16×16 pixels is not an optimal manner. In view of this, CUs are defined as encoding units in HEVC.

A CU plays a role similar to that of a macroblock in AVC. Specifically, a CU is divided into PUs, or is divided into TUs.

It should be noted that the size of a CU is equal to a square represented by power-of-two pixels that vary with sequences. Specifically, a CU is set by dividing an LCU as a CU of the largest size in half in the horizontal direction and the vertical direction an appropriate number of times so that the CU will not become smaller than a smallest coding unit (SCU) as a CU of the smallest size. That is, the size of a CU is the size at a hierarchical level when an LCU is hierarchized until SCUs are obtained so that the size at an upper hierarchical level is ¼ of the size of a CU at one level lower than the upper hierarchical level.

For example, in FIG. 1, the size of an LCU is 128, and the size of an SCU is 8. Accordingly, the hierarchical depth (Depth) of an LCU is 0 through 4, and the number of hierarchical depth levels is 5. That is, the number of divisions corresponding to CUs is one of 0 through 4.

It should be noted that information designating the sizes of an LCU and an SCU is included in an SPS. Also, the number of divisions corresponding to CUs is designated with "split_flag" indicating whether to further divide the CU at each hierarchical level. CUs are specifically described in Non-Patent Document 1.

The size of a TU can be designated with "split_transform_flag", as with "split_flag" for a CUs. The maximum numbers of divisions of TUs in an inter prediction and an intra prediction are designated as "max_transform_hierarchy_depth_inter" and "max_transform_hierarchy_depth_intra", respectively, in the SPS.

In addition, in this specification, a coding tree unit (CTU) is a unit that includes the coding tree block (CTB) of an LCU and the parameters for processing on the LCU basis (level). Further, the CUs constituting the CTU are units including coding blocks (CBs) and the parameters for processing on the CU basis (level).

(Mode Selection)

Meanwhile, to achieve higher encoding efficiency with AVC and HEVC coding methods, it is critical to select an appropriate prediction mode.

Methods implemented in reference software of H.264/MPEG-4 AVC, called Joint Model (JM) (available at http://iphome.hhi.de/suehring/tml/index.htm), can be used as examples of such selection methods.

In JM, the two mode determination methods described below, High Complexity Mode and Low Complexity Mode, can be selected. By either of the methods, a cost function value as to each prediction mode Mode is calculated, and the prediction mode that minimizes the cost function value is selected as the optimum mode for the block or macroblock.

A cost function in High Complexity Mode is expressed as in the following expression (1).

$$\text{Cost}(\text{Mode} \in \Omega) = D + \lambda * R \qquad (1)$$

Here, Ω represents the universal set of candidate modes for encoding the block or macroblock, and D represents the difference energy between a decoded image and an input image when encoding is performed in the current prediction mode. λ represents the Lagrange's undetermined multiplier provided as a quantization parameter function. R represents the total bit rate in a case where encoding is performed in the current mode, including the orthogonal transform coefficient.

That is, to perform encoding in High Complexity Mode, a provisional encoding process needs to be performed in all the candidate modes to calculate the above parameters D and R, and therefore, a larger amount of calculation is required.

A cost function in Low Complexity Mode is expressed as in the following expression (2).

$$\text{Cost}(\text{Mode} \in \Omega) = D + \text{QP2Quant}(\text{QP}) * \text{HeaderBit} \quad (2)$$

Here, D differs from that in High Complexity Mode, and represents the difference energy between a predicted image and an input image. QP2Quant(QP) represents a function of a quantization parameter QP, and HeaderBit represents the bit rate related to information that excludes the orthogonal transform coefficient and belongs to Header, such as motion vectors and the mode.

That is, in Low Complexity Mode, a prediction process needs to be performed for each of the candidate modes, but a decoded image is not required. Therefore, there is no need to perform an encoding process. Accordingly, the amount of calculation is smaller than that in High Complexity Mode.

(IntraBC)

IntraBlockCopy (IntraBC) is an encoding tool for performing motion compensation in a screen. IntraBC is known as a tool that contributes to improvement of efficiency in encoding an artificial image, such as a computer screen or a CG image.

However, IntraBC is not used as a technology for the above described HEVC Range Extensions, and is being considered as a standardized technology for screen content coding (SCC) extensions.

In the case of IntraBC, only a vector value is transmitted. Therefore, when a screen is divided into slices, the relationship between the current block and the other slices is not made clear. In the case of temporal prediction, on the other hand, the relationship between the current block and the reference frame is made apparent by a combination of a reference list and an index as well as a vector value.

A restriction is imposed so that the vector value becomes a value based on the data in the current slice. In this manner, reference to any slice other than the current slice is prohibited without exception.

For the above reason, the effects of IntraBC become smaller, and encoding efficiency becomes poorer in a case where a screen is divided into slices to achieve low-delay transmission.

In view of the above, the present technology suggests transmission of intra_BC_ref_prev_slice_flag, which is a reference permission flag for making it clear that IntraBC refers to a result of decoding of a previous slice. When the value of intra_BC_ref_prev_slice_flag is 0 (default value), IntraBC can refer only to the current slice. When the value of intra_BC_ref_prev_slice_flag is 1, IntraBC can refer not only to the current slice but also to a block in a previous slice. It should be noted that this flag indicates the relationship between slices, and therefore, is appropriately set in a picture parameter set (PPS).

Also, in Derivation 1 of the present technology, how many previous slices can be referred to when intraBC_ref_prev_slice_flag is 1 is made clear by a parameter called intraBC_ref_prev_slice_num in the PPS, for example.

For example, when intraBC_ref_prev_slice_num is 5, and the current slice number is 10, it is possible to refer to the images with slice numbers 5 through 10. For example, if the current slice number is smaller than 5, it is possible to refer to the images of slice 0 through the current slice. Further, to save the bit rate, "intraBC_ref_prev_slice_num=0" can indicate all the previous slices.

Further, in Derivation 2 of the present technology, sps_crossslice_intraBC_enable_flag, which is an on/off flag for controlling switching on and off of the tool for IntraBC to refer to a result of decoding of a previous slice, is added to the sequence parameter set (SPS). Only when sps_crossslice_intraBC_enable_flag is true, is parsing performed on intraBC_ref_prev_slice_flag. It should be noted that this flag for controlling the switching on and off of the tool may not be added to the SPS, but may be added to a video parameter set (VPS).

(Example Syntaxes of the SPS and the PPS)

Figure 2:
FIG. 2 is a table showing example syntaxes of an SPS and a PPS.

FIG. 2 is a table showing example syntaxes of the SPS and the PPS. In the examples in FIG. 2, the syntax of the PPS is shown below the syntax of the SPS.

In the SPS, intra_block_copy_enabled_flag, which is the flag indicating that IntraBC is to be performed, is written, and sps_crossslice_intraBC_enable_flag, which is the on/off flag described above as Derivation 2 of the present technology, is added under intra_block_copy_enabled_flag. Only when sps_crossslice_intraBC_enable_flag is true, is parsing performed on sps_crossslice_intraBC_enable_flag.

In the PPS, intra_BC_ref_prev_slice_flag, which is the reference permission flag described above as the present technology, is added. Only when sps_crossslice_intraBC_enable_flag, which is the on/off flag added to the SPS, is true, is parsing performed on the intra_BC_ref_prev_slice_flag. In addition, under intra_BC_ref_prev_slice_flag, intraBC_ref_prev_slice_num, which is the parameter described above as Derivation 1 of the present technology, is added. Only when intra_BC_ref_prev_slice_flag is true, is parsing performed on intraBC_ref_prev_slice_num.

It should be noted that the information for controlling IntraBC (in-screen motion prediction across slices), such as the flags and the parameter described above, will be hereinafter referred to collectively as IntraBC control information. Also, the intra prediction mode using the IntraBC control information will be hereinafter referred to as the IntraBC mode.

(Example of Semantics)

FIG. 3 is a table showing an example of semantics according to the present technology. In the example in FIG. 3, sps_crossslice_intraBC_enable_flag, intraBC_ref_prev_slice_flag, and intraBC_ref_prev_slice_num are defined as follows.

sps_crossslice_intraBC_enable_flag equal to 1 indicates that intraBC_rev_prev_slice_flag may have the value equal to 1 in the CVS.

intraBC_ref_prev_slice_flag equal to 1 indicates that a prediction unit which coding mode is IntraBC (=predModeIntraBc is equal to 1) in the current slice may refer the previously decoded slice data which proceed the current slice in the decoding order in the current picture. intraBC_ref_prev_slice_flag equal to 0 indicates that a prediction unit which coding mode is IntraBC shall not refer the previously decoded slice data. When not present, the value of intraBC_ref_prev_slice_flag is inferred to 0.

intraBC_ref_prev_slice_num indicates one or more slice segment that may be referred by a prediction unit which coding mode is IntraBC in the current slice. The set of slice segment is derived as follows.

Let C be the order of the slice in the current picture (e.g. 0 for the 1$^{st}$ slice). And A is calculated as follows.

$$A = (C - \text{intraBC\_ref\_prev\_slice\_num}) < 0. \ 0 : (C - \text{intraBC\_ref\_prev\_slice\_num})$$

Then, the X-th slice segment, where X is in the range of A to C, is the target slice segment indicated by the syntax.

(Example Syntax of the VPS)

FIG. 4 is a table showing an example syntax of the VPS. In the VPS shown in FIG. 4, sps_crossslice_intraBC_enable_flag in the SPS shown in FIG. 2 is written as vps_crossslice_intraBC_enable_flag.

DETAILED DESCRIPTION

Figure 5:
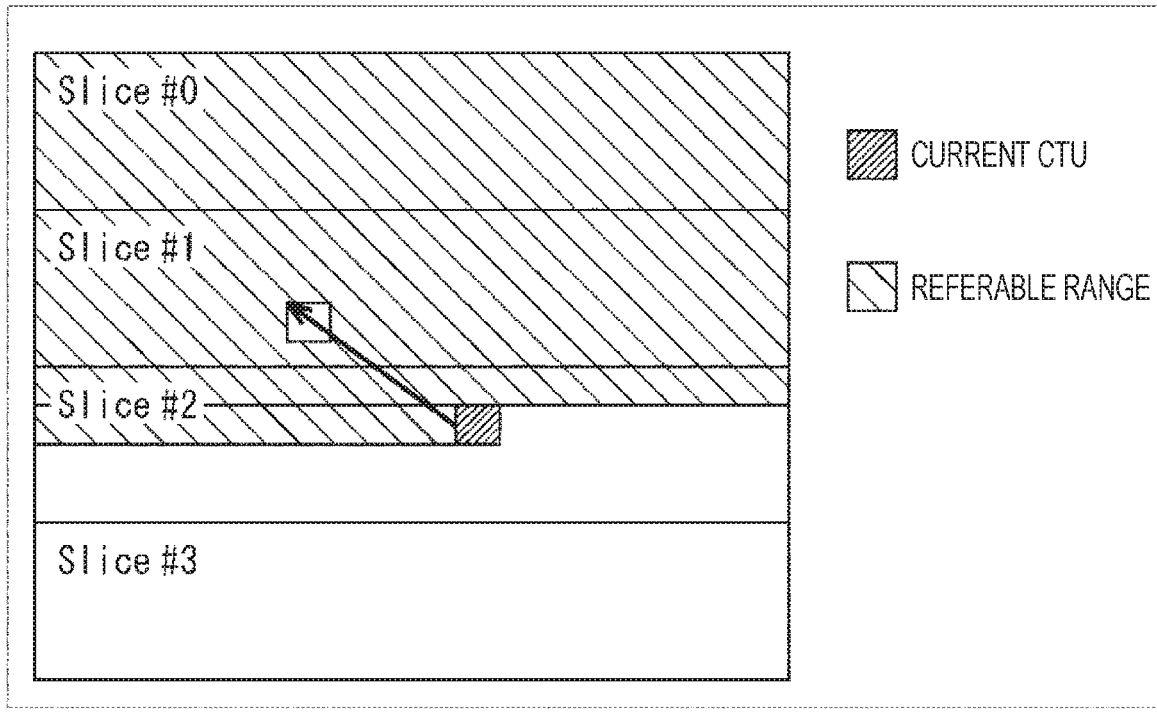
FIG. 5 is a diagram showing an example where a screen is divided into four slices according to the present technology.

FIG. 5 is a diagram showing an example where a screen is divided into four slices (Slices #0 through #3) according to the present technology.

In a case where reference to a different slice is prohibited, the range that can be referred to from the current CTU in Slice #2 is only the decoded portion in Slice #2, and therefore, any block in Slice #1 cannot be referred to, for example.

In the case of the present technology, on the other hand, decoded different slices (Slice #0 and Slice #1) are included in the referable range, and accordingly, a block in Slice #1 can be referred to from the current CTU in Slice #2, for example, as shown in FIG. 5.

Figure 6:
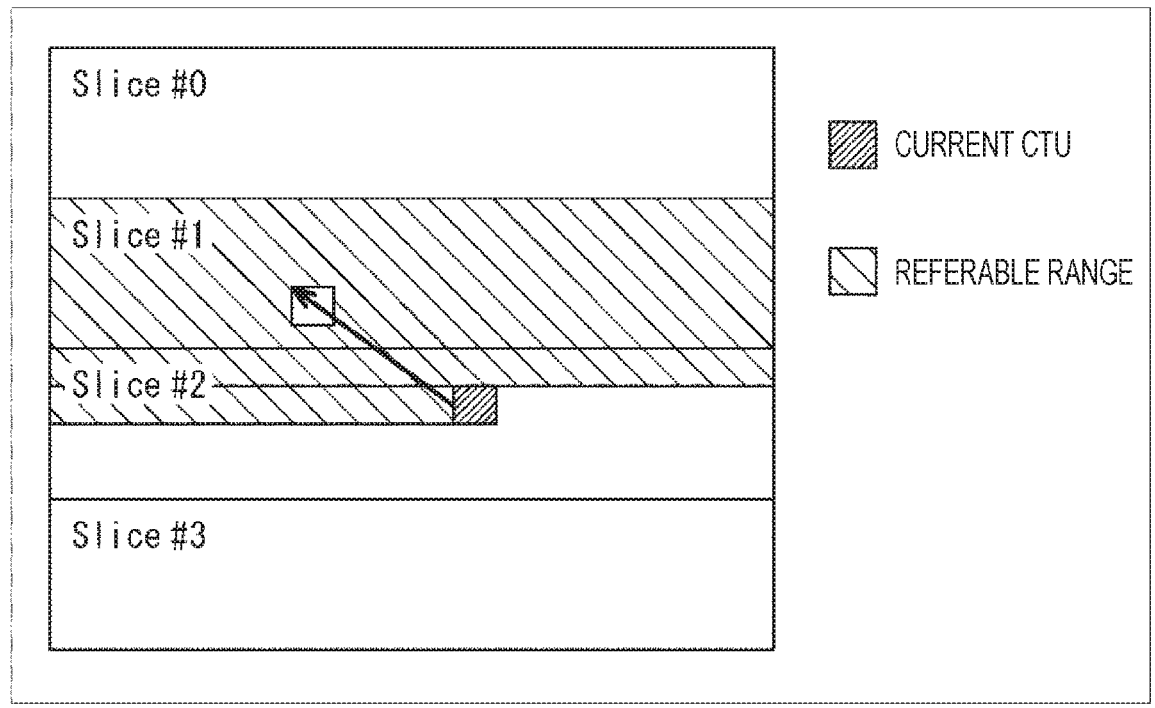
FIG. 6 is a diagram showing a case where intraBC_ref_prev_slice_num is 1.

FIG. 6 is a diagram showing a case where intraBC_ref_prev_slice_num is 1 in the example shown in FIG. 5.

Since intraBC_ref_prev_slice_num is 1, Slice #1, which is one slice before the current slice, can be referred to from the current CTU in Slice #2, as shown in FIG. 6. It is not possible to refer to Slice #0. Thus, any block in Slice #1 can be referred to from the current CTU in Slice #2 in the example case shown in FIG. 6.

(Combination with WPP)

Figure 7:
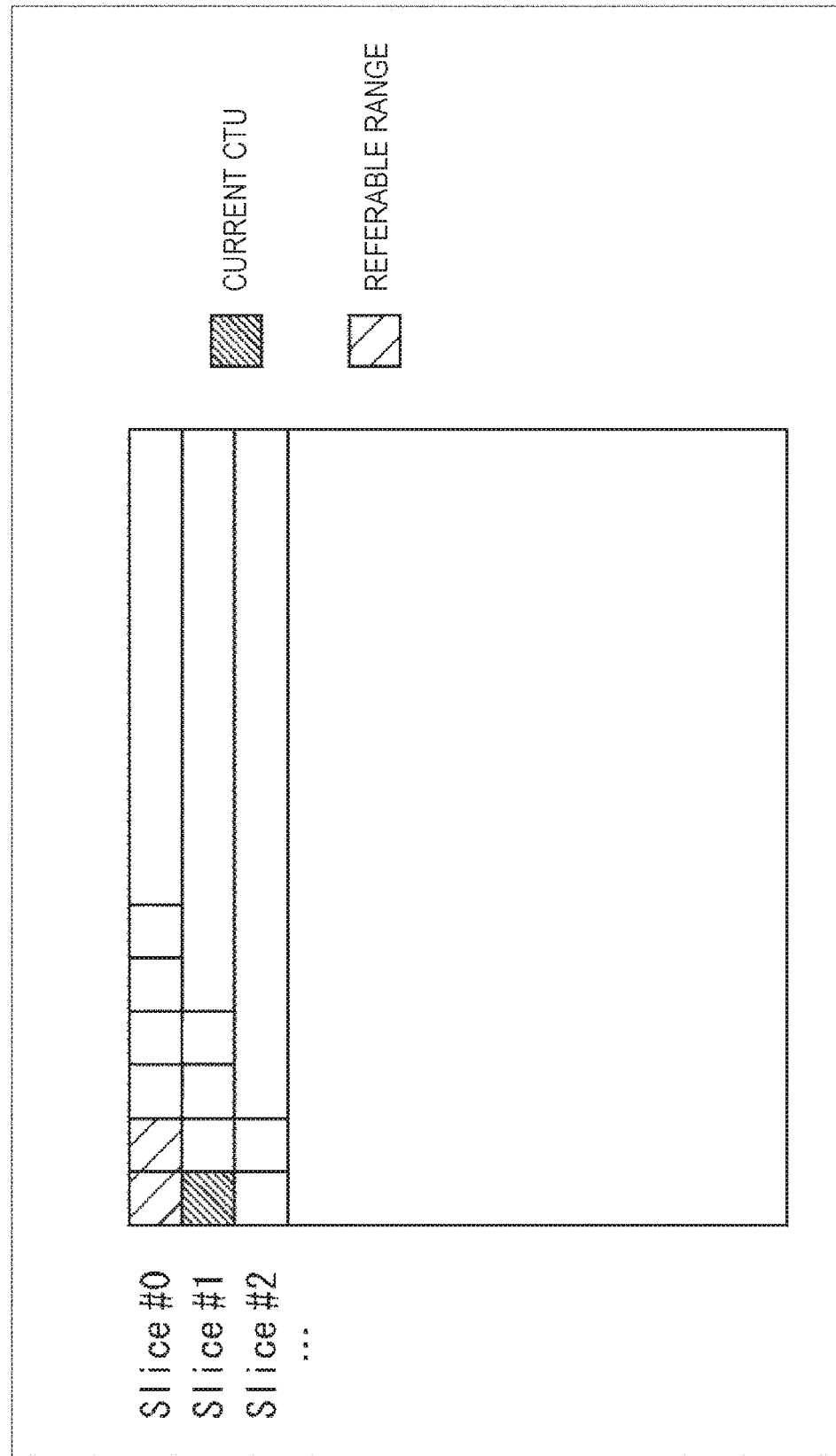
FIG. 7 is a diagram for explaining a combination of the present technology and WPP.
Figure 8:
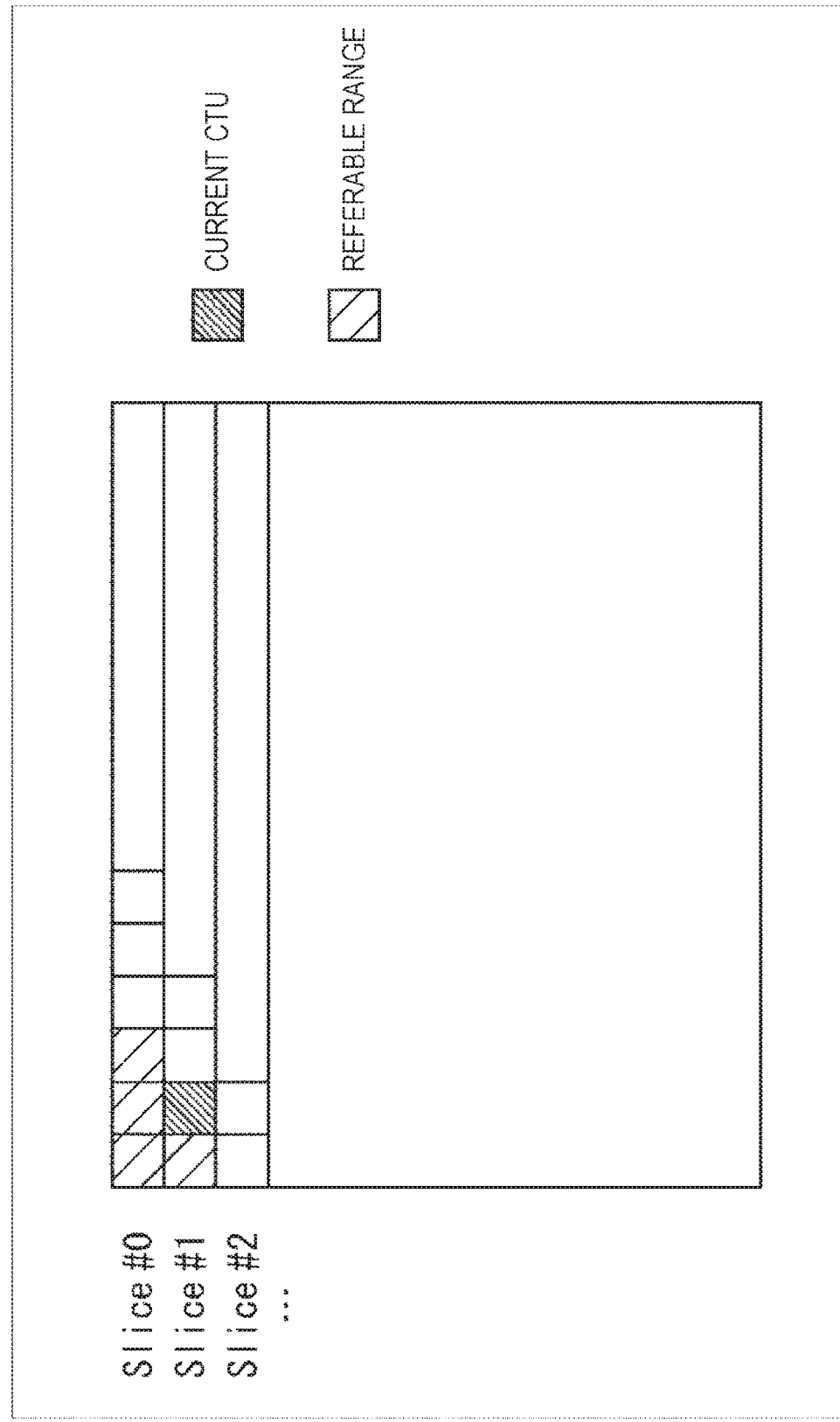
FIG. 8 is a diagram for explaining a combination of the present technology and WPP.

FIGS. 7 and 8 are diagrams for explaining a combination of the present technology and wavefront parallel processing (WPP).

WPP is the processing that is performed when entropy_coding_sync_enabled_flag in the PPS is 1. There are two methods for performing WPP. The first one is a method of multi-slice encoding, with one slice being one CTU column. The second one is an encoding method using entry_poit_offset, with one slice being one picture. Since the above described present technology can be applied in the case of the second method, the first method is described below.

When the WPP function is on, one slice is one CTU column. Therefore, if reference to a different slice is prohibited, only the adjacent CTU on the left side is the referable range from the current CTU, and only the adjacent CTU on the left side can be referred to.

According to the present technology, on the other hand, when the WPP function is on, the reference range is limited not to entire Slice #0 but to CTUs up to the CTU located on the upper right side of the current CTU. This is because there is a decoding time lag equivalent to 2 CTUs between CTU columns, due to the design of WPP.

That is, when the leftmost CTU in Slice #1 is the current CTU, as shown in FIG. 7, the CTU that is located in Slice #0 and immediately above the current CTU, and the CTU that is located in Slice #0 and on the upper right side of the current CTU form the referable range.

Also, when the second CTU from left in Slice #1 is the current CTU, the CTU that is located in Slice #0 and on the upper left side of the current CTU, the CTU that is located in Slice #0 and immediately above the current CTU, the CTU that is located in Slice #0 and on the upper right side of the current CTU, and the adjacent CTU on the left side of the current CTU in Slice #1 form the referable range, as shown in FIG. 8.

In this manner, the present technology and WPP can be combined.

(Combination with Tile Dividing)

Figure 9:
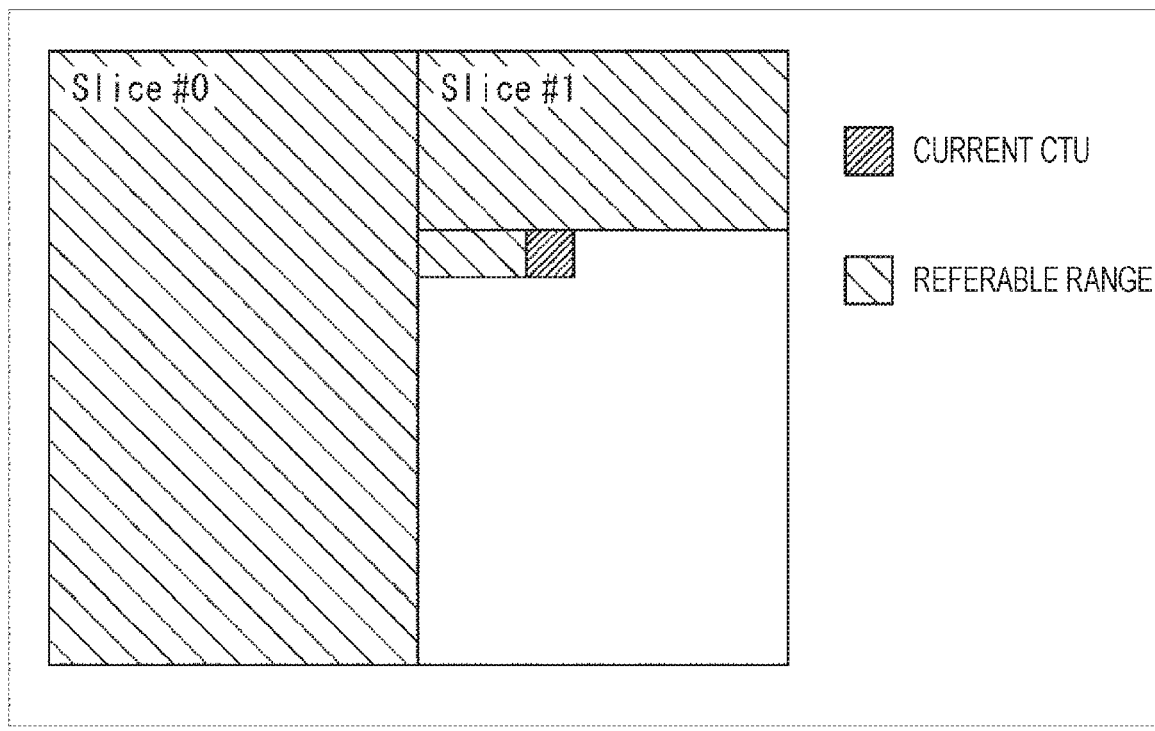
FIG. 9 is a diagram for explaining a combination of the present technology and tile dividing.

FIG. 9 is a diagram for explaining a combination of the present technology and tile dividing.

Tile dividing is the processing to be performed when tiles_enabled_frag in the PPS is 1. Tiles are specified as tools for parallel processing in HEVC. A tile is a dividing unit of a picture. The row size and the column size of each tile are designated on the LCU basis in the SPS or the PPS in the image compression information.

The LCUs included in each tile are processed in the raster scan order, and the tiles included in each picture are processed in the raster scan order. A slice may also include tiles, and a slice boundary may exist in a tile.

In a case where a screen is vertically divided into two portions, or is tile-divided into Slice #0 and Slice #1, for example, if reference to a different slice is prohibited, the range that can be referred to from the current CTU is only the tiles in Slice #1.

According to the present technology, on the other hand, intra_BC_ref_prev_slice_flag as the reference permission flag is set to 1, so that decoded difference slices can be referred to. Accordingly, in a case where the tile dividing function is on, reference to Slice #0, which includes different tiles and is a different slice from the current CTU in Slice #1, is permitted, as shown in FIG. 9.

Advantageous Effects

FIG. 10 is a table for explaining advantageous effects.

In a case where reference to a different slice is prohibited, independent decoding between slices can be performed. In the case of the present technology, on the other hand, IntraBC cannot be performed unless a designated slice is completely decoded. Therefore, independent decoding between slices is not possible.

In a case where reference to a different slice is prohibited, IntraBC cannot refer to the previous slices, and therefore, encoding efficiency becomes poorer. According to the present technology, on the other hand, IntraBC can refer to the previous slices, and thus, encoding efficiency is improved.

(Combination with MCTS-SEI)

Figure 11:
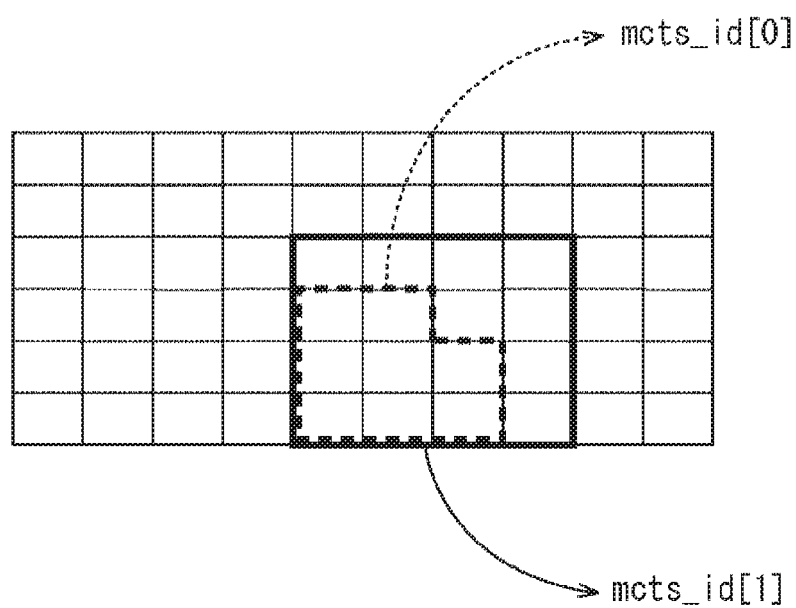
FIG. 11 is a diagram for explaining a combination of the present technology and MCTS-SEI.

FIG. 11 is a diagram for explaining a combination of the present technology and temporal motion constrained tile set SEI (MCTS-SEI).

MCTS-SEI is SEI employed in the draft (JCTVC-Q1008_V2) of SHVC. With the use of MCTS-SEI, only the data in designated tiles can be extracted from a bitstream, so that the designated tiles can be independently decoded. It should be noted that, without this SEI, it is not possible to independently decode only some of the tiles in a screen.

In the example shown in FIG. 11, a picture is divided into 10×6 tiles. The tiles mcts_id[0] in the region indicated by a thick frame are part of the picture, but only these tiles can be extracted and decoded (such decoding will be hereinafter referred to as independent decoding).

Likewise, the tiles mcts_id[1] in the frame drawn with a dashed line can also be independently decoded. MCTS-SEI can designate tile sets in complicated regions like mcts_id[0] and mcts_id[1] shown in FIG. 11.

Therefore, in a slice in a tile set designated by MCTS-SEI, intraBC_ref_prev_slice_flag needs to be set to 0.

This is because reference to a tile/slice other than the current one is prohibited.

FIG. 12 is a table showing an example of NOTE to be added to the semantics of an MCTS-SEI message.

To combine the present technology and MCTS-SEI, NOTE shown in FIG. 12 is added to the semantics of an MCTS-SEI message according to JCTVC-Q1008_V2.

NOTE—When intraBC_ref_prev_slice_flag is equal to 1, intra block copy process may need the decoding dependency among the tiles. It is encouraged for encoders to set intraBC_ref_prev_slice_flag equal to 0 in the tiles which is selected by a temporal motion-constrained tile set.

Next, example applications of the above described present technology to specific devices are described.

First Embodiment (Example Configuration of an Embodiment of an Encoding Device)

Figure 13:
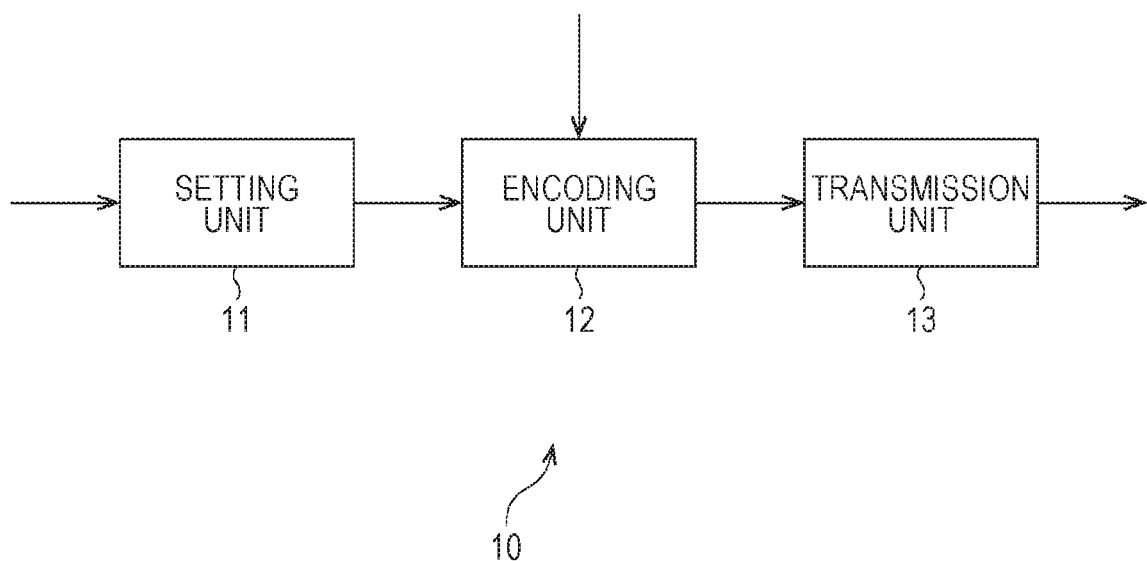
FIG. 13 is a block diagram showing an example configuration of a first embodiment of an encoding device to which the present technology is applied.

FIG. 13 is a block diagram showing an example configuration of an embodiment of an encoding device to which the present disclosure is applied.

The encoding device 10 shown in FIG. 13 includes a setting unit 11, an encoding unit 12, and a transmission unit 13, and encodes images by a method compliant with HEVC.

Specifically, the setting unit 11 of the encoding device 10 sets a VPS, an SPS, a PPS, VUI, SEI, and the like. Particularly, the setting unit 11 sets IntraBC control information in an SPS and a PPS. The setting unit 11 supplies the encoding unit 12 with parameter sets, such as the VPS, the SPS, the PPS, the VUI, and the SEI, which have been set.

A frame-based image is input to the encoding unit 12. By referring to the parameter sets supplied from the setting unit 11, the encoding unit 12 encodes the input image by a method compliant with HEVC. Particularly, in accordance with the IntraBC control information in the SPS and the PPS supplied from the setting unit 11, the encoding unit 12 performs a prediction process in the IntraBC mode to which the present technology is applied, and makes an intra prediction. The encoding unit 12 generates an encoded stream from the encoded data obtained as a result of the encoding and from the parameter sets, and supplies the encoded stream to the transmission unit 13.

The transmission unit 13 transmits the encoded stream supplied from the encoding unit 12 to a decoding device that will be described later.

(Example Configuration of the Encoding Unit)

Figure 14:
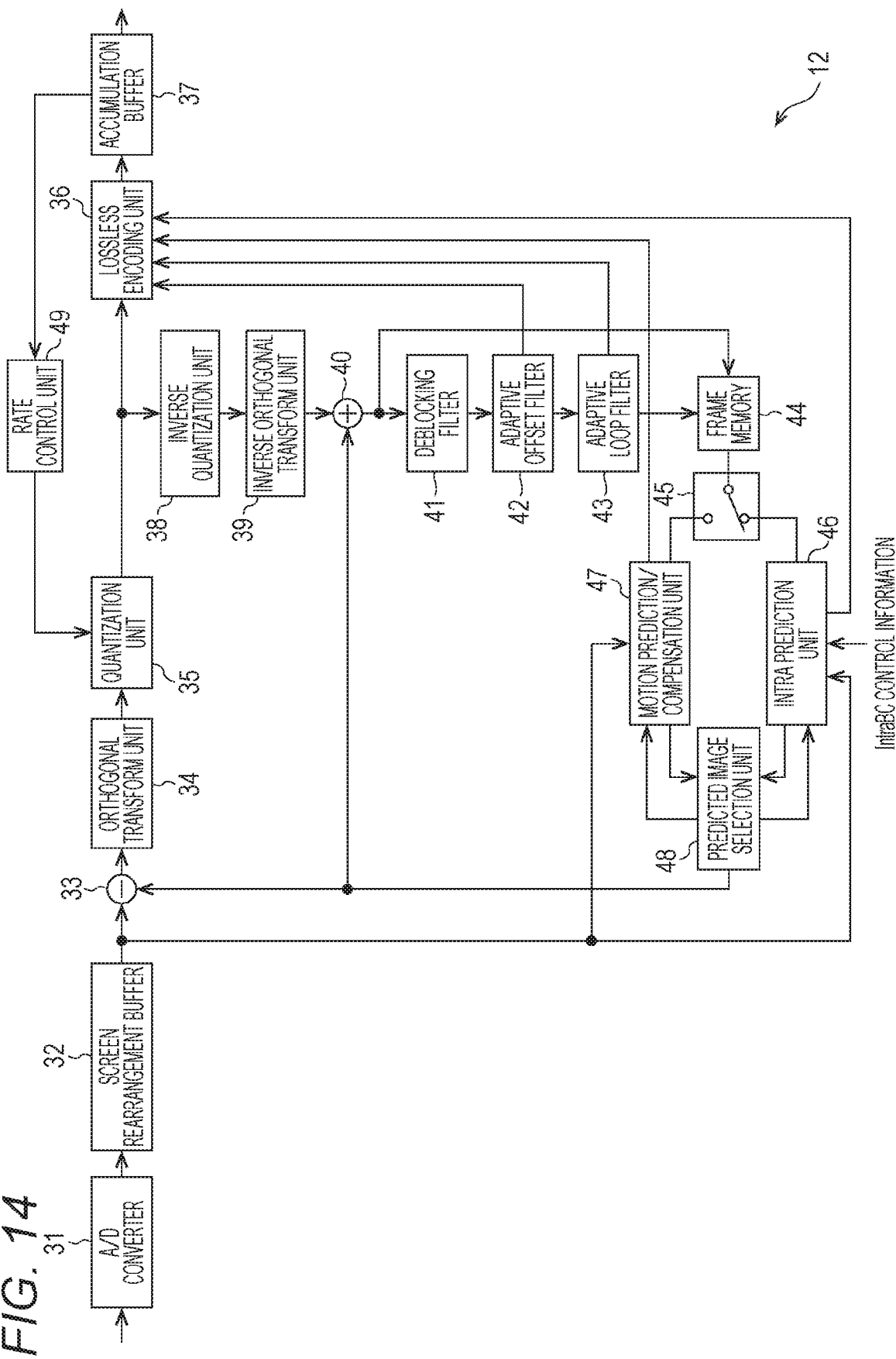
FIG. 14 is a block diagram showing an example configuration of the encoding unit shown in FIG. 13.

FIG. 14 is a block diagram showing an example configuration of the encoding unit 12 shown in FIG. 13.

The encoding unit 12 shown in FIG. 14 includes an A/D converter 31, a screen rearrangement buffer 32, an arithmetic operation unit 33, an orthogonal transform unit 34, a quantization unit 35, a lossless encoding unit 36, an accumulation buffer 37, an inverse quantization unit 38, an inverse orthogonal transform unit 39, and an addition unit 40. The encoding unit 12 also includes a deblocking filter 41, an adaptive offset filter 42, an adaptive loop filter 43, a frame memory 44, a switch 45, an intra prediction unit 46, a motion prediction/compensation unit 47, a predicted image selection unit 48, and a rate control unit 49.

The A/D converter 31 of the encoding unit 12 performs A/D conversion on a frame-based image that is input as the current object to be encoded. The A/D converter 31 outputs an image that is a converted digital signal to the screen rearrangement buffer 32, and stores the image into the screen rearrangement buffer 32.

The screen rearrangement buffer 32 rearranges the frames of the image stored in displaying order, so that the frames of the image are arranged in encoding order in accordance with the GOP structure. The screen rearrangement buffer 32 supplies the rearranged image to the arithmetic operation unit 33, the intra prediction unit 46, and the motion prediction/compensation unit 47.

The arithmetic operation unit 33 performs encoding by subtracting a predicted image supplied from the predicted image selection unit 48 from the image supplied from the screen rearrangement buffer 32. The arithmetic operation unit 33 outputs the resultant image as residual error information (a difference) to the orthogonal transform unit 34. It should be noted that when any predicted image is not supplied from the predicted image selection unit 48, the arithmetic operation unit 33 outputs the image read from the screen rearrangement buffer 32 as residual error information to the orthogonal transform unit 34.

The orthogonal transform unit 34 performs an orthogonal transform process on the residual error information supplied from the arithmetic operation unit 33 for each TU. The orthogonal transform unit 34 supplies an orthogonal transform result to the quantization unit 35 after the orthogonal transform process.

The quantization unit 35 quantizes the orthogonal transform result supplied from the orthogonal transform unit 34. The quantization unit 35 supplies the quantized value obtained as a result of the quantization to the lossless encoding unit 36.

The lossless encoding unit 36 acquires, from the intra prediction unit 46, information indicating the optimum intra prediction mode (the information will be hereinafter referred to as the intra prediction mode information). The lossless encoding unit 36 also acquires, from the motion prediction/compensation unit 47, information indicating the optimum inter prediction mode (the information will be hereinafter referred to as the inter prediction mode information), a motion vector, information for identifying a reference image, and the like.

The lossless encoding unit 36 also acquires offset filter information about an offset filter from the adaptive offset filter 42, and acquires a filter coefficient from the adaptive loop filter 43.

The lossless encoding unit 36 performs lossless encoding, such as variable-length encoding (context-adaptive variable length coding (CAVLC), for example) or arithmetic encoding (context-adaptive binary arithmetic coding (CABAC), for example), on the quantized value supplied from the quantization unit 35.

The lossless encoding unit 36 also performs lossless encoding on encoding information related to encoding, which is the intra prediction mode information and an IntraBC vector only in the case of the IntraBC mode, or the inter prediction mode information, the motion vector, the information for identifying the reference image, the offset filter information, and the filter coefficient. The lossless encoding unit 36 supplies the accumulation buffer 37 with the encoding information and the quantized value subjected to the lossless encoding as encoded data to be stored.

It should be noted that the encoding information subjected to the lossless encoding may be header information (a slice header, for example) about the quantized value subjected to the lossless encoding.

The accumulation buffer 37 temporarily stores the encoded data supplied from the lossless encoding unit 36. The accumulation buffer 37 also supplies the stored encoded data, together with the parameter sets supplied from the setting unit 11 shown in FIG. 13, as an encoded stream to the transmission unit 13.

The quantized value that is output from the quantization unit 35 is also input to the inverse quantization unit 38. The inverse quantization unit 38 inversely quantizes the quantized value. The inverse quantization unit 38 supplies the orthogonal transform result obtained as a result of the inverse quantization to the inverse orthogonal transform unit 39.

The inverse orthogonal transform unit 39 performs an inverse orthogonal transform process on the orthogonal transform result supplied from the inverse quantization unit 38 for each TU. The inverse orthogonal transform is performed by inverse discrete cosine transform (IDCT) or inverse discrete sine transform (IDST), for example. The inverse orthogonal transform unit 39 supplies the residual error information obtained as a result of the inverse orthogonal transform process to the addition unit 40.

The addition unit 40 adds the residual error information supplied from the inverse orthogonal transform unit 39 to the predicted image supplied from the predicted image selection unit 48, to perform decoding. The addition unit 40 supplies the decoded image to the deblocking filter 41 and the frame memory 44.

The deblocking filter 41 performs an adaptive deblocking filtering process on the decoded image supplied from the addition unit 40, to remove block distortion. The resultant image is supplied to the adaptive offset filter 42.

The adaptive offset filter 42 performs an adaptive offset filtering (sample adaptive offset (SAO)) process on the image subjected to the adaptive deblocking filtering process by the deblocking filter 41, mainly to remove ringing.

Specifically, the adaptive offset filter 42 determines a type of an adaptive offset filtering process for each largest coding unit (LCU) as the largest unit of encoding, and calculates the offset to be used in the adaptive offset filtering process. Using the calculated offset, the adaptive offset filter 42 performs the adaptive offset filtering process of the determined type on the image subjected to the adaptive deblocking filtering process.

The adaptive offset filter 42 supplies the adaptive loop filter 43 with the image subjected to the adaptive offset filtering process. The adaptive offset filter 42 also supplies the lossless encoding unit 36 with the offset filter information, which is information indicating the type of the performed adaptive offset filtering process and the offset.

The adaptive loop filter 43 is formed with a two-dimensional Wiener filter, for example. For each LCU, for example, the adaptive loop filter 43 performs an adaptive loop filtering (ALF) process on the image that is supplied from the adaptive offset filter 42 and has been subjected to the adaptive offset filtering process.

Specifically, for each LCU, the adaptive loop filter 43 calculates the filter coefficient to be used in the adaptive loop filtering process, so as to minimize the residual error between the original image that is the image output from the screen rearrangement buffer 32 and the image subjected to the adaptive loop filtering process. Then, using the calculated filter coefficient, the adaptive loop filter 43 performs, for each LCU, the adaptive loop filtering process on the image subjected to the adaptive offset filtering process.

The adaptive loop filter 43 supplies the frame memory 44 with the image subjected to the adaptive loop filtering process. The adaptive loop filter 43 also supplies the lossless encoding unit 36 with the filter coefficient used in the adaptive loop filtering process.

It should be noted that, although the adaptive loop filtering process is performed for each LCU in this example, the unit of processing in the adaptive loop filtering process is not limited to LCU. However, processing can be efficiently performed where the adaptive offset filter 42 and the adaptive loop filter 43 use the same unit of processing.

The frame memory 44 stores the image supplied from the adaptive loop filter 43 and the image supplied from the addition unit 40. An image adjacent to a prediction unit (PU) among the images that are stored in the frame memory 44 and have not been subjected to any filtering process is supplied as a peripheral image to the intra prediction unit 46 via the switch 45. Meanwhile, an image that is stored in the frame memory 44 and has been subjected to a filtering process is output as a reference image to the motion prediction/compensation unit 47 via the switch 45.

The IntraBC control information in the SPS and the PPS is supplied from the setting unit 11 to the intra prediction unit 46. Using the peripheral image that has been read from the frame memory 44 via the switch 45, the intra prediction unit 46 performs an intra prediction process in all candidate intra prediction modes for each PU. At the same time, the intra prediction unit 46 also performs intra prediction in the IntraBC mode in accordance with the IntraBC control information.

Also, in accordance with an image read from the screen rearrangement buffer 32 and the predicted image generated as a result of the intra prediction process, the intra prediction unit 46 calculates cost function values (described later in detail) of all the candidate intra prediction modes. The intra prediction unit 46 then determines the optimum intra prediction mode that is the intra prediction mode with the smallest cost function value.

The intra prediction unit 46 supplies the predicted image generated in the optimum intra prediction mode and the corresponding cost function value to the predicted image selection unit 48. When notified of the selection of the predicted image generated in the optimum intra prediction mode by the predicted image selection unit 48, the intra prediction unit 46 supplies the intra prediction mode information to the lossless encoding unit 36. It should be noted that an intra prediction mode is a mode indicating the size of each PU and a direction of prediction. If the optimum intra prediction mode is the IntraBC mode, the IntraBC vector is also supplied to the lossless encoding unit 36 at this stage.

The motion prediction/compensation unit 47 performs a motion prediction/compensation process in all candidate inter prediction modes for each PU. Specifically, the motion prediction/compensation unit 47 detects, for each PU, motion vectors of all the candidate inter prediction modes in accordance with the image supplied from the screen rearrangement buffer 32 and the reference image read from the frame memory 44 via the switch 45. The motion prediction/compensation unit 47 then performs, for each PU, a compensation process on the reference image in accordance with the motion vectors, and generates predicted images.

At this point, the motion prediction/compensation unit 47 calculates cost function values of all the candidate inter prediction modes in accordance with the image supplied from the screen rearrangement buffer 32 and the predicted images, and determines the optimum inter prediction mode that is the inter prediction mode with the smallest cost function value. The motion prediction/compensation unit 47 then supplies the cost function value of the optimum inter prediction mode and the corresponding predicted image to the predicted image selection unit 48. In addition, when notified of the selection of the predicted image generated in the optimum inter prediction mode by the predicted image selection unit 48, the motion prediction/compensation unit 47 outputs the inter prediction mode information, the corresponding motion vector, the information for identifying the reference image, and the like to the lossless encoding unit 36. It should be noted that an inter prediction mode is a mode indicating the size of each PU and the like.

In accordance with the cost function values supplied from the intra prediction unit 46 and the motion prediction/compensation unit 47, the predicted image selection unit 48 determines the optimum prediction mode that is the optimum intra prediction mode or the optimum inter prediction mode, whichever has the smaller cost function value. The predicted image selection unit 48 then supplies the predicted image in the optimum prediction mode to the arithmetic operation unit 33 and the addition unit 40. The predicted image selection unit 48 also notifies the intra prediction unit 46 or the motion prediction/compensation unit 47 of the selection of the predicted image in the optimum prediction mode.

In accordance with the encoded data stored in the accumulation buffer 37, the rate control unit 49 controls the quantization operation rate of the quantization unit 35 so as not to cause an overflow or underflow.

(Description of Processing to be Performed by the Encoding Device)

Figure 15:
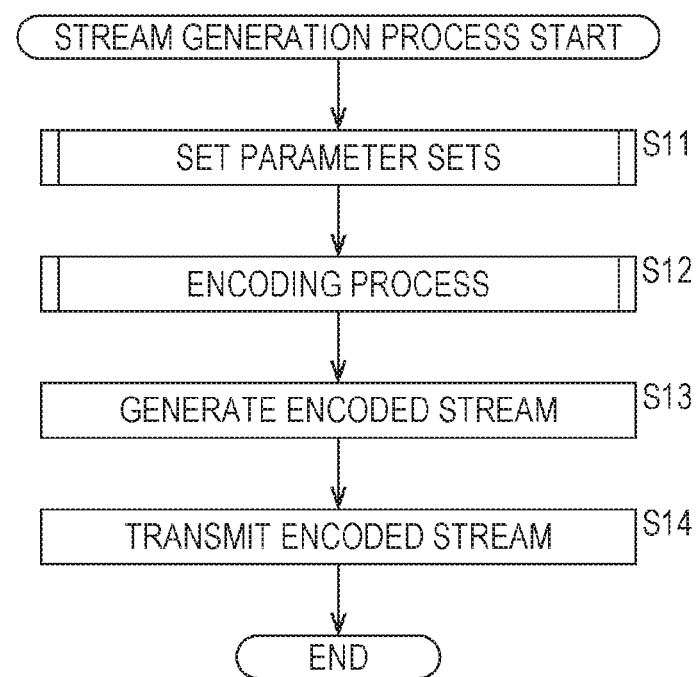
FIG. 15 is a flowchart for explaining a stream generation process.

FIG. 15 is a flowchart for explaining a stream generation process to be performed by the encoding device 10 shown in FIG. 13.

In step S11 in FIG. 15, the setting unit 11 of the encoding device 10 sets parameter sets such as a VPS and an SPS. The setting unit 11 supplies the set parameter sets to the encoding unit 12. This setting process will be described later in detail with reference to FIG. 16.

In step S12, the encoding unit 12 performs an encoding process to encode a frame-based image input from the outside by a method compliant with HEVC. This encoding process will be described later in detail, with reference to FIGS. 17 and 18.

In step S13, the accumulation buffer 37 (FIG. 14) of the encoding unit 12 generates an encoded stream from the parameter sets supplied from the setting unit 11 and stored encoded data, and supplies the encoded stream to the transmission unit 13.

In step S14, the transmission unit 13 transmits the encoded stream supplied from the setting unit 11 to a decoding device 110 that will be described later, and the process then comes to an end.

Figure 16:
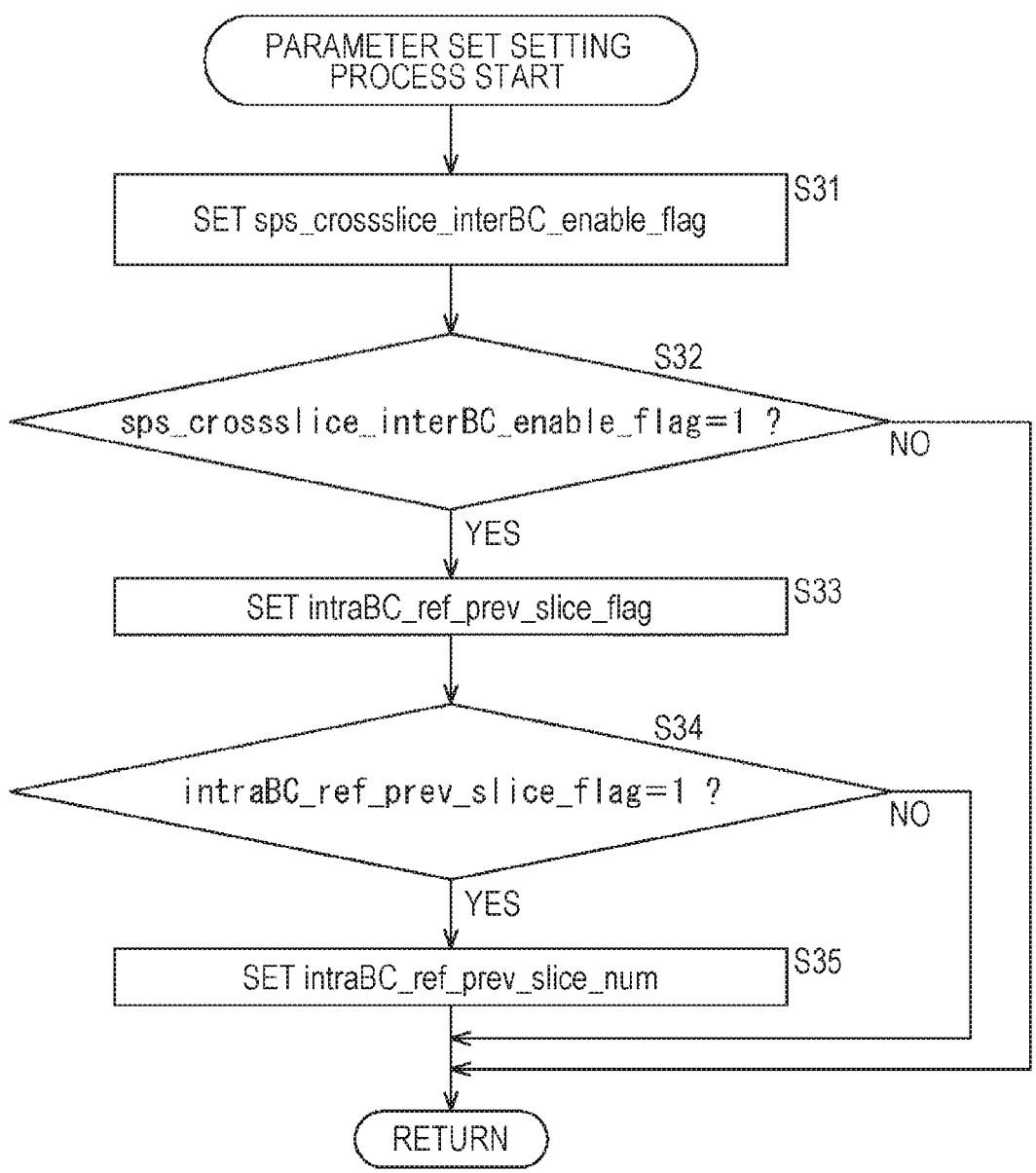
FIG. 16 is a flowchart for explaining a parameter set setting process.

Referring now to the flowchart in FIG. 16, the parameter set setting process of step S11 in FIG. 15 is described in detail. In the example shown in FIG. 16, the IntraBC control information is set in an SPS and a PPS.

In step S31, the setting unit 11 shown in FIG. 13 sets sps_crossslice_intraBC_enable_flag. In step S32, the setting unit 11 determines whether sps_crossslice_intraBC_enable_flag is 1. If sps_crossslice_intraBC_enable_flag is determined to be 1 in step S32, the process moves on to step S33.

In step S33, the setting unit 11 sets intraBC_ref_prev_slice_flag. In step S34, the setting unit 11 determines whether intraBC_ref_prev_slice_flag is 1.

If intraBC_ref_prev_slice_flag is determined to be 1 in step S34, the process moves on to step S35. In step S35, the setting unit 11 sets intraBC_ref_prev_slice_num.

If sps_crossslice_intraBC_enable_flag is determined to be 0 in step S32, steps S33 through S35 are skipped, and the parameter set setting process is ended. The process then returns to step S11 in FIG. 15.

If intraBC_ref_prev_slice_flag is determined to be 0 in step S34, step S35 is skipped, and the parameter set setting process is ended. The process then returns to step S11 in FIG. 15.

Figure 17:
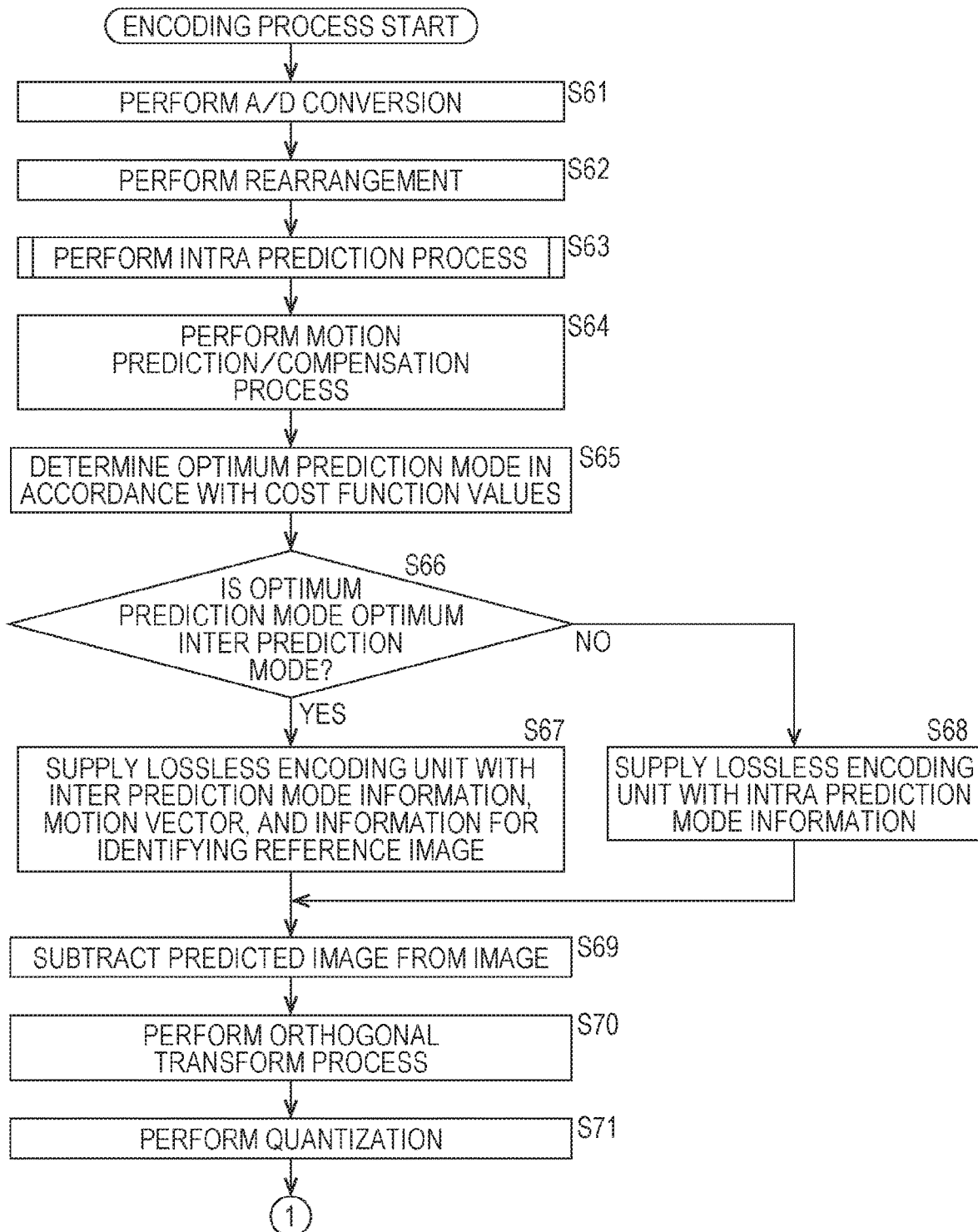
FIG. 17 is a flowchart for explaining the encoding process shown in FIG. 15.
Figure 18:
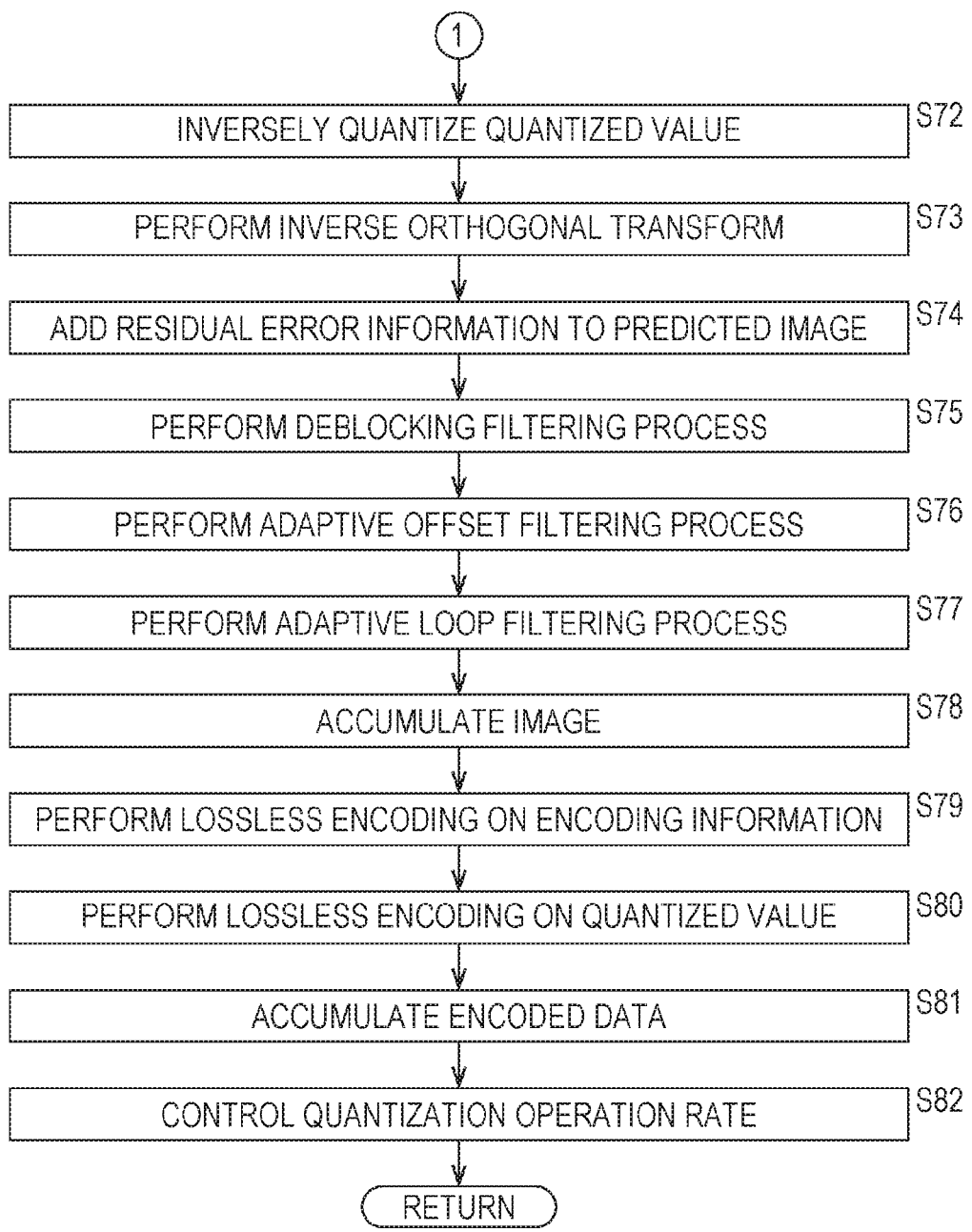
FIG. 18 is a flowchart for explaining the encoding process shown in FIG. 15.

Next, FIGS. 17 and 18 are a flowchart for explaining in detail the encoding process of step S12 in FIG. 15. A frame-based image is input from the setting unit 11 to the A/D converter 31, and the IntraBC control information is supplied to the intra prediction unit 46.

In step S61 in FIG. 17, the A/D converter 31 (FIG. 14) of the encoding unit 12 performs A/D conversion on the frame-based image that has been input as the current object to be encoded. The A/D converter 31 outputs an image that is a converted digital signal to the screen rearrangement buffer 32, and stores the image into the screen rearrangement buffer 32.

In step S62, the screen rearrangement buffer 32 rearranges the frames of the image stored in displaying order, so that the frames of the image are arranged in encoding order in accordance with the GOP structure. The screen rearrangement buffer 32 supplies the rearranged frame-based image to the arithmetic operation unit 33, the intra prediction unit 46, and the motion prediction/compensation unit 47. Also, the IntraBC control information is supplied from the setting unit 11 to the intra prediction unit 46.

In step S63, the intra prediction unit 46 performs an intra prediction process in all candidate intra prediction modes for each PU. This intra prediction process will be described later in detail with reference to FIG. 19. That is, in accordance with an image read from the screen rearrangement buffer 32 and the predicted image generated as a result of the intra prediction process, the intra prediction unit 46 calculates cost function values of all the candidate intra prediction modes (including the IntraBC prediction mode). The intra prediction unit 46 then determines the optimum intra prediction mode that is the intra prediction mode with the smallest cost function value. The intra prediction unit 46 supplies the predicted image generated in the optimum intra prediction mode and the corresponding cost function value to the predicted image selection unit 48.

Meanwhile, in step S64, the motion prediction/compensation unit 47 performs a motion prediction/compensation process in all candidate inter prediction modes for each PU. The motion prediction/compensation unit 47 also calculates cost function values of all the candidate inter prediction modes in accordance with the image supplied from the screen rearrangement buffer 32 and the predicted images, and determines the optimum inter prediction mode that is the inter prediction mode with the smallest cost function value. The motion prediction/compensation unit 47 then supplies the cost function value of the optimum inter prediction mode and the corresponding predicted image to the predicted image selection unit 48.

In step S65, in accordance with the cost function values supplied from the intra prediction unit 46 and the motion prediction/compensation unit 47, the predicted image selection unit 48 determines the optimum prediction mode that is the optimum intra prediction mode or the optimum inter prediction mode, whichever has the smaller cost function value. The predicted image selection unit 48 then supplies the predicted image in the optimum prediction mode to the arithmetic operation unit 33 and the addition unit 40.

In step S65, the predicted image selection unit 48 determines whether the optimum prediction mode is the optimum inter prediction mode. If the optimum prediction mode is determined to be the optimum inter prediction mode in step S65, the predicted image selection unit 48 notifies the motion prediction/compensation unit 47 of selection of the predicted image generated in the optimum inter prediction mode.

Then in step S66, the motion prediction/compensation unit 47 supplies the lossless encoding unit 36 with the inter prediction mode information, the motion vector, and the information for identifying the reference image, and the process moves on to step S68.

If the optimum prediction mode is determined not to be the optimum inter prediction mode in step S65, or if the optimum prediction mode is the optimum intra prediction mode, on the other hand, the predicted image selection unit 48 notifies the intra prediction unit 46 of selection of the predicted image generated in the optimum intra prediction mode. Then in step S67, the intra prediction unit 46 supplies the intra prediction mode information to the lossless encoding unit 36, and the process moves on to step S69. If the optimum intra prediction mode is the IntraBC mode, the IntraBC vector is also supplied to the lossless encoding unit 36 at this stage.

In step S69, the arithmetic operation unit 33 performs encoding by subtracting the predicted image supplied from the predicted image selection unit 48 from the image supplied from the screen rearrangement buffer 32. The arithmetic operation unit 33 outputs the resultant image as residual error information to the orthogonal transform unit 34.

In step S70, the orthogonal transform unit 34 performs an orthogonal transform process on the residual error information for each TU. The orthogonal transform unit 34 supplies an orthogonal transform result to the quantization unit 35 after the orthogonal transform process.

In step S71, the quantization unit 35 quantizes the orthogonal transform result supplied from the orthogonal transform unit 34. The quantization unit 35 supplies the quantized value obtained as a result of the quantization to the lossless encoding unit 36 and the inverse quantization unit 38.

In step S72, the inverse quantization unit 38 inversely quantizes the quantized value supplied from the quantization unit 35. The inverse quantization unit 38 supplies the orthogonal transform result obtained as a result of the inverse quantization to the inverse orthogonal transform unit 39.

In step S73, the inverse orthogonal transform unit 39 performs an inverse orthogonal transform process on the orthogonal transform result supplied from the inverse quantization unit 38 for each TU. The inverse orthogonal transform unit 39 supplies the residual error information obtained as a result of the inverse orthogonal transform process to the addition unit 40.

In step S74, the addition unit 40 adds the residual error information supplied from the inverse orthogonal transform unit 39 to the predicted image supplied from the predicted image selection unit 48, to perform decoding. The addition unit 40 supplies the decoded image to the deblocking filter 41 and the frame memory 44.

In step S75, the deblocking filter 41 performs a deblocking filtering process on the decoded image supplied from the addition unit 40. The deblocking filter 41 supplies the resultant image to the adaptive offset filter 42.

In step S76, the adaptive offset filter 42 performs, for each LCU, an adaptive offset filtering process on the image supplied from the deblocking filter 41. The adaptive offset filter 42 supplies the resultant image to the adaptive loop filter 43. The adaptive offset filter 42 also supplies the offset filter information to the lossless encoding unit 36 for each LCU.

In step S77, the adaptive loop filter 43 performs, for each LCU, an adaptive loop filtering process on the image supplied from the adaptive offset filter 42. The adaptive loop filter 43 supplies the resultant image to the frame memory 44. The adaptive loop filter 43 also supplies the lossless encoding unit 36 with the filter coefficient used in the adaptive loop filtering process.

In step S78, the frame memory 44 stores the image supplied from the adaptive loop filter 43 and the image supplied from the addition unit 40. An image adjacent to a PU among the images that are stored in the frame memory 44 and have not been subjected to any filtering process is supplied as a peripheral image to the intra prediction unit 46 via the switch 45. Meanwhile, an image that is stored in the frame memory 44 and has been subjected to a filtering process is output as a reference image to the motion prediction/compensation unit 47 via the switch 45.

In step S79, the lossless encoding unit 36 performs lossless encoding on encoding information, such as the intra prediction mode information or the inter prediction mode information, the motion vector, the information for identifying the reference image, the offset filter information, and the filter coefficient. It should be noted that, if the prediction mode at this stage is the optimum intra prediction mode, and the optimum intra prediction mode is the IntraBC mode, the IntraBC vector as encoding information is also subjected to the lossless encoding.

In step S80, the lossless encoding unit 36 performs lossless encoding on the quantized value supplied from the quantization unit 35. The lossless encoding unit 36 then generates encoded data from the encoding information subjected to the lossless encoding in the procedure in step S78 and the quantized value subjected to the lossless encoding, and supplies the encoded data to the accumulation buffer 37.

In step S81, the accumulation buffer 37 temporarily stores the encoded data supplied from the lossless encoding unit 36.

In step S82, in accordance with the encoded data stored in the accumulation buffer 37, the rate control unit 49 controls the quantization operation rate of the quantization unit 35 so as not to cause an overflow or underflow. The process then returns to step S12 in FIG. 15, and moves on to step S13.

Figure 19:
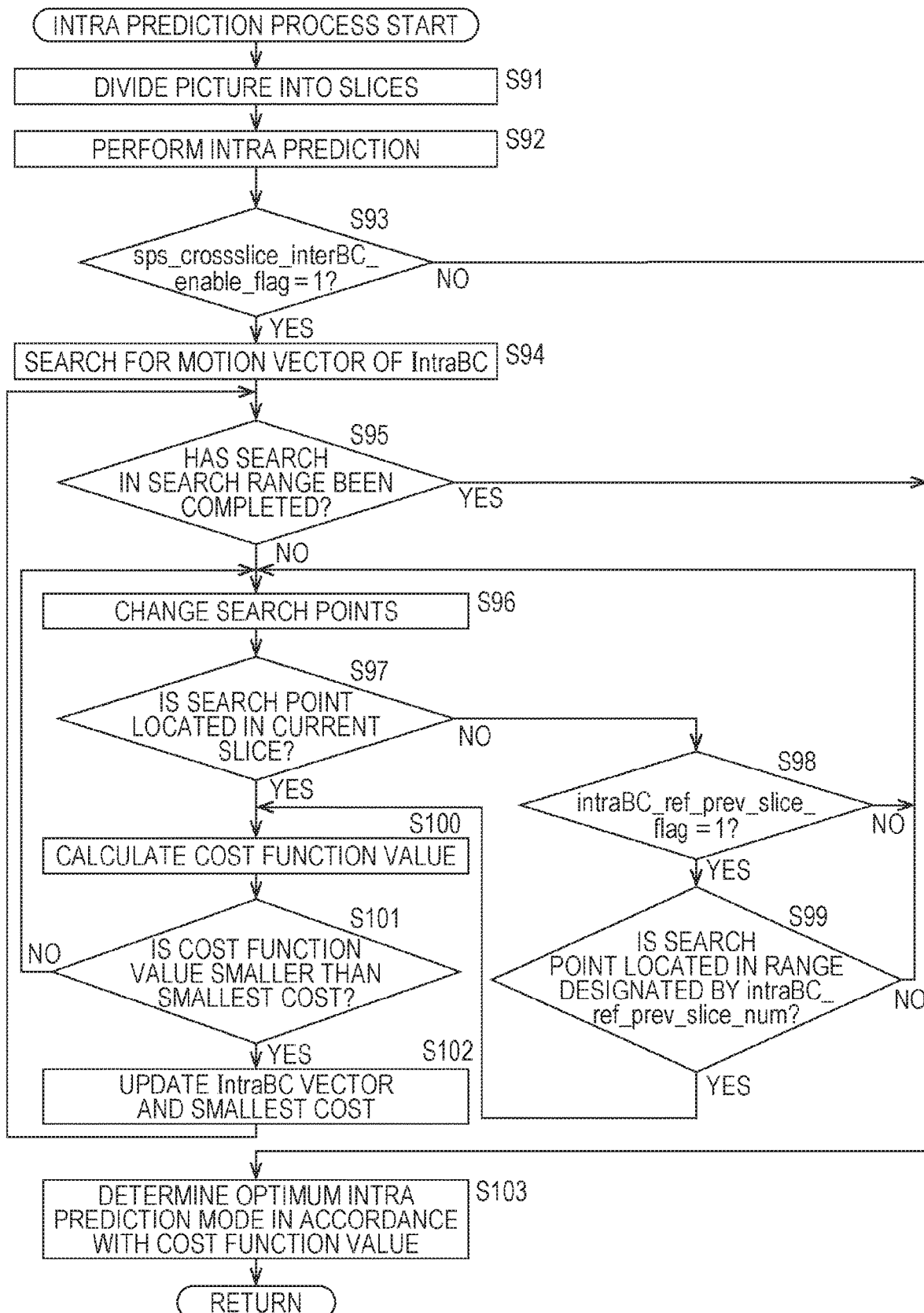
FIG. 19 is a flowchart for specifying the intra prediction process shown in FIG. 17.

Referring now to the flowchart in FIG. 19, the intra prediction process of step S63 in FIG. 17 is described in detail. The IntraBC control information, such as sps_crossslice_intraBC_enable_flag, intra_BC_ref_prev_slice_flag, and intraBC_ref_prev_slice_num, is supplied from the setting unit 11 to the intra prediction unit 46.

In step S91, the intra prediction unit 46 divides a picture into slices. In step S92, the intra prediction unit 46 performs intra prediction in prediction modes other than the IntraBC mode, to calculate cost function values.

In step S93, the intra prediction unit 46 determines whether sps_crossslice_intraBC_enable_flag is 1. If sps_crossslice_intraBC_enable_flag is determined to be 1 in step S93, the process moves on to step S94.

In step S94, the intra prediction unit 46 searches for a motion vector of IntraBC. In step S95, the intra prediction unit 46 determines whether the search in the search range has been completed. If it is determined in step S95 that the search in the search range has not been completed, the process moves on to step S96.

In step S96, the intra prediction unit 46 changes search points. In step S97, the intra prediction unit 46 determines whether the search point changed from the former one in step S96 is located within the current slice.

If the search point is determined not to be located in the slice in step S97, the process moves on to step S98. In step S98, the intra prediction unit 46 determines whether intra_BC_ref_prev_slice_flag is 1. If intra_BC_ref_prev_slice_flag is determined to be 1 in step S98, the process moves on to step S99.

In step S99, the intra prediction unit 46 determines whether the position of the search point is within the range designated by intraBC_ref_prev_slice_num.

If the position of the search point is determined not to be within the range designated by intraBC_ref_prev_slice_num in step S99, the process returns to step S96, and the procedures thereafter are repeated. If intra_BC_ref_prev_slice_flag is determined not to be 1 in step S98, the process also returns to step S96, and the procedures thereafter are repeated.

If the position of the search point is determined to be within the range designated by intraBC_ref_prev_slice_num in step S99, the process moves on to step S100. If the search point is determined to be located in the slice in step S97, the process also moves on to step S100.

In step S100, the intra prediction unit 46 calculates a cost function value in the IntraBC mode. The IntraBC vector corresponding to the smallest cost in the IntraBC mode is stored in a memory (not shown). In step S101, the intra prediction unit 46 determines whether the cost function value calculated in step S100 is smaller than the smallest cost.

If the cost function value is determined to be smaller than the smallest cost in step S101, the process moves on to step S102. In step S102, the IntraBC vector in the memory and the smallest cost are updated, and the process returns to step S96. The procedures thereafter are then repeated.

If the cost function value is determined not to be smaller than the smallest cost in step S101, the process returns to step S96, and the procedures thereafter are repeated.

If it is determined in step S95 that the search in the search range has been completed, the process moves on to step S103. If sps_crossslice_intraBC_enable_flag is determined not to be 1 in step S93, the process also moves on to step S103.

In step S103, the intra prediction unit 46 determines the optimum intra prediction mode in accordance with the cost function value, and ends the intra prediction process.

(Example Configuration of an Embodiment of a Decoding Device)

Figure 20:
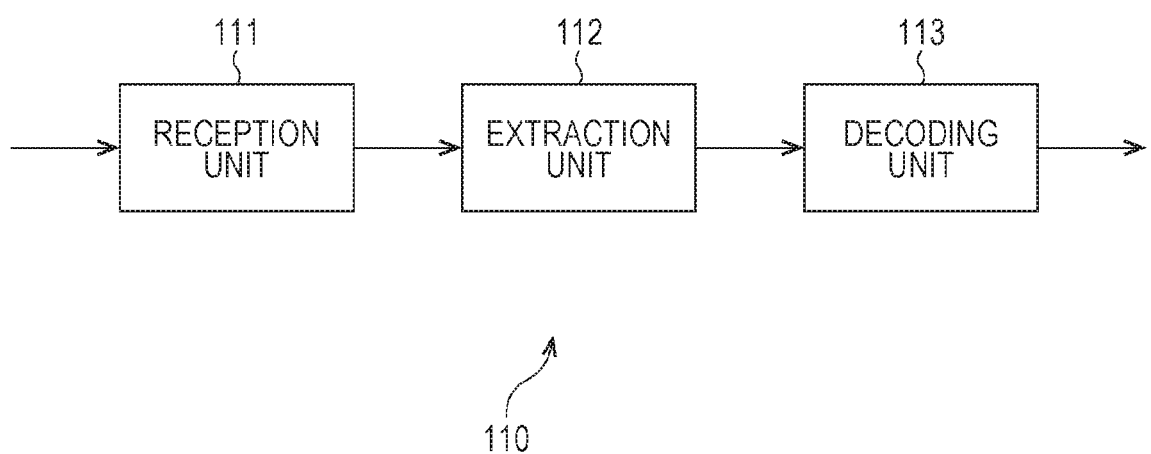
FIG. 20 is a block diagram showing an example configuration of a first embodiment of a decoding device to which the present disclosure is applied.

FIG. 20 is a block diagram showing an example configuration of an embodiment of a decoding device to which the present disclosure is applied. The decoding device decodes an encoded stream transmitted from the encoding device 10 shown in FIG. 13.

The decoding device 110 in FIG. 20 includes a reception unit 111, an extraction unit 112, and a decoding unit 113.

The reception unit 111 of the decoding device 110 receives an encoded stream transmitted from the encoding device 10 shown in FIG. 13, and supplies the encoded stream to the extraction unit 112.

The extraction unit 112 extracts parameter sets, such as a VPS, an SPS, and a PPS, and encoded data from the encoded stream supplied from the reception unit 111, and supplies the parameter sets and the encoded data to the decoding unit 113. Particularly, the extraction unit 112 extracts IntraBC control information from an SPS and a PPS.

The decoding unit 113 decodes the encoded data supplied from the extraction unit 112, by a method compliant with HEVC. At this point, the decoding unit 113 performs a decoding process in parallel or sequentially in accordance with the IntraBC control information in the SPS and the PPS supplied from the extraction unit 112. The decoding unit 113 outputs the image obtained as a result of the decoding.

(Example Configuration of the Decoding Unit)

Figure 21:
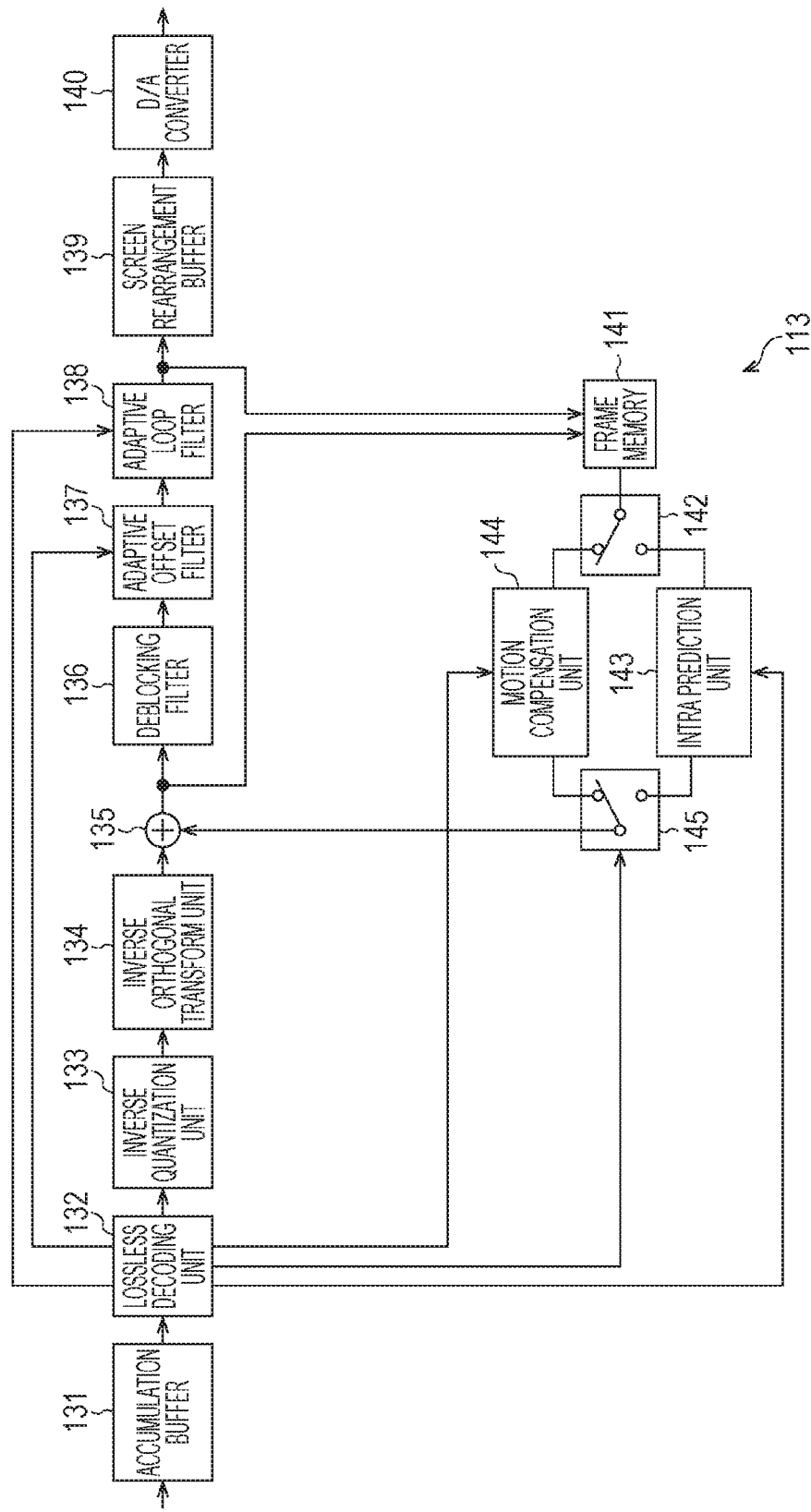
FIG. 21 is a block diagram showing an example configuration of the decoding unit shown in FIG. 20.

FIG. 21 is a block diagram showing an example configuration of the decoding unit 113 shown in FIG. 20.

The decoding unit 113 shown in FIG. 21 includes an accumulation buffer 131, a lossless decoding unit 132, an inverse quantization unit 133, an inverse orthogonal transform unit 134, an addition unit 135, a deblocking filter 136, an adaptive offset filter 137, an adaptive loop filter 138, and a screen rearrangement buffer 139. The decoding unit 113 also includes a D/A converter 140, a frame memory 141, a switch 142, an intra prediction unit 143, a motion compensation unit 144, and a switch 145.

The accumulation buffer 131 of the decoding unit 113 receives and accumulates encoded data from the extraction unit 112 shown in FIG. 20. The accumulation buffer 131 supplies the accumulated encoded data to the lossless decoding unit 132.

The lossless decoding unit 132 obtains a quantized value and encoding information by performing lossless decoding, such as variable-length decoding or arithmetic decoding, on the encoded data supplied from the accumulation buffer 131. The lossless decoding unit 132 supplies the quantized value to the inverse quantization unit 133. It should be noted that the IntraBC control information from the extraction unit 112 is input to the lossless decoding unit 132. In accordance with the IntraBC control information from the extraction unit 112, the lossless decoding unit 132 controls the determination as to whether the slice decoding process thereafter are to be performed in parallel or whether the slice decoding process thereafter are to be performed sequentially.

The lossless decoding unit 132 also supplies intra prediction mode information (including IntraBC mode information) and the like as encoding information to the intra prediction unit 143. If the intra prediction mode information indicates the IntraBC mode, the IntraBC vector is also supplied to the intra prediction unit 143 at this stage. The lossless decoding unit 132 also supplies the motion compensation unit 144 with a motion vector, inter prediction mode information, information for identifying a reference image, and the like.

The lossless decoding unit 132 further supplies the switch 145 with the intra prediction mode information or the inter prediction mode information as encoding information. The lossless decoding unit 132 supplies offset filter information as encoding information to the adaptive offset filter 137. The lossless decoding unit 132 supplies a filter coefficient as encoding information to the adaptive loop filter 138.

The inverse quantization unit 133, the inverse orthogonal transform unit 134, the addition unit 135, the deblocking filter 136, the adaptive offset filter 137, the adaptive loop filter 138, the frame memory 141, the switch 142, the intra prediction unit 143, and the motion compensation unit 144 perform processes similar to those performed by the inverse quantization unit 38, the inverse orthogonal transform unit 39, the addition unit 40, the deblocking filter 41, the adaptive offset filter 42, the adaptive loop filter 43, the frame memory 44, the switch 45, the intra prediction unit 46, and the motion prediction/compensation unit 47 shown in FIG. 14, to decode an image.

Specifically, the inverse quantization unit 133 is designed in a manner similar to that for the inverse quantization unit 38 shown in FIG. 14. The inverse quantization unit 133 inversely quantizes a quantized value from the lossless decoding unit 132 for each TU. The inverse quantization unit 133 supplies the obtained orthogonal transform result to the inverse orthogonal transform unit 134.

The inverse orthogonal transform unit 134 is designed in a manner similar to that for the inverse orthogonal transform unit 39 shown in FIG. 14. The inverse orthogonal transform unit 134 performs an inverse orthogonal transform process on the orthogonal transform result supplied from the inverse quantization unit 133. The inverse orthogonal transform unit 134 supplies the residual error information obtained as a result of the inverse orthogonal transform process to the addition unit 135.

The addition unit 135 performs decoding by adding the residual error information supplied from the inverse orthogonal transform unit 134 to a predicted image supplied from the switch 145. The addition unit 135 supplies the decoded image to the deblocking filter 136 and the frame memory 141.

The deblocking filter 136 performs an adaptive deblocking filtering process on the image supplied from the addition unit 135, and supplies the resultant image to the adaptive offset filter 137.

Using the offset indicated by the offset filter information supplied from the lossless decoding unit 132, the adaptive offset filter 137 also performs, for each LCU, an adaptive offset filtering process of the type indicated by the offset filter information, on the image subjected to the adaptive deblocking filtering process. The adaptive offset filter 137 supplies the adaptive loop filter 138 with the image subjected to the adaptive offset filtering process.

Using the filter coefficient supplied from the lossless decoding unit 132, the adaptive loop filter 138 performs, for each LCU, an adaptive loop filtering process on the image supplied from the adaptive offset filter 137. The adaptive loop filter 138 supplies the resultant image to the frame memory 141 and the screen rearrangement buffer 139.

The screen rearrangement buffer 139 stores the image supplied from the adaptive loop filter 138 frame by frame. The screen rearrangement buffer 139 rearranges the frames of the stored image in the original displaying order, instead of the encoding order, and supplies the rearranged image to the D/A converter 140.

The D/A converter 140 performs D/A conversion on the frame-based image supplied from the screen rearrangement buffer 139, and outputs the image.

The frame memory 141 stores the image supplied from the adaptive loop filter 138 and the image supplied from the addition unit 135. An image adjacent to a PU among the images that are stored in the frame memory 141 and have not been subjected to any filtering process is supplied as a peripheral image to the intra prediction unit 143 via the switch 142. Meanwhile, an image that is stored in the frame memory 141 and has been subjected to a filtering process is output as a reference image to the motion compensation unit 144 via the switch 142.

Using the peripheral image that has been read from the frame memory 141 via the switch 142, the intra prediction unit 143 performs an intra prediction process in the optimum intra prediction mode indicated by the intra prediction mode information supplied from the lossless decoding unit 132. In the case of the IntraBC mode, an IntraBC vector is also sent from the lossless decoding unit 132, and intra prediction is performed in the IntraBC mode using the IntraBC vector. The intra prediction unit 143 supplies the resultant predicted image to the switch 145.

From the frame memory 141 via the switch 142, the motion compensation unit 144 reads the reference image identified by the information supplied from the lossless decoding unit 132 for identifying the reference image. Using the motion vector and the reference image supplied from the lossless decoding unit 132, the motion compensation unit 144 performs a motion compensation process in the optimum inter prediction mode indicated by the inter prediction mode information supplied from the lossless decoding unit 132. The motion compensation unit 144 supplies the resultant predicted image to the switch 145.

When the intra prediction mode information is supplied from the lossless decoding unit 132, the switch 145 supplies the predicted image supplied from the intra prediction unit 143 to the addition unit 135. When the inter prediction mode information is supplied from the lossless decoding unit 132, on the other hand, the switch 145 supplies the predicted image supplied from the motion compensation unit 144 to the addition unit 135.

(Description of a Process to be Performed by the Decoding Device)

Figure 22:
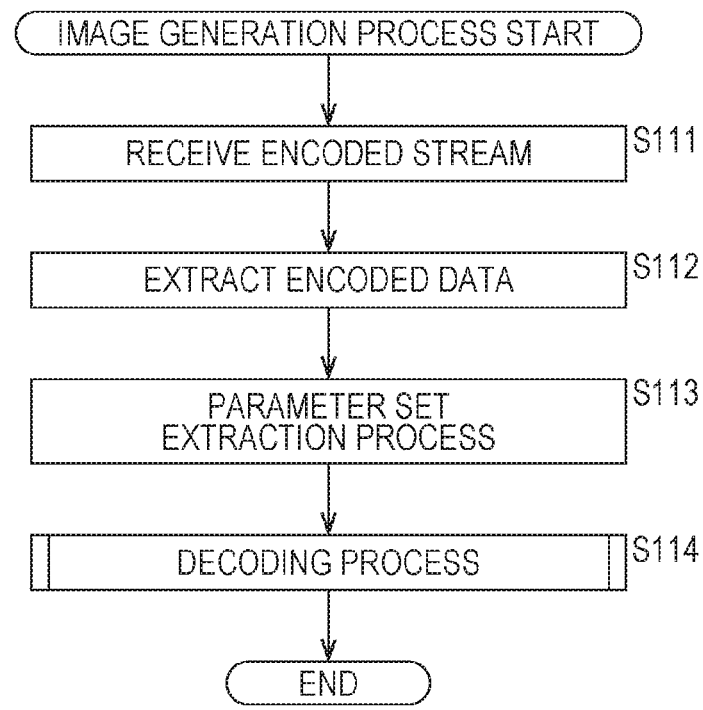
FIG. 22 is a flowchart for explaining an image generation process to be performed by the decoding device shown in FIG. 20.

FIG. 22 is a flowchart for explaining an image generation process to be performed by the decoding device 110 shown in FIG. 20.

In step S111 in FIG. 22, the reception unit 111 of the decoding device 110 receives an encoded stream transmitted from the encoding device 10 shown in FIG. 13, and supplies the encoded stream to the extraction unit 112.

In step S112, the extraction unit 112 extracts encoded data from the encoded stream supplied from the reception unit 111, and supplies the encoded data to the decoding unit 113.

In step S113, the extraction unit 112 extracts parameter sets, such as a VPS, an SPS, and a PPS, from the encoded stream supplied from the reception unit 111, and supplies the parameter sets to the decoding unit 113. Particularly, the extraction unit 112 extracts IntraBC control information from an SPS and a PPS.

In step S114, using the parameter sets supplied from the extraction unit 112 as necessary, the decoding unit 113 performs a decoding process to decode the encoded data supplied from the extraction unit 112 by a method compliant with HEVC. It should be noted that the decoding unit 113 performs a decoding process in parallel or independently in accordance with the IntraBC control information in the SPS and the PPS supplied from the extraction unit 112. This decoding process will be described later in detail with reference to FIG. 23. The process then comes to an end.

Figure 23:
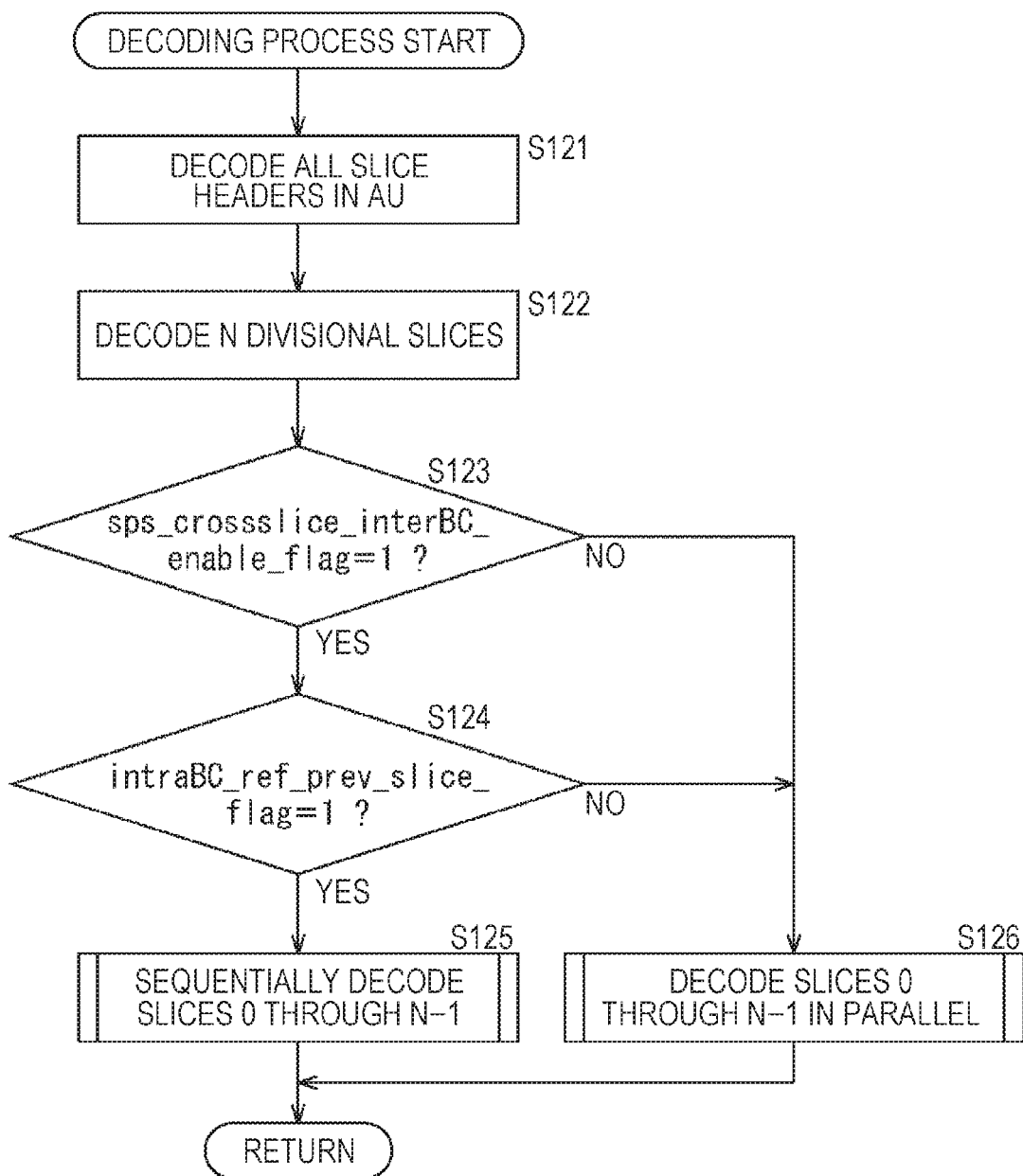
FIG. 23 is a flowchart for explaining a parameter set extraction process.

Referring now to the flowchart in FIG. 23, the decoding process of step S114 in FIG. 22 is described in detail.

In step S121, the lossless decoding unit 132 decodes all the slice headers of an access unit (AU).

In step S122, the lossless decoding unit 132 decodes N divisional slices.

In step S123, the lossless decoding unit 132 determines whether sps_crossslice_intraBC_enable_flag is 1. If sps_crossslice_intraBC_enable_flag is determined to be 1 in step S123, the process moves on to step S124.

In step S124, the lossless decoding unit 132 determines whether intra_BC_ref_prev_slice_flag is 1. If intra_BC_ref_prev_slice_flag is determined to be 1 in step S124, the process moves on to step S125.

In step S125, the lossless decoding unit 132 causes the inverse quantization unit 133 and the respective components located in the stages thereafter to sequentially decode the slices 0 through N−1.

If sps_crossslice_intraBC_enable_flag is determined not to be 1 in step S123, or if intra_BC_ref_prev_slice_flag is determined not to be 1 in step S124, on the other hand, the process moves on to step S126.

In step S126, the lossless decoding unit 132 causes the inverse quantization unit 133 and the respective components located in the stages thereafter to decode the slices 0 through N−1 in parallel.

It should be noted that the slice decoding process in steps S125 and S126 will be described later with reference to FIG. 25.

Figure 24:
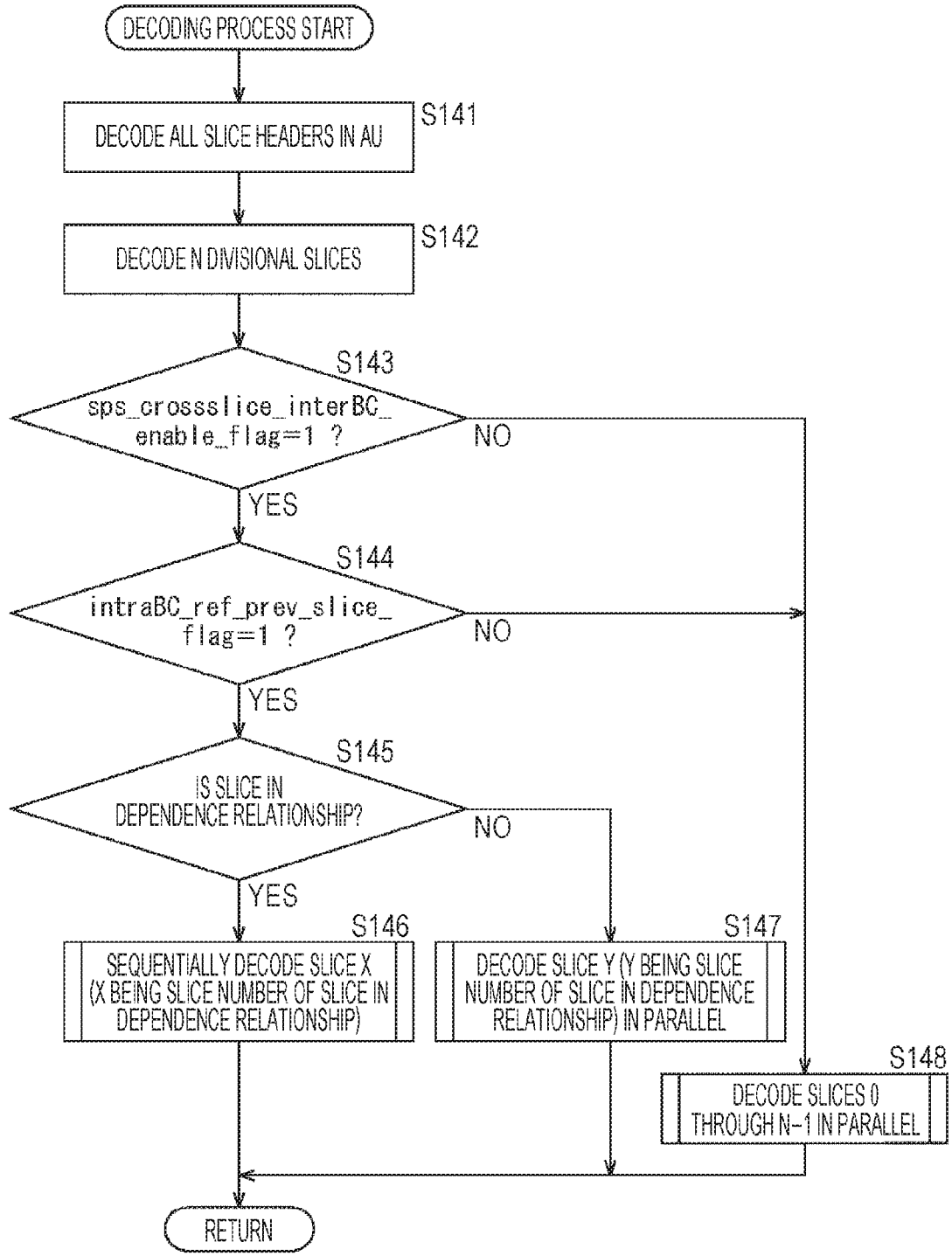
FIG. 24 is a flowchart for explaining a decoding process in detail.

Referring now to the flowchart in FIG. 24, another example of the decoding process of step S114 in FIG. 22 is described.

In step S141, the lossless decoding unit 132 decodes all the slice headers of an access unit (AU).

In step S142, the lossless decoding unit 132 decodes N divisional slices.

In step S143, the lossless decoding unit 132 determines whether sps_crossslice_intraBC_enable_flag is 1. If sps_crossslice_intraBC_enable_flag is determined to be 1 in step S143, the process moves on to step S144.

In step S144, the lossless decoding unit 132 determines whether intra_BC_ref_prev_slice_flag is 1. If intra_BC_ref_prev_slice_flag is determined to be 1 in step S144, the process moves on to step S145.

In step S145, the lossless decoding unit 132 refers to the dependence relationship among the slices from intraBC_ref_prev_slice_num of each slice, and makes a determination on each slice as to whether the slice is in a dependence relationship.

If the slice is determined to be a slice in a dependence relationship in step S145, the process moves on to step S146. In step S146, the lossless decoding unit 132 causes the inverse quantization unit 133 and the respective components located in the stages thereafter to sequentially decode the slice X (X being the slice number of the slice in a dependence relationship).

If the slice is determined not to be a slice in a dependence relationship in step S145, on the other hand, the process moves on to step S147. In step S147, the lossless decoding unit 132 causes the inverse quantization unit 133 and the respective components located in the stages thereafter to decode the slice Y (Y being the slice number of the slice not in a dependence relationship) in parallel.

If sps_crossslice_intraBC_enable_flag is determined not to be 1 in step S143, or if intra_BC_ref_prev_slice_flag is determined not to be 1 in step S144, the process moves on to step S148.

In step S148, the lossless decoding unit 132 causes the inverse quantization unit 133 and the respective components located in the stages thereafter to decode the slices 0 through N−1 in parallel.

In the above manner, slices are processed in parallel or sequentially in the decoding device 110 in accordance with the IntraBC control information.

It should be noted that the slice decoding process in steps S146 through S148 will be described later with reference to FIG. 25.

Figure 25:
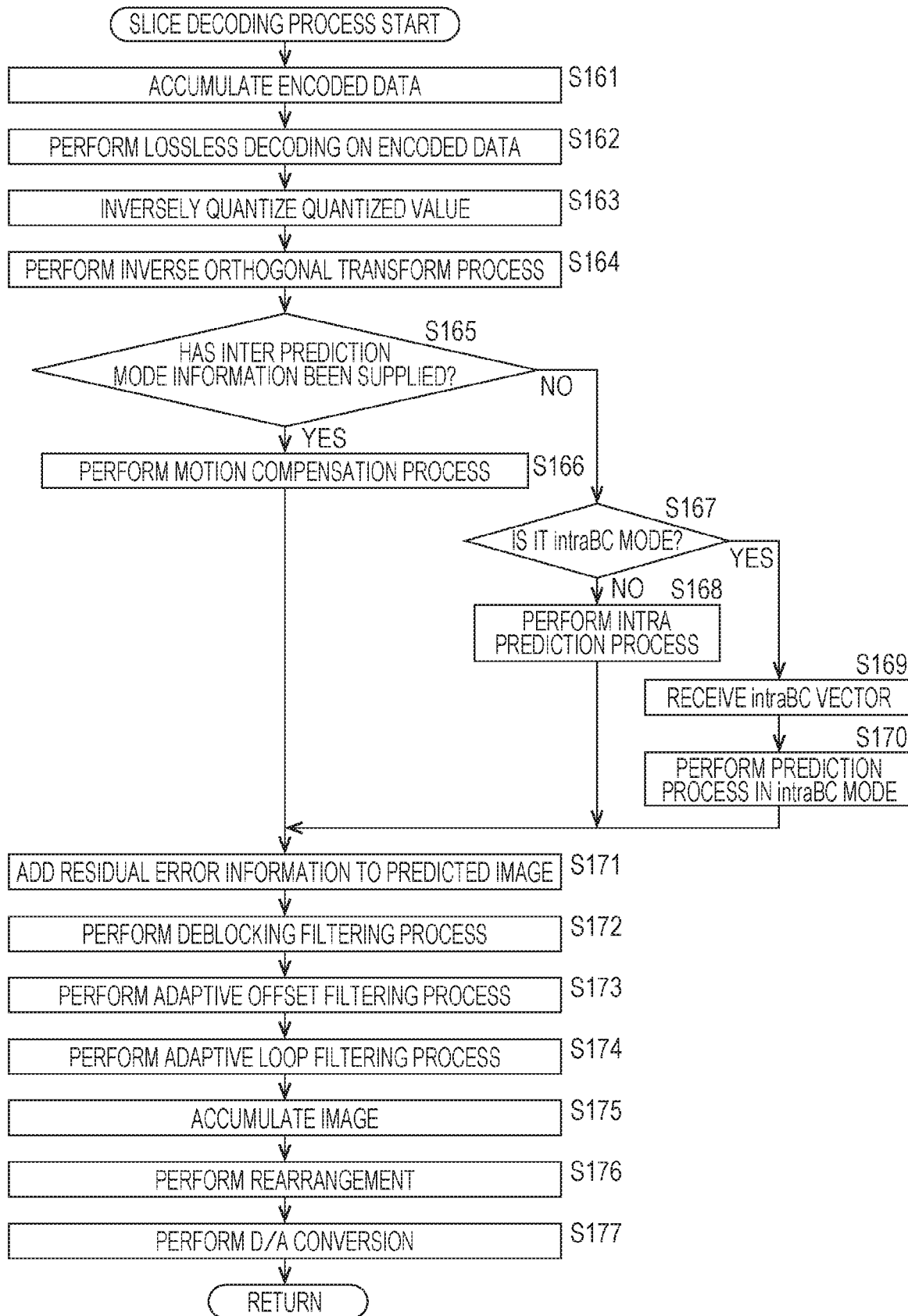
FIG. 25 is a flowchart for explaining a slice decoding process in detail.

Referring now to the flowchart in FIG. 25, the slice decoding process is described. This process is performed on the slices in parallel or sequentially by the lossless decoding unit 132.

In step S161 in FIG. 25, the accumulation buffer 131 (FIG. 21) of the decoding unit 113 receives and accumulates frame-based encoded data from the extraction unit 112 shown in FIG. 20. The accumulation buffer 131 supplies the accumulated encoded data to the lossless decoding unit 132.

In step S162, the lossless decoding unit 132 performs lossless decoding on the encoded data supplied from the accumulation buffer 131, to obtain a quantized value and encoding information. The lossless decoding unit 132 supplies the quantized value to the inverse quantization unit 133.

The lossless decoding unit 132 also supplies intra prediction mode information and the like as encoding information to the intra prediction unit 143. The lossless decoding unit 132 also supplies the motion compensation unit 144 with a motion vector, inter prediction mode information, information for identifying a reference image, and the like.

The lossless decoding unit 132 further supplies the switch 145 with the intra prediction mode information or the inter prediction mode information as encoding information. The lossless decoding unit 132 supplies offset filter information as encoding information to the adaptive offset filter 137, and supplies a filter coefficient to the adaptive loop filter 138.

In step S163, the inverse quantization unit 133 inversely quantizes the quantized value supplied from the lossless decoding unit 132. The inverse quantization unit 133 supplies the orthogonal transform result obtained as a result of the inverse quantization to the inverse orthogonal transform unit 134.

In step S164, the inverse orthogonal transform unit 134 performs an inverse orthogonal transform process on the orthogonal transform result supplied from the inverse quantization unit 133.

In step S165, the motion compensation unit 144 determines whether the inter prediction mode information has been supplied from the lossless decoding unit 132. If it is determined in step S165 that the inter prediction mode information has been supplied, the process moves on to step S166.

In step S166, the motion compensation unit 144 reads the reference image in accordance with reference-image identification information supplied from the lossless decoding unit 132, and performs a motion compensation process in the optimum inter prediction mode indicated by the inter prediction mode information, using the motion vector and the reference image. The motion compensation unit 144 supplies the resultant predicted image to the addition unit 135 via the switch 145, and the process then moves on to step S168.

If it is determined in step S165 that the inter prediction mode information has not been supplied, or if the intra prediction mode information has been supplied to the intra prediction unit 143, the process moves on to step S167.

In step S167, the intra prediction unit 143 determines whether the intra prediction mode indicated by the intra prediction mode information is the IntraBC mode. If the mode is determined not to be the IntraBC mode in step S167, the process moves on to step S168.

In step S168, using the peripheral image that has been read from the frame memory 141 via the switch 142, the intra prediction unit 143 performs an intra prediction process in the intra prediction mode (not the IntraBC mode) indicated by the intra prediction mode information. The intra prediction unit 143 supplies the predicted image generated as a result of the intra prediction process to the addition unit 135 via the switch 145, and the process then moves on to step S171.

If the mode is determined to be the IntraBC mode in step S167, the process moves on to step S169. In step S169, the intra prediction unit 143 receives an IntraBC vector from the lossless decoding unit 132. In step S170, using the peripheral image that has been read from the frame memory 141 via the switch 142, the intra prediction unit 143 performs an intra prediction process in the IntraBC mode. The intra prediction unit 143 supplies the predicted image generated as a result of the intra prediction process to the addition unit 135 via the switch 145, and the process then moves on to step S171.

In step S171, the addition unit 135 performs decoding by adding the residual error information supplied from the inverse orthogonal transform unit 134 to a predicted image supplied from the switch 145. The addition unit 135 supplies the decoded image to the deblocking filter 136 and the frame memory 141.

In step S172, the deblocking filter 136 performs a deblocking filtering process on the image supplied from the addition unit 135, to remove block distortion. The deblocking filter 136 supplies the resultant image to the adaptive offset filter 137.

In step S173, in accordance with the offset filter information supplied from the lossless decoding unit 132, the adaptive offset filter 137 performs, for each LCU, an adaptive offset filtering process on the image subjected to the deblocking filtering process by the deblocking filter 136. The adaptive offset filter 137 supplies the adaptive loop filter 138 with the image subjected to the adaptive offset filtering process.

In step S174, using the filter coefficient supplied from the lossless decoding unit 132, the adaptive loop filter 138 performs, for each LCU, an adaptive loop filtering process on the image supplied from the adaptive offset filter 137. The adaptive loop filter 138 supplies the resultant image to the frame memory 141 and the screen rearrangement buffer 139.

In step S175, the frame memory 141 stores the image supplied from the addition unit 135 and the image supplied from the adaptive loop filter 138. An image adjacent to a PU among the images that are stored in the frame memory 141 and have not been subjected to any filtering process is supplied as a peripheral image to the intra prediction unit 143 via the switch 142. Meanwhile, an image that is stored in the frame memory 141 and has been subjected to a filtering process is output as a reference image to the motion compensation unit 144 via the switch 142.

In step S176, the screen rearrangement buffer 139 stores the image supplied from the adaptive loop filter 138 frame by frame, rearranges the frames of the stored image in the original displaying order, instead of the encoding order, and supplies the rearranged image to the D/A converter 140.

In step S177, the D/A converter 140 performs D/A conversion on the frame-based image supplied from the screen rearrangement buffer 139, and outputs the image. The process then returns to one of steps S146 through S148 in FIG. 23, or to step S125 or S126 in FIG. 24, and then comes to an end.

In the above manner, encoding efficiency in IntraBC can be improved.

In the above example, a method compliant with HEVC is used as the encoding method. However, the present technology is not limited to the above, and some other encoding/decoding method can be used.

It should be noted that the present disclosure can be applied to image encoding devices and image decoding devices that are used when image information (bitstreams) compressed through orthogonal transform such as discrete cosine transform and motion compensation is received via a network medium such as satellite broadcasting, cable television, the Internet, or a portable telephone apparatus, as in HEVC, for example. The present disclosure can also be applied to image encoding devices and image decoding devices that are used when compressed image information is processed on a storage medium such as an optical or magnetic disk or a flash memory.

Second Embodiment (Description of a Computer to which the Present Disclosure is Applied)

The above described series of processes can be performed by hardware, and can also be performed by software. When the series of processes are to be performed by software, the program that forms the software is installed into a computer. Here, the computer may be a computer incorporated into special-purpose hardware, or may be a general-purpose personal computer that can execute various kinds of functions, having various kinds of programs installed thereinto.

Figure 26:
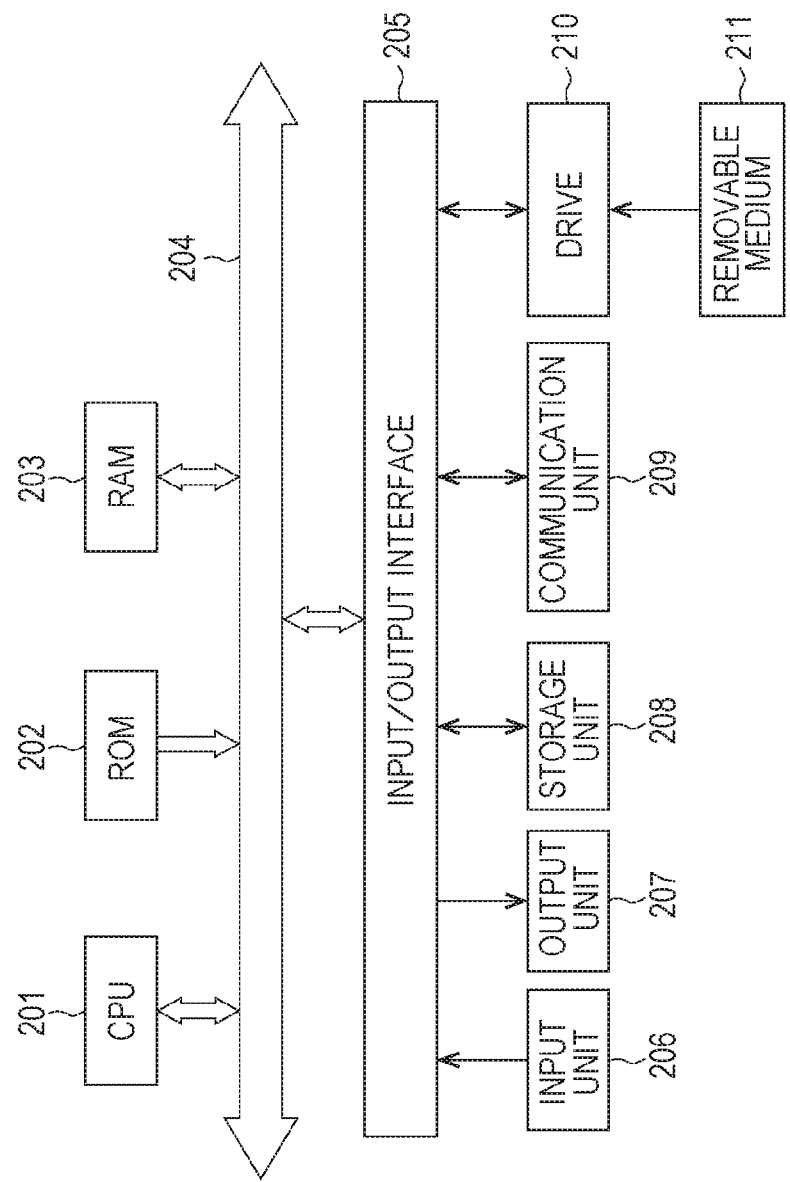
FIG. 26 is a block diagram showing an example configuration of the hardware of a computer.

FIG. 26 is a block diagram showing an example configuration of the hardware of a computer that performs the above described series of processes in accordance with a program.

In the computer, a central processing unit (CPU) 201, a read only memory (ROM) 202, and a random access memory (RAM) 203 are connected to one another by a bus 204.

An input/output interface 205 is further connected to the bus 204. An input unit 206, an output unit 207, a storage unit 208, a communication unit 209, and a drive 210 are connected to the input/output interface 205.

The input unit 206 is formed with a keyboard, a mouse, a microphone, and the like. The output unit 207 is formed with a display, a speaker, and the like. The storage unit 208 is formed with a hard disk, a nonvolatile memory, or the like. The communication unit 209 is formed with a network interface or the like. The drive 210 drives a removable medium 211, such as a magnetic disk, an optical disk, a magnetooptical disk, or a semiconductor memory.

In the computer having the above described configuration, the CPU 201 loads a program stored in the storage unit 208 into the RAM 203 via the input/output interface 205 and the bus 204, for example, and executes the program, so that the above described series of processes are performed.

The program to be executed by the computer (the CPU 201) may be recorded on the removable medium 211 as a packaged medium to be provided, for example. Alternatively, the program can be provided via a wired or wireless transmission medium, such as a local area network, the Internet, or digital satellite broadcasting.

In the computer, the program can be installed into the storage unit 208 via the input/output interface 205 when the removable medium 211 is mounted on the drive 210. The program can also be received by the communication unit 209 via a wired or wireless transmission medium, and be installed into the storage unit 208. Also, the program may be installed beforehand into the ROM 202 or the storage unit 208.

It should be noted that the program to be executed by the computer may be a program for performing processes in chronological order in accordance with the sequence described in this specification, or may be a program for performing processes in parallel or performing a process when necessary, such as when there is a call.

Third Embodiment (Applications to Multi-View Image Encoding and Multi-View Image Decoding)

Figure 27:
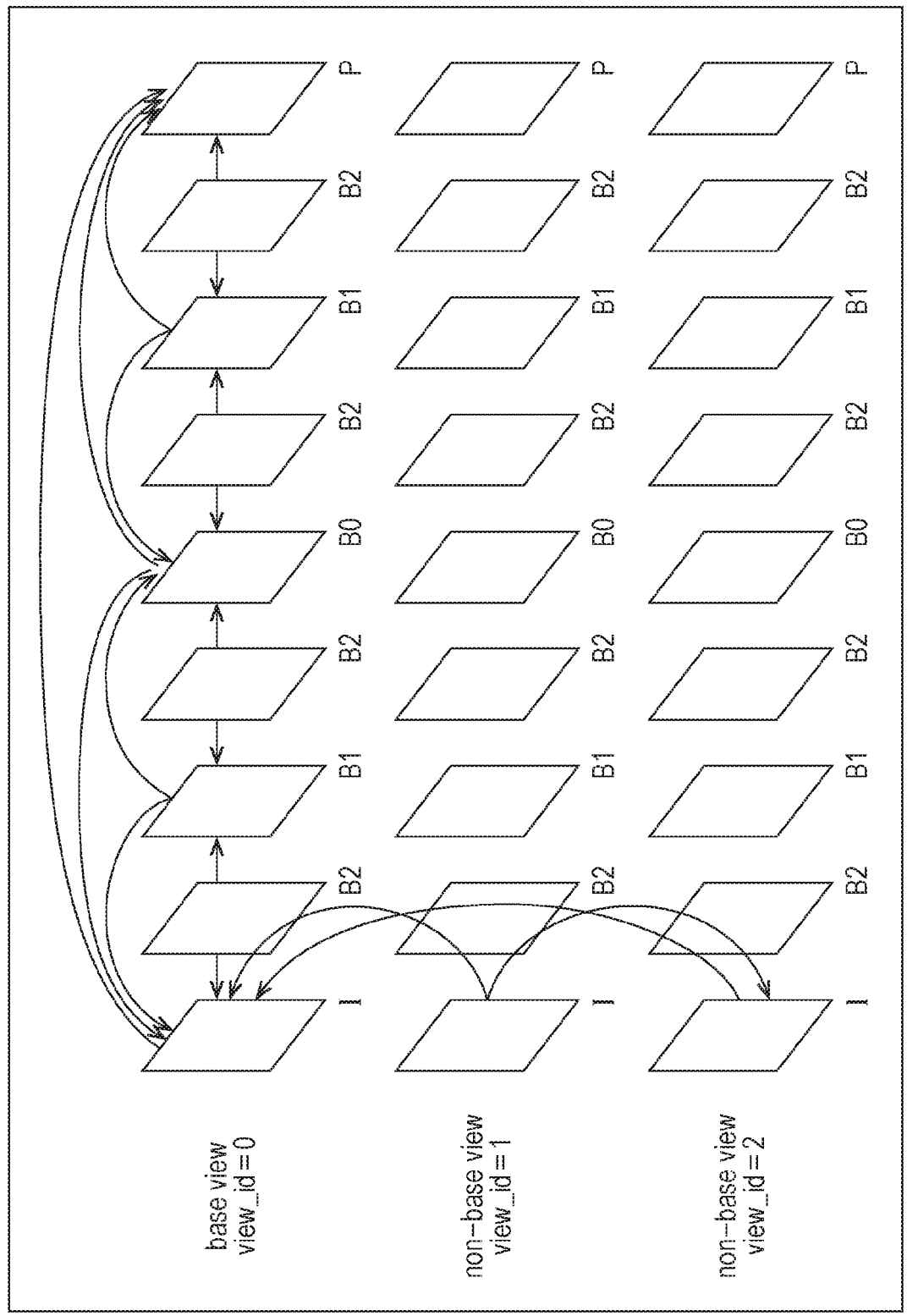
FIG. 27 is a diagram showing an example of a multi-view image encoding method.

The above described series of processes can be applied to multi-view image encoding and multi-view image decoding. FIG. 27 shows an example of a multi-view image encoding method.

As shown in FIG. 27, a multi-view image includes images of multiple views. The views of a multi-view image include a base view to be encoded/decoded only with the use of images of its own view and without the use of images of the other views, and non-base views to be encoded/decoded with the use of images of the other views. A non-base view may be processed with the use of an image of a base view, or may be processed with the use of an image of the other non-base view.

In a case where the multi-view image shown in FIG. 27 is encoded/decoded, the images of the respective views are encoded/decoded, and a method according to the above described first embodiment may be applied to the encoding/decoding of the respective views. In this manner, encoding efficiency in IntraBC can be improved. Thus, encoding efficiency is increased.

Further, in encoding/decoding of the respective views, the parameters used in the method according to the above described first embodiment may be shared. More specifically, a VPS, an SPS, a PPS, and the like as encoding information may be shared in encoding/decoding of the respective views. Necessary information other than those parameter sets may of course be shared in encoding/decoding of the respective views.

In this manner, transmission of redundant information can be prevented, and the amount (bit rate) of information to be transmitted can be reduced (or a reduction in encoding efficiency can be prevented).

(Multi-View Image Encoding Device)

Figure 28:
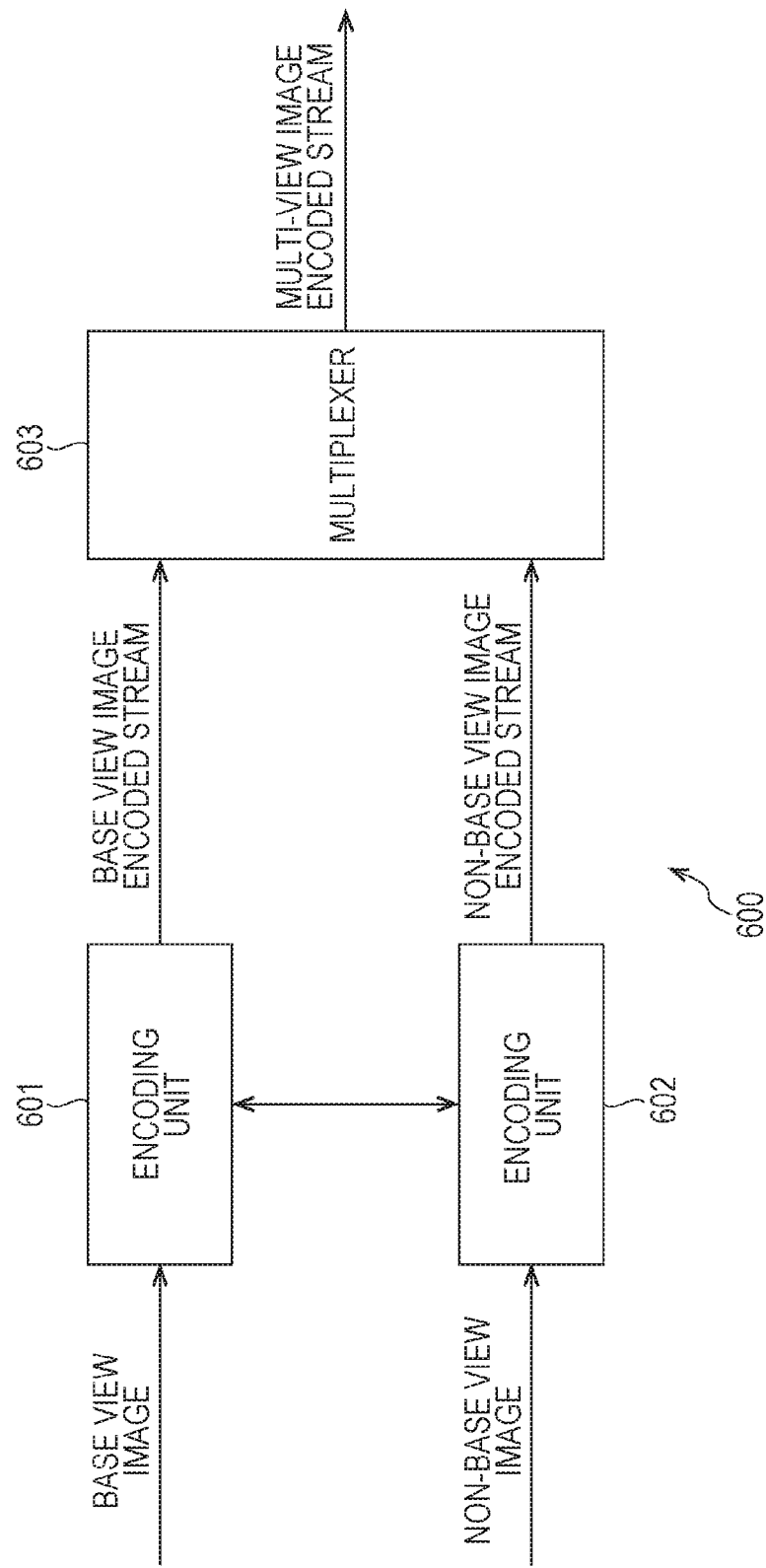
FIG. 28 is a diagram showing an example configuration of a multi-view image encoding device to which the present disclosure is applied.

FIG. 28 is a diagram showing a multi-view image encoding device that performs the above described multi-view image encoding. As shown in FIG. 28, the multi-view image encoding device 600 includes an encoding unit 601, an encoding unit 602, and a multiplexer 603.

The encoding unit 601 encodes an base view image, and generates a base view image encoded stream. The encoding unit 602 encodes a non-base view image, and generates a non-base view image encoded stream. The multiplexer 603 multiplexes the base view image encoded stream generated at the encoding unit 601 and the non-base view image encoded stream generated at the encoding unit 602, to generate a multi-view image encoded stream.

The encoding device 10 (FIG. 13) can be used as the encoding unit 601 and the encoding unit 602 of the multi-view image encoding device 600. That is, encoding efficiency in IntraBC can be improved in encoding of each view. Also, the encoding unit 601 and the encoding unit 602 can perform encoding (or share flags and parameters), using the same flags and parameters (such as the syntax elements related to processing between images) between the two encoding units. Thus, a reduction in encoding efficiency can be prevented.

(Multi-View Image Decoding Device)

Figure 29:
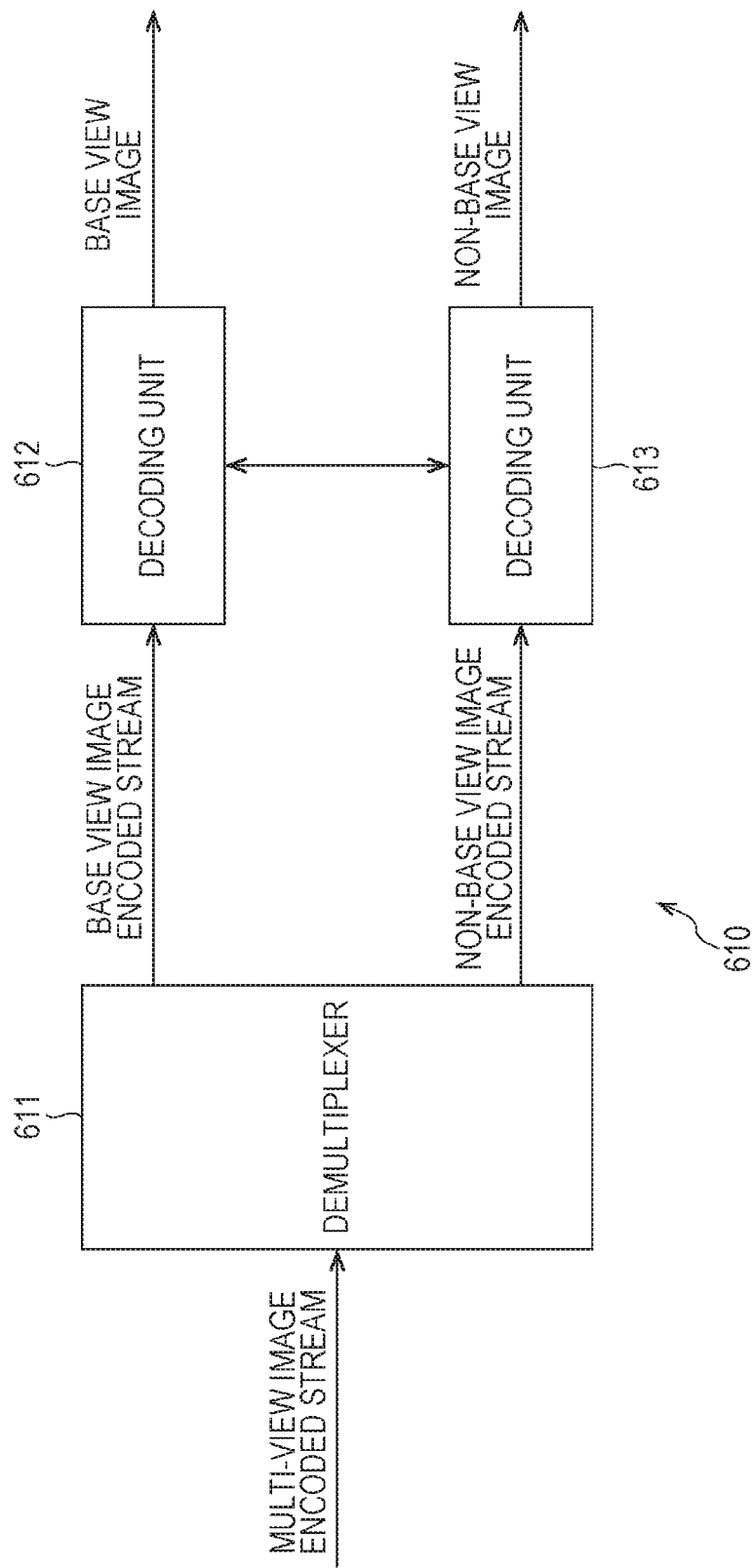
FIG. 29 is a diagram showing an example configuration of a multi-view image decoding device to which the present disclosure is applied.

FIG. 29 is a diagram showing a multi-view image decoding device that performs the above described multi-view image decoding. As shown in FIG. 29, the multi-view image decoding device 610 includes a demultiplexer 611, a decoding unit 612, and a decoding unit 613.

The demultiplexer 611 demultiplexes a multi-view image encoded stream formed by multiplexing a base view image encoded stream and a non-base view image encoded stream, and extracts the base view image encoded stream and the non-base view image encoded stream. The decoding unit 612 decodes the base view image encoded stream extracted by the demultiplexer 611, and obtains a base view image. The decoding unit 613 decodes the non-base view image encoded stream extracted by the demultiplexer 611, and obtains a non-base view image.

The decoding device 110 (FIG. 20) can be used as the decoding unit 612 and the decoding unit 613 of the multi-view image decoding device 610. That is, encoding efficiency in IntraBC can be improved. Also, the decoding unit 612 and the decoding unit 613 can perform decoding (or share flags and parameters), using the same flags and parameters (such as the syntax elements related to processing between images) between the two decoding units. Thus, a reduction in encoding efficiency can be prevented.

Fourth Embodiment (Applications to Hierarchical Image Encoding and Hierarchical Image Decoding)

Figure 30:
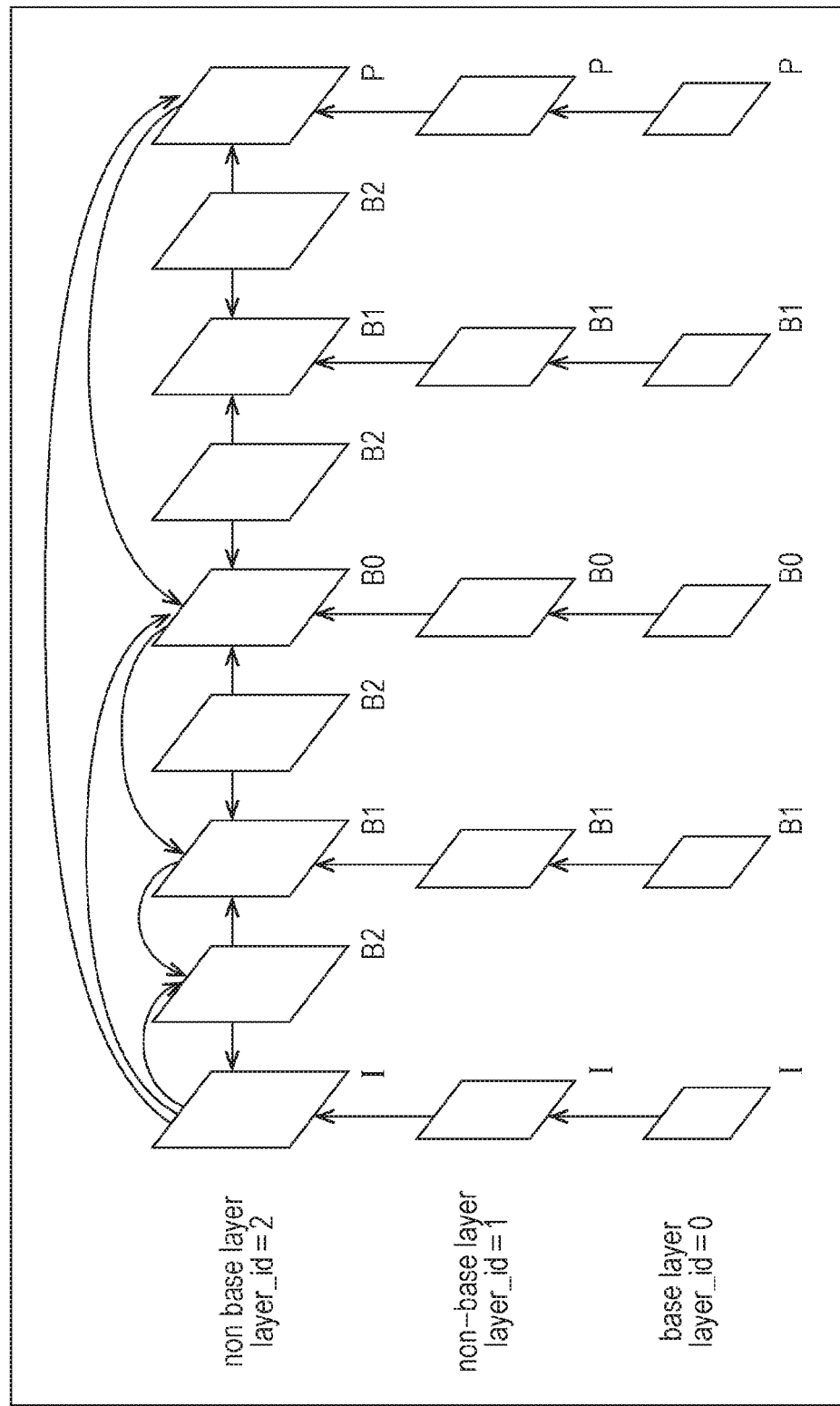
FIG. 30 is a diagram showing an example of a hierarchical image encoding method.

The above described series of processes can be applied to hierarchical image encoding and hierarchical image decoding (scalable encoding and scalable decoding). FIG. 30 shows an example of a hierarchical image encoding method.

Hierarchical image encoding (scalable encoding) is performed to divide an image into layers (hierarchization) and encode the layers one by one in such a manner that a predetermined parameter has a scalable function. Hierarchical image decoding (scalable decoding) is the decoding corresponding to the hierarchical image encoding.

As shown in FIG. 30, in hierarchizing an image, the predetermined parameter having the scalable function serves as the reference, and the single image is divided into images (layers). That is, the hierarchized image (hierarchical image) includes images of layers having different values for the predetermined parameter from one another. The layers of this hierarchical image include a base layer to be encoded/decoded only with the use of an image of its own layer and without the use of images of the other layers, and non-base layers (also referred to as enhancement layers) to be encoded/decoded with the use of images of the other layers. A non-base layer may be processed with the use of an image of a base layer, or may be processed with the use of an image of the other non-base layer.

Normally, a non-base layer is formed with the data of a difference image between its own image and an image of another layer, so as to reduce redundancy. For example, in a case where an image is divided into two layers that are a base layer and an enhancement layer (also referred to as an enhancement layer), an image of lower quality than that of the original image is obtained when only the data of the base layer is used, and the original image (or a high-quality image) is obtained when the data of the base layer and the data of the non-base layer are combined.

As an image is hierarchized in this manner, images with various qualities can be readily obtained in accordance with circumstances. For a terminal with a low processing capacity, such as a portable telephone, image compression information only about a base layer is transmitted so that a moving image with a low spatial and temporal resolution or of poor image quality is reproduced. For a terminal with a high processing capacity, such as a television set or a personal computer, image compression information about a base layer and an enhancement layer is transmitted so that a moving image with a high spatial and temporal resolution or of high image quality can be reproduced. In this manner, image compression information in accordance with the capacity of a terminal or a network can be transmitted from a server, without any transcoding process.

In a case where the example of an hierarchical image shown in FIG. 30 is encoded/decoded, the images of the respective layers are encoded/decoded, and a method according to the above described first embodiment may be applied to the encoding/decoding of the respective layers. In this manner, encoding efficiency in IntraBC can be improved. Thus, encoding efficiency is increased.

Further, in encoding/decoding of the respective layers, the flags and the parameters used in the method according to the above described first embodiment may be shared. More specifically, a VPS, an SPS, a PPS, and the like as encoding information may be shared in encoding/decoding of the respective layers. Necessary information other than those parameter sets may of course be shared in encoding/decoding of the respective layers.

In this manner, transmission of redundant information can be prevented, and the amount (bit rate) of information to be transmitted can be reduced (or a reduction in encoding efficiency can be prevented).

(Scalable Parameter)

Figure 31:
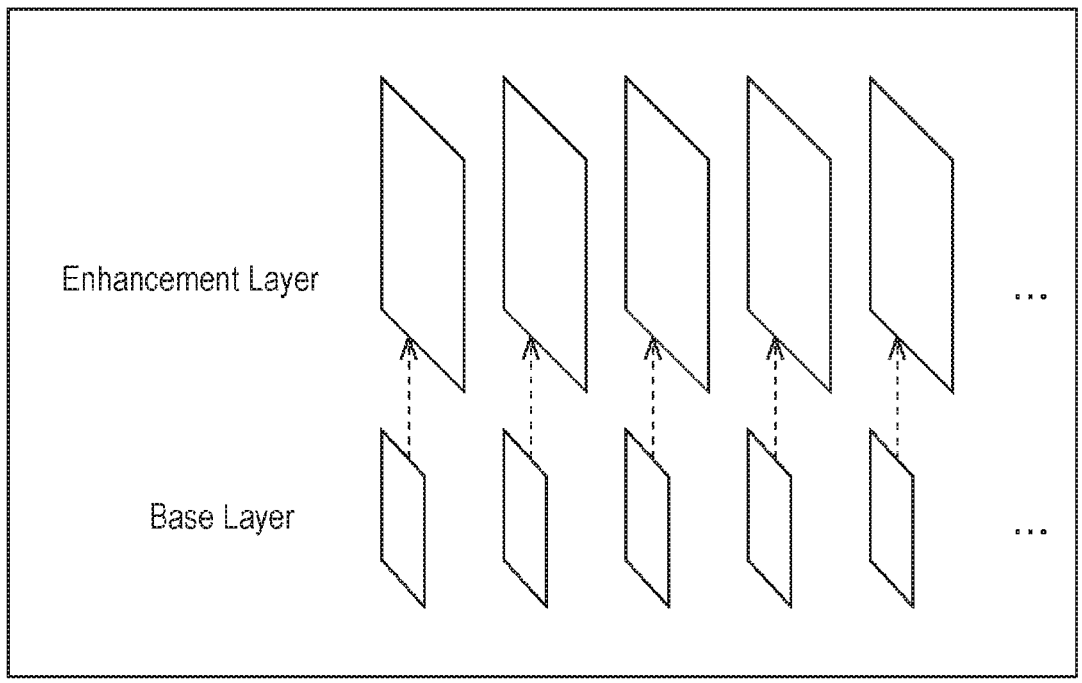
FIG. 31 is a diagram for explaining an example of spatial scalable encoding.

In such hierarchical image encoding and hierarchical image decoding (scalable encoding and scalable decoding), a parameter having a scalable function is used as appropriate. For example, the spatial resolution shown in FIG. 31 may be used as such a parameter (spatial scalability). In the case of this spatial scalability, image resolutions vary among layers. Specifically, in this case, each picture is hierarchized into two layers that are a base layer with a lower spatial resolution than that of the original image, and an enhancement layer that can achieve the original spatial resolution when combined with the base layer, as shown in FIG. 31. This number of layers is of course merely an example, and each picture can be hierarchized into any appropriate number of layers.

Figure 32:
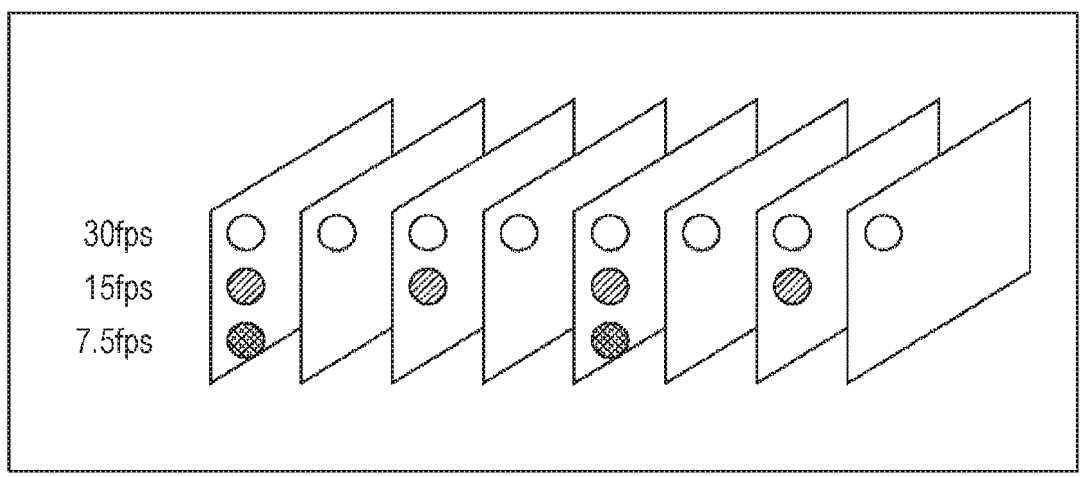
FIG. 32 is a diagram for explaining an example of temporal scalable encoding.

Alternatively, the parameter with such scalability may be temporal resolution (temporal scalability), for example, as shown in FIG. 32. In the case of this temporal scalability, frame rates vary among layers. That is, in this case, each picture is hierarchized into two layers that are a base layer with a lower frame rate than that of the original moving image, and an enhancement layer that can achieve the original frame rate when combined with the base layer, as shown in FIG. 32. This number of layers is of course merely an example, and each picture can be hierarchized into any appropriate number of layers.

Figure 33:
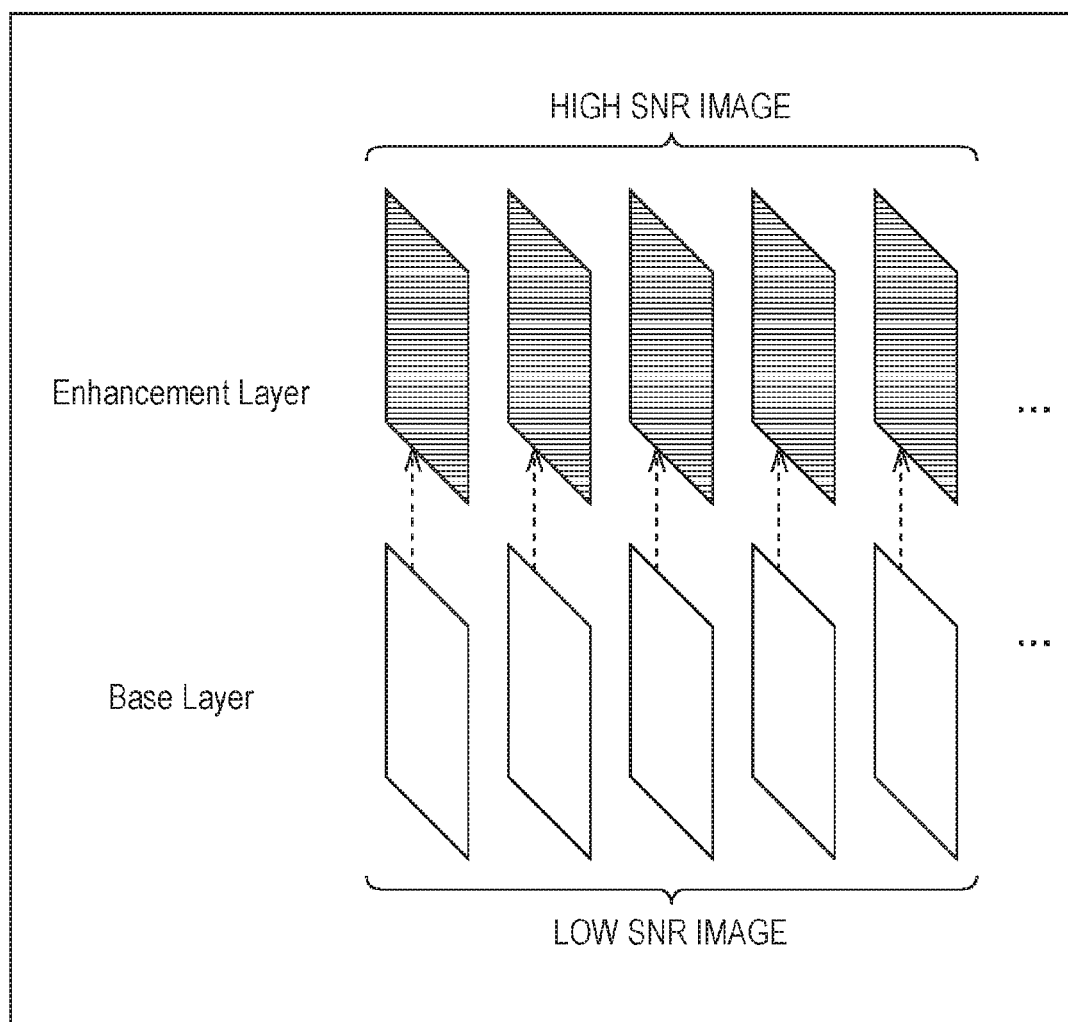
FIG. 33 is a diagram for explaining an example of signal-to-noise ratio scalable encoding.

Further, the parameter with such scalability may be signal-to-noise ratio (SNR) (SNR scalability), for example. In the case of this SNR scalability, SN ratios vary among layers. Specifically, in this case, each picture is hierarchized into two layers that are a base layer with a lower SNR than that of the original image, and an enhancement layer that can achieve the original SNR when combined with the base layer, as shown in FIG. 33. This number of layers is of course merely an example, and each picture can be hierarchized into any appropriate number of layers.

Some other parameter other than the above may of course serve as the parameter with scalability. For example, bit depth may be used as the parameter with scalability (bit-depth scalability). In the case of this bit-depth scalability, bit depths vary among layers. In this case, a base layer is formed with an 8-bit image, and an enhancement layer is added to the base layer, to obtain a 10-bit image, for example.

Alternatively, chroma format may be used as the parameter with scalability (chroma scalability). In the case of this chroma scalability, chroma formats vary among layers. In this case, a base layer is formed with a component image in a 4:2:0 format, and an enhancement layer is added to the base layer, to obtain a component image in a 4:2:2 format, for example.

(Hierarchical Image Encoding Device)

Figure 34:
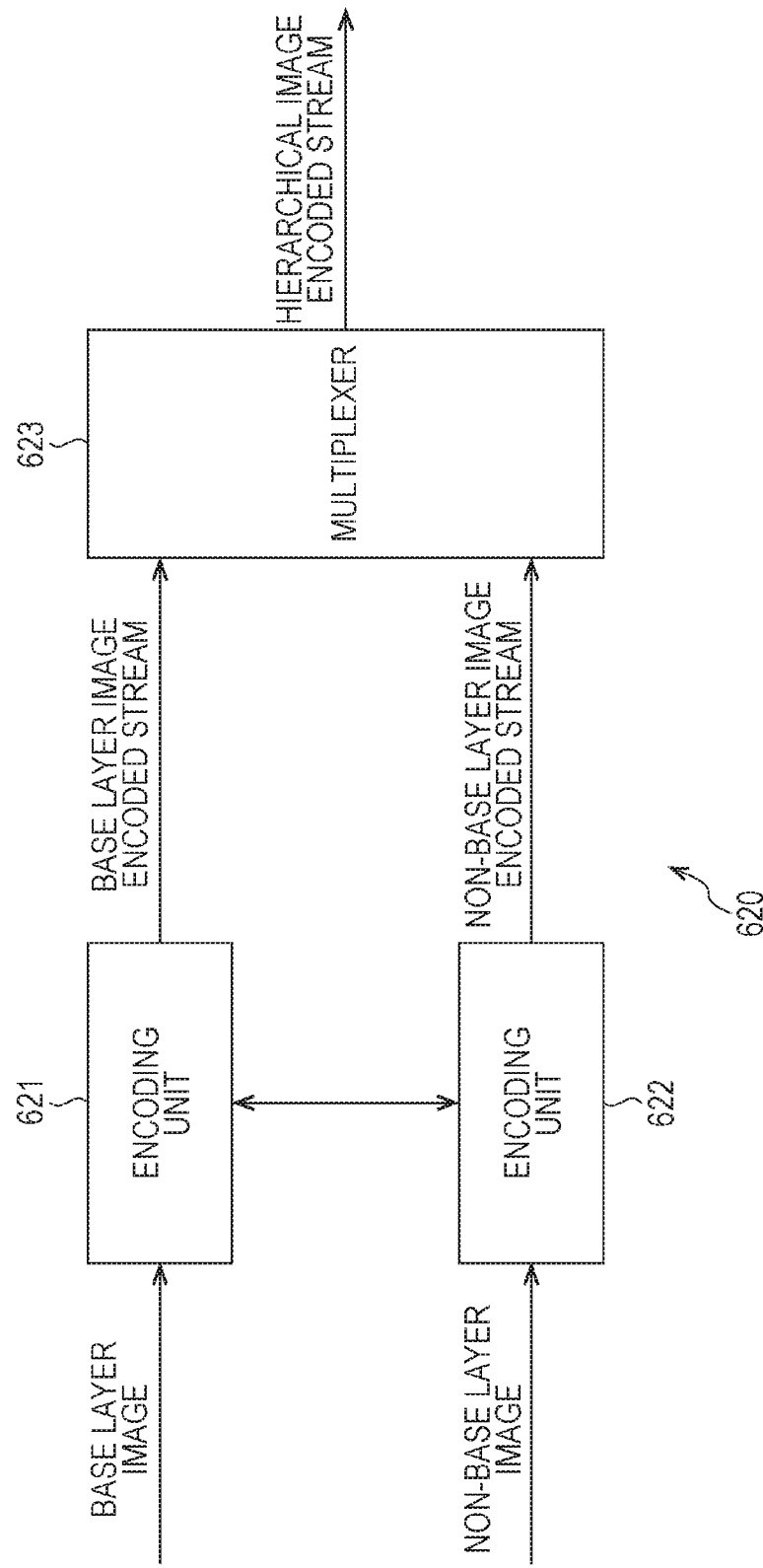
FIG. 34 is a diagram showing an example configuration of a hierarchical image encoding device to which the present disclosure is applied.

FIG. 34 is a diagram showing a hierarchical image encoding device that performs the above described hierarchical image encoding. As shown in FIG. 34, the hierarchical image encoding device 620 includes an encoding unit 621, an encoding unit 622, and a multiplexer 623.

The encoding unit 621 encodes an base layer image, and generates a base layer image encoded stream. The encoding unit 622 encodes a non-base layer image, and generates a non-base layer image encoded stream. The multiplexer 623 multiplexes the base layer image encoded stream generated at the encoding unit 621 and the non-base layer image encoded stream generated at the encoding unit 622, to generate a hierarchical image encoded stream.

The encoding device 10 (FIG. 13) can be used as the encoding unit 621 and the encoding unit 622 of the hierarchical image encoding device 620. That is, encoding efficiency in IntraBC can be improved. Also, the encoding unit 621 and the encoding unit 622 can control a filtering process in intra prediction and the like (or share flags and parameters), using the same flags and parameters (such as the syntax elements related to processing between images) between the two encoding units. Thus, a reduction in encoding efficiency can be prevented.

(Hierarchical Image Decoding Device)

Figure 35:
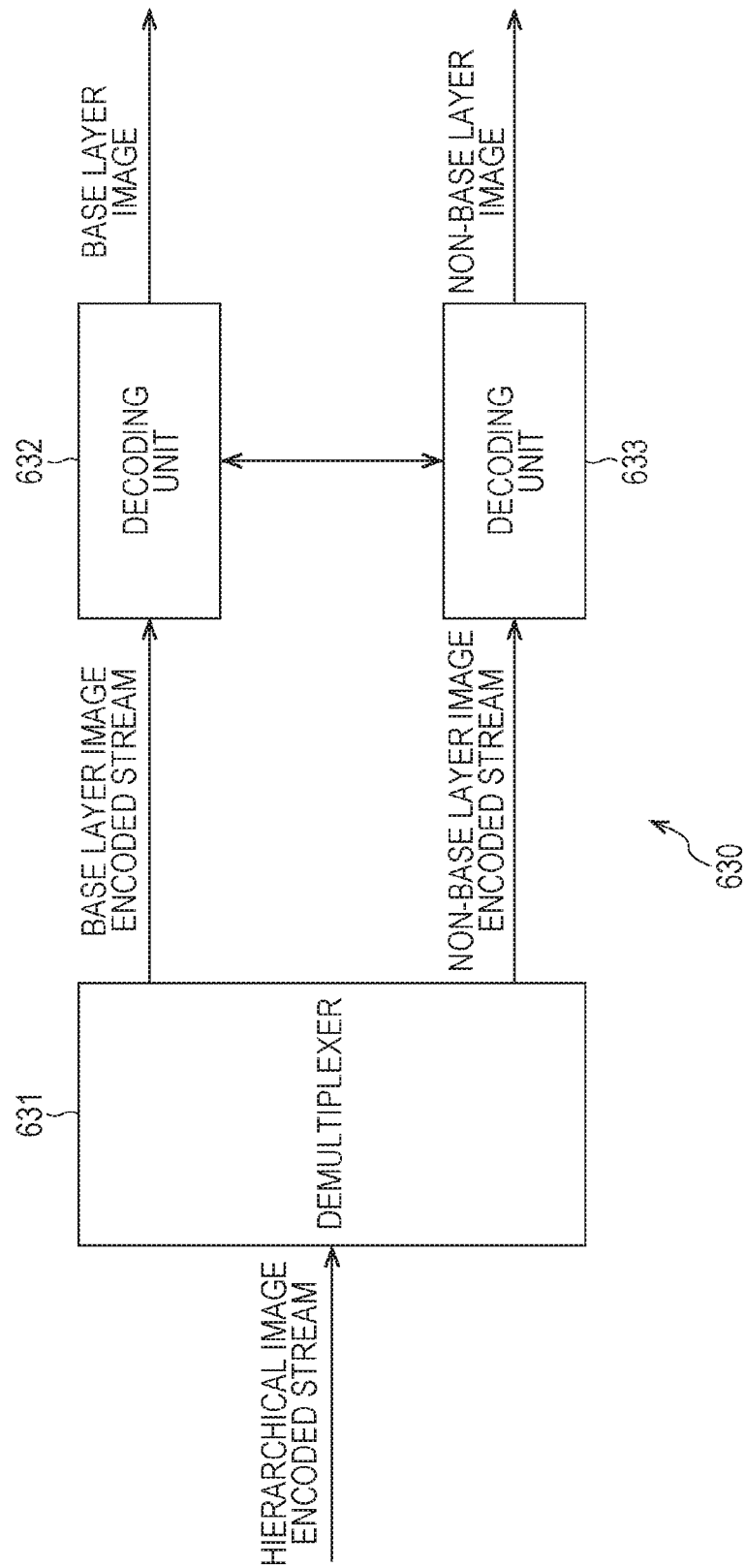
FIG. 35 is a diagram showing an example configuration of a hierarchical image decoding device to which the present disclosure is applied.

FIG. 35 is a diagram showing a hierarchical image decoding device that performs the above described hierarchical image decoding. As shown in FIG. 35, the hierarchical image decoding device 630 includes a demultiplexer 631, a decoding unit 632, and a decoding unit 633.

The demultiplexer 631 demultiplexes a hierarchical image encoded stream formed by multiplexing a base layer image encoded stream and a non-base layer image encoded stream, and extracts the base layer image encoded stream and the non-base layer image encoded stream. The decoding unit 632 decodes the base layer image encoded stream extracted by the demultiplexer 631, and obtains a base layer image. The decoding unit 633 decodes the non-base layer image encoded stream extracted by the demultiplexer 631, and obtains a non-base layer image.

The decoding device 110 (FIG. 20) can be used as the decoding unit 632 and the decoding unit 633 of the hierarchical image decoding device 630. That is, encoding efficiency in IntraBC can be improved. Also, the decoding unit 612 and the decoding unit 613 can perform decoding (or share flags and parameters), using the same flags and parameters (such as the syntax elements related to processing between images) between the two decoding units. Thus, a reduction in encoding efficiency can be prevented.

Fifth Embodiment (Example Configuration of a Television Apparatus)

Figure 36:
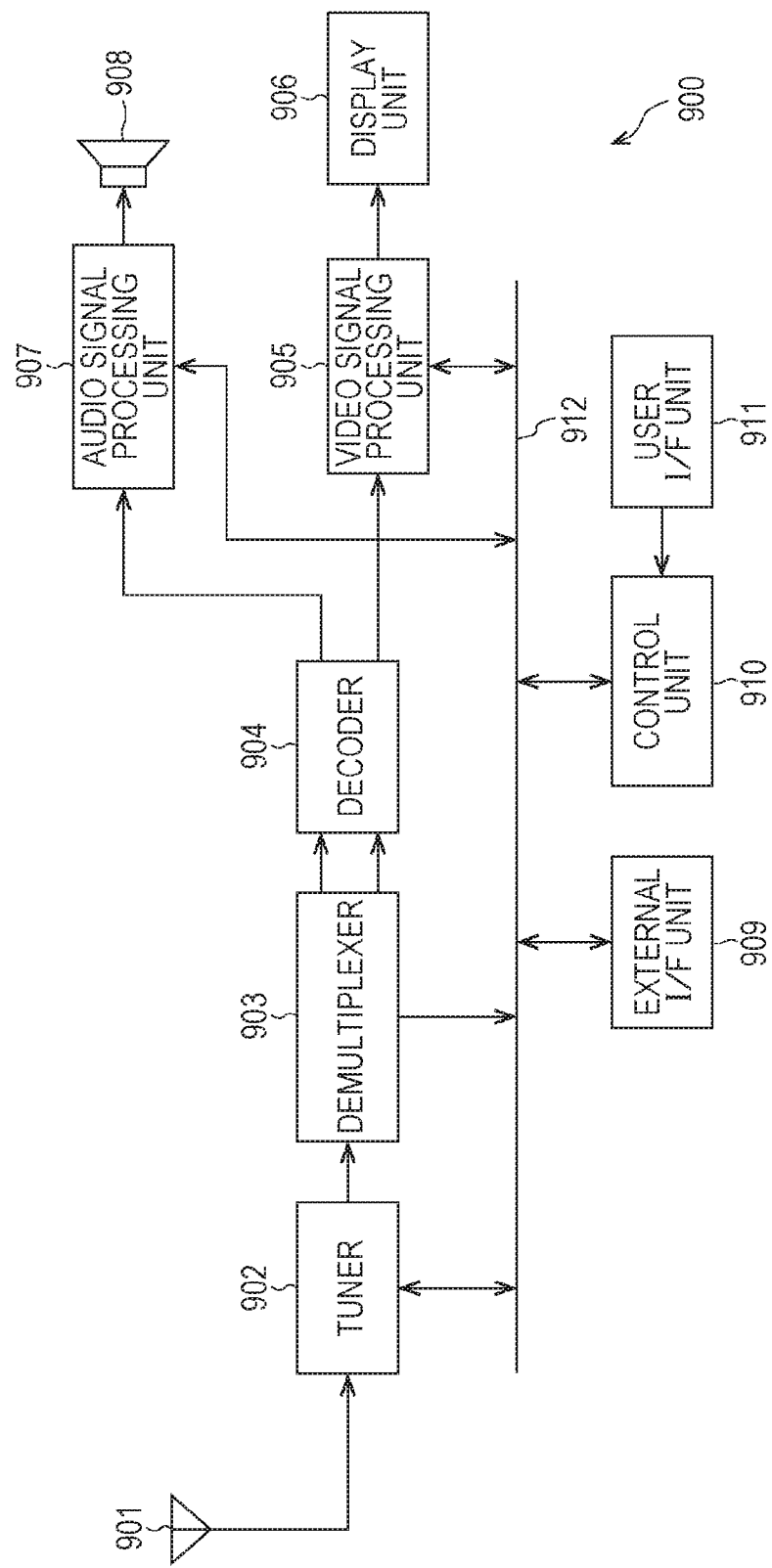
FIG. 36 is a diagram schematically showing an example configuration of a television apparatus to which the present disclosure is applied.

FIG. 36 schematically shows an example configuration of a television apparatus to which the present disclosure is applied. The television apparatus 900 includes an antenna 901, a tuner 902, a demultiplexer 903, a decoder 904, a video signal processing unit 905, a display unit 906, an audio signal processing unit 907, a speaker 908, and an external interface unit 909. The television apparatus 900 further includes a control unit 910, a user interface unit 911, and the like.

The tuner 902 selects a desired channel from broadcast wave signals received at the antenna 901, and performs demodulation. The resultant encoded bitstream is output to the demultiplexer 903.

The demultiplexer 903 extracts the video and audio packets of the show to be viewed from the encoded bitstream, and outputs the data of the extracted packets to the decoder 904. The demultiplexer 903 also supplies a packet of data such as Electronic Program Guide (EPG) to the control unit 910. It should be noted that, where scrambling is performed, the demultiplexer or the like cancels the scrambling.

The decoder 904 performs a packet decoding process, and outputs the video data generated through the decoding process to the video signal processing unit 905, and the audio data to the audio signal processing unit 907.

The video signal processing unit 905 subjects the video data to denoising and video processing or the like in accordance with user settings. The video signal processing unit 905 generates video data of the show to be displayed on the display unit 906, or generates image data or the like through a process based on an application supplied via a network. The video signal processing unit 905 also generates video data for displaying a menu screen or the like for item selection, and superimposes the generated video data on the video data of the show. In accordance with the video data generated in this manner, the video signal processing unit 905 generates a drive signal, to drive the display unit 906.

In accordance with the drive signal from the video signal processing unit 905, the display unit 906 drives a display device (a liquid crystal display element, for example) to display the video of the show.

The audio signal processing unit 907 subjects the audio data to predetermined processing such as denoising, and performs a D/A conversion process and an amplification process on the processed audio data. The resultant audio data is supplied as an audio output to the speaker 908.

The external interface unit 909 is an interface for a connection with an external device or a network, and transmits and receives data such as video data and audio data.

The user interface unit 911 is connected to the control unit 910. The user interface unit 911 is formed with operation switches, a remote control signal reception unit, and the like, and supplies an operating signal according to a user operation to the control unit 910.

The control unit 910 is formed with a central processing unit (CPU), a memory, and the like. The memory stores the program to be executed by the CPU, various kinds of data necessary for the CPU to perform processing, EPG data, data obtained via a network, and the like. The program stored in the memory is read and executed by the CPU at a predetermined time, such as the time of activation of the television apparatus 900. The CPU executes the program to control the respective components so that the television apparatus 900 operates in accordance with a user operation.

It should be noted that, in the television apparatus 900, a bus 912 is provided for connecting the tuner 902, the demultiplexer 903, the video signal processing unit 905, the audio signal processing unit 907, the external interface unit 909, and the like, to the control unit 910.

In the television apparatus designed as above, the decoder 904 has the functions of a decoding device (a decoding method) of this application. Thus, encoding efficiency in IntraBC can be improved in an encoded stream decoding process.

Sixth Embodiment (Example Configuration of a Portable Telephone Apparatus)

Figure 37:
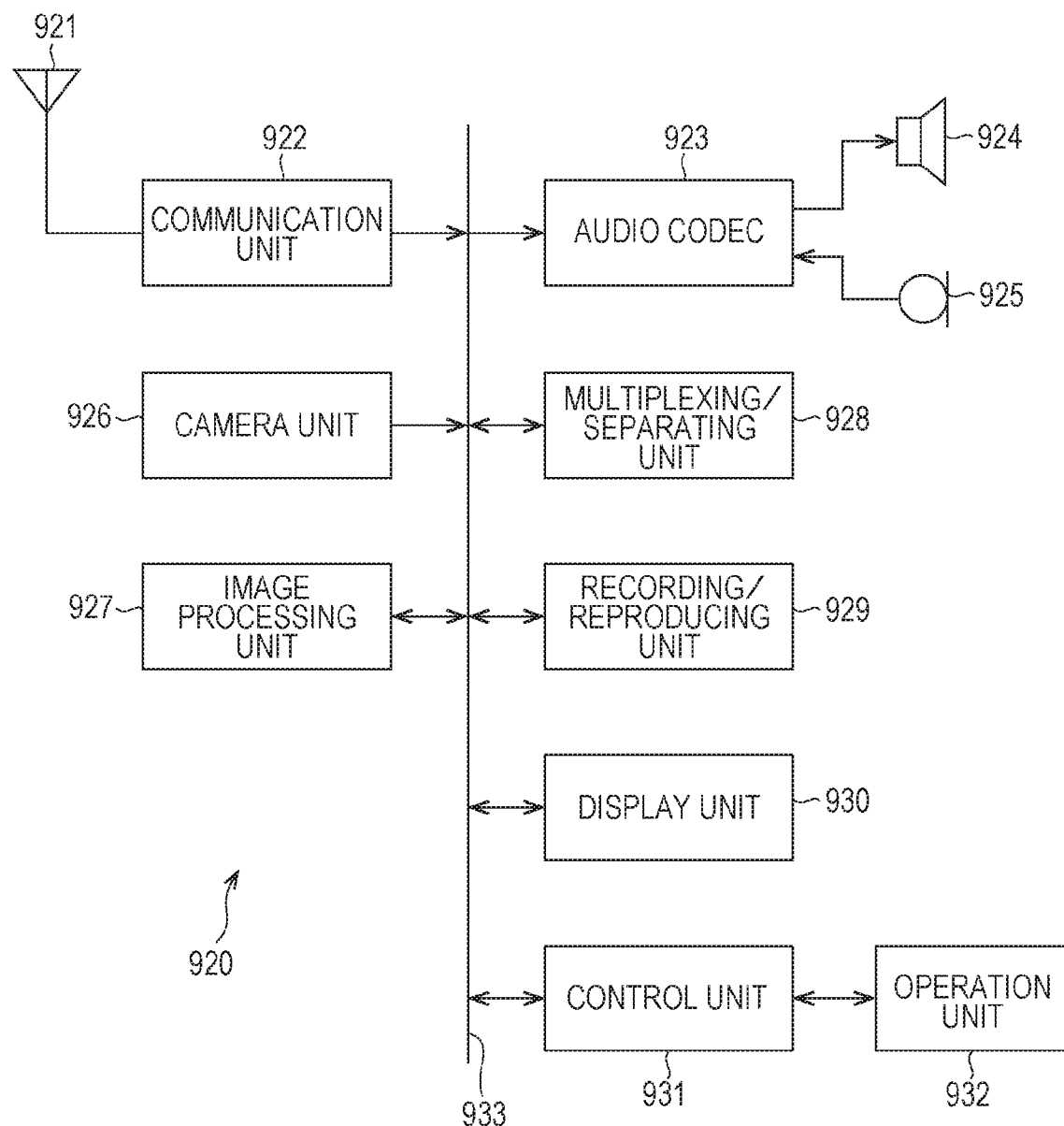
FIG. 37 is a diagram schematically showing an example configuration of a portable telephone apparatus to which the present disclosure is applied.

FIG. 37 schematically shows an example configuration of a portable telephone apparatus to which the present disclosure is applied. The portable telephone apparatus 920 includes a communication unit 922, an audio codec 923, a camera unit 926, an image processing unit 927, a multiplexing/separating unit 928, a recording/reproducing unit 929, a display unit 930, and a control unit 931. Those components are connected to one another via a bus 933.

Also, an antenna 921 is connected to the communication unit 922, and a speaker 924 and a microphone 925 are connected to the audio codec 923. Further, an operation unit 932 is connected to the control unit 931.

The portable telephone apparatus 920 performs various kinds of operations such as transmission and reception of audio signals, transmission and reception of electronic mail and image data, image capturing, and data recording, in various kinds of modes such as an audio communication mode and a data communication mode.

In the audio communication mode, an audio signal generated at the microphone 925 is converted into audio data, and the data is compressed at the audio codec 923. The compressed data is supplied to the communication unit 922. The communication unit 922 performs a modulation process, a frequency conversion process, and the like on the audio data, to generate a transmission signal. The communication unit 922 also supplies the transmission signal to the antenna 921, and the transmission signal is transmitted to a base station (not shown). The communication unit 922 also amplifies a signal received at the antenna 921, and performs a frequency conversion process, a demodulation process, and the like. The resultant audio data is supplied to the audio codec 923. The audio codec 923 decompresses audio data, and converts the audio data into an analog audio signal to be output to the speaker 924.

In a case where mail transmission is performed in the data communication mode, the control unit 931 receives text data that is input by operating the operation unit 932, and the input text is displayed on the display unit 930. In addition, in accordance with a user instruction or the like through the operation unit 932, the control unit 931 generates and supplies mail data to the communication unit 922. The communication unit 922 performs a modulation process, a frequency conversion process, and the like on the mail data, and transmits the resultant transmission signal through the antenna 921. The communication unit 922 also amplifies a signal received at the antenna 921, and performs a frequency conversion process, a demodulation process, and the like, to decompress the mail data. This mail data is supplied to the display unit 930, and the mail content is displayed.

It should be noted that the portable telephone apparatus 920 can cause the recording/reproducing unit 929 to store received mail data into a storage medium. The storage medium is a rewritable storage medium. For example, the storage medium may be a semiconductor memory such as a RAM or an internal flash memory, a hard disk, or a removable medium such as a magnetic disk, a magnetooptical disk, an optical disk, a universal serial bus (USB) memory, or a memory card.

In a case where image data is transmitted in the data communication mode, image data generated at the camera unit 926 is supplied to the image processing unit 927. The image processing unit 927 performs an encoding process on the image data, to generate encoded data.

The multiplexing/separating unit 928 multiplexes the encoded data generated at the image processing unit 927 and the audio data supplied from the audio codec 923 by a predetermined technique, and supplies the multiplexed data to the communication unit 922. The communication unit 922 performs a modulation process, a frequency conversion process, and the like on the multiplexed data, and transmits the resultant transmission signal through the antenna 921. The communication unit 922 also amplifies a signal received at the antenna 921, and performs a frequency conversion process, a demodulation process, and the like, to decompress the multiplexed data. This multiplexed data is supplied to the multiplexing/separating unit 928. The multiplexing/separating unit 928 divides the multiplexed data, and supplies the encoded data to the image processing unit 927, and the audio data to the audio codec 923. The image processing unit 927 performs a decoding process on the encoded data, to generate image data. This image data is supplied to the display unit 930, to display the received images. The audio codec 923 converts the audio data into an analog audio signal, and supplies the analog audio signal to the speaker 924, so that the received sound is output.

In the portable telephone apparatus designed as above, the image processing unit 927 has the functions of an encoding device and a decoding device (an encoding method and a decoding method) of this application. Thus, encoding efficiency in IntraBC can be improved.

Seventh Embodiment (Example Configuration of a Recording/Reproducing Apparatus)

Figure 38:
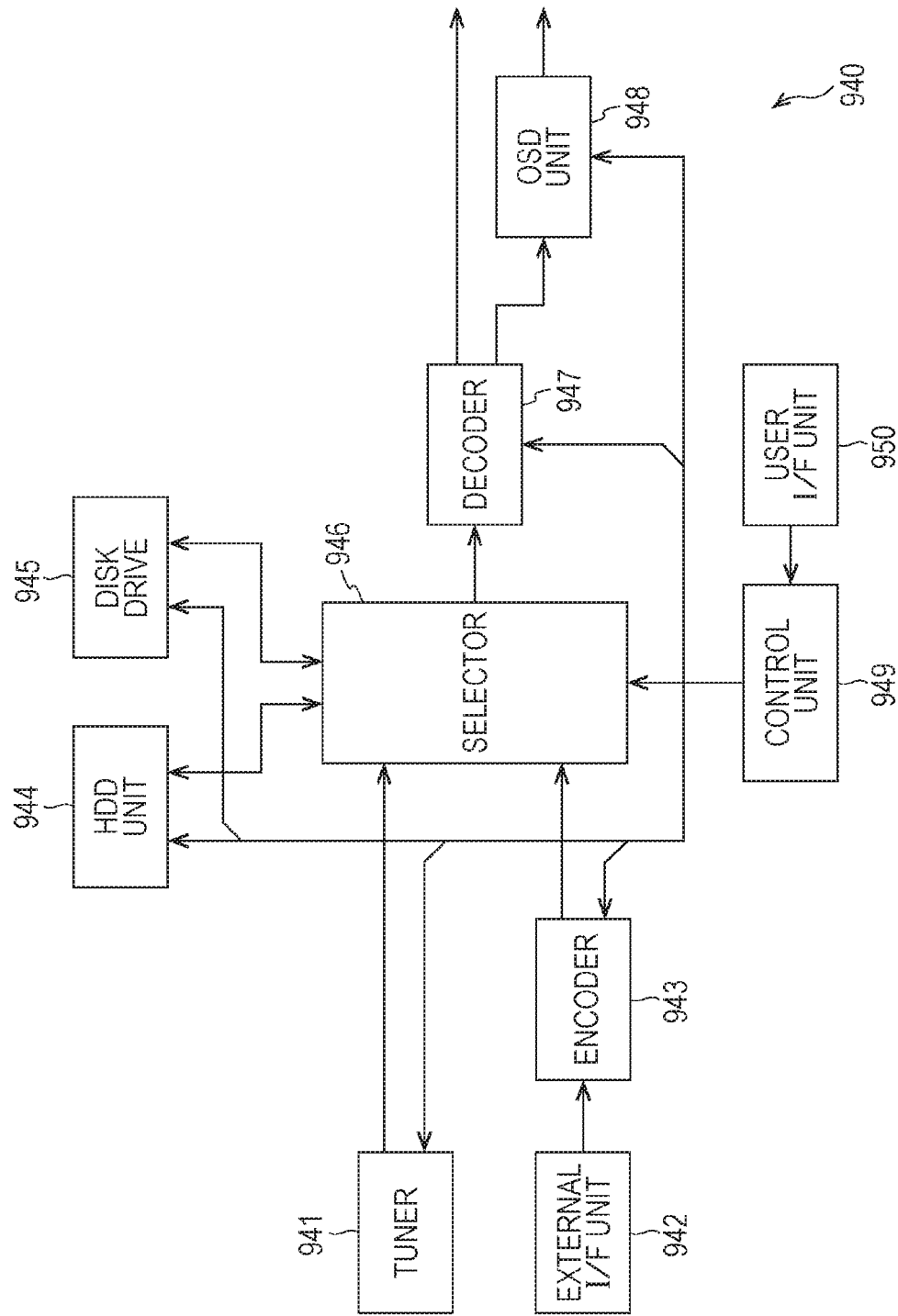
FIG. 38 is a diagram schematically showing an example configuration of a recording/reproducing apparatus to which the present disclosure is applied.

FIG. 38 schematically shows an example configuration of a recording/reproducing apparatus to which the present disclosure is applied. The recording/reproducing apparatus 940 records the audio data and video data of a received broadcast show on a recording medium, for example, and provides the recorded data to a user at the time according to an instruction from the user. The recording/reproducing apparatus 940 can also obtain audio data and video data from another device, for example, and record the data on a recording medium. Further, the recording/reproducing apparatus 940 decodes and outputs audio data and video data recorded on a recording medium, so that a monitor device or the like can display images and outputs sound.

The recording/reproducing apparatus 940 includes a tuner 941, an external interface unit 942, an encoder 943, a hard disk drive (HDD) unit 944, a disk drive 945, a selector 946, a decoder 947, an on-screen display (OSD) unit 948, a control unit 949, and a user interface unit 950.

The tuner 941 selects a desired channel from broadcast signals received at an antenna (not shown). The tuner 941 demodulates the received signal of the desired channel, and outputs the resultant encoded bitstream to the selector 946.

The external interface unit 942 is formed with at least one of an IEEE1394 interface, a network interface unit, a USB interface, a flash memory interface, and the like. The external interface unit 942 is an interface for a connection with an external device, a network, a memory card, or the like, and receives data such as video data and audio data to be recorded, and the like.

The encoder 943 performs predetermined encoding on video data and audio data that are supplied from the external interface unit 942 and are not encoded, and outputs an encoded bitstream to the selector 946.

The HDD unit 944 records content data such as videos and sound, various kinds of programs, other data, and the like on an internal hard disk, and reads the data from the hard disk at the time of reproduction or the like.

The disk drive 945 performs signal recording and reproduction on a mounted optical disk. The optical disk may be a DVD disk (such as a DVD-Video, a DVD-RAM, a DVD-R, a DVD-RW, a DVD+R, or a DVD+RW) or a Blu-ray (a registered trade name) disk, for example.

The selector 946 selects an encoded bitstream from the tuner 941 or the encoder 943 at the time of video and audio recording, and supplies the encoded bitstream to either the HDD unit 944 or the disk drive 945. The selector 946 also supplies an encoded bitstream output from the HDD unit 944 or the disk drive 945 to the decoder 947 at the time of video and audio reproduction.

The decoder 947 performs a decoding process on an encoded bitstream. The decoder 947 supplies the video data generated by performing the decoding process to the OSD unit 948. The decoder 947 also outputs the audio data generated by performing the decoding process.

The OSD unit 948 generates video data for displaying a menu screen or the like for item selection, and superimposes the video data on video data output from the decoder 947.

The user interface unit 950 is connected to the control unit 949. The user interface unit 950 is formed with operation switches, a remote control signal reception unit, and the like, and supplies an operating signal according to a user operation to the control unit 949.

The control unit 949 is formed with a CPU, a memory, and the like. The memory stores the program to be executed by the CPU and various kinds of data necessary for the CPU to perform processing. The program stored in the memory is read and executed by the CPU at a predetermined time such as the time of activation of the recording/reproducing apparatus 940. The CPU executes the program to control the respective components so that the recording/reproducing apparatus 940 operates in accordance with a user operation.

In the recording/reproducing apparatus designed as above, the encoder 943 has the functions of an encoding device (an encoding method) of this application. Thus, encoding efficiency in IntraBC can be improved. Also, the decoder 947 also has the functions of a decoding device (a decoding method) of this application. Thus, encoding efficiency in IntraBC can be improved.

Eighth Embodiment (Example Configuration of an Imaging Apparatus)

Figure 39:
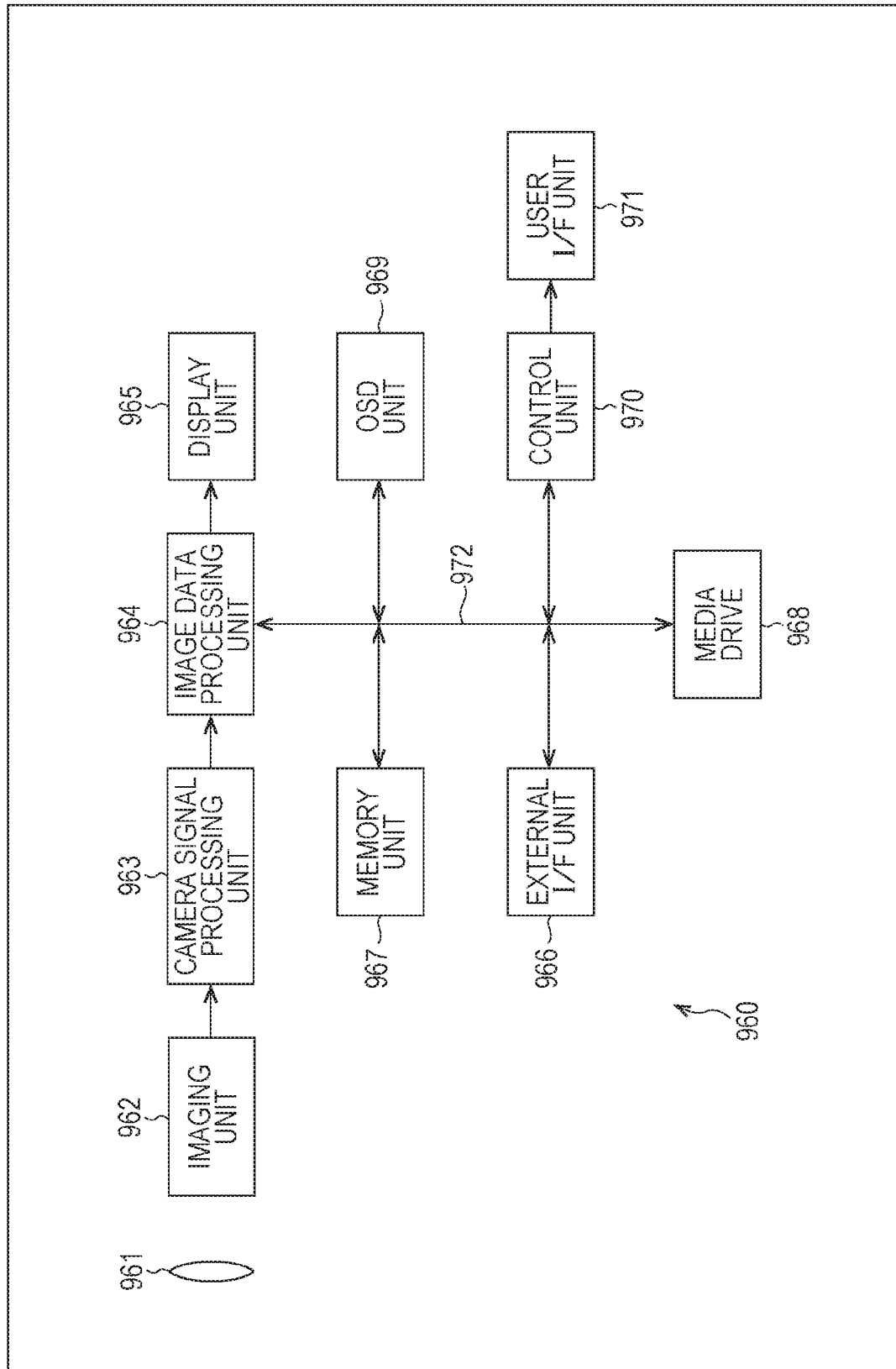
FIG. 39 is a diagram schematically showing an example configuration of an imaging apparatus to which the present disclosure is applied.

FIG. 39 schematically shows an example configuration of an imaging apparatus to which the present disclosure is applied. An imaging apparatus 960 takes an image of an object, and causes a display unit to display the image of the object or records the image as image data on a recording medium.

The imaging apparatus 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. In addition, a user interface unit 971 is connected to the control unit 970. Further, the image data processing unit 964, the external interface unit 966, the memory unit 967, the media drive 968, the OSD unit 969, the control unit 970, and the like are connected to one another via a bus 972.

The optical block 961 is formed with a focus lens, a diaphragm, and the like. The optical block 961 forms an optical image of an object on the imaging surface of the imaging unit 962. Formed with a CCD or a CMOS image sensor, the imaging unit 962 generates an electrical signal in accordance with the optical image through a photoelectric conversion, and supplies the electrical signal to the camera signal processing unit 963.

The camera signal processing unit 963 performs various kinds of camera signal processing, such as a knee correction, a gamma correction, and a color correction, on the electrical signal supplied from the imaging unit 962. The camera signal processing unit 963 supplies the image data subjected to the camera signal processing, to the image data processing unit 964.

The image data processing unit 964 performs an encoding process on the image data supplied from the camera signal processing unit 963. The image data processing unit 964 supplies the encoded data generated through the encoding process to the external interface unit 966 and the media drive 968. The image data processing unit 964 also performs a decoding process on the encoded data supplied from the external interface unit 966 and the media drive 968. The image data processing unit 964 supplies the image data generated through the decoding process to the display unit 965. The image data processing unit 964 also performs a process to supply the image data supplied from the camera signal processing unit 963 to the display unit 965, or superimposes display data obtained from the OSD unit 969 on the image data and supplies the image data to the display unit 965.

The OSD unit 969 generates a menu screen formed with symbols, characters, or figures, or display data such as icons, and outputs such data to the image data processing unit 964.

The external interface unit 966 is formed with a USB input/output terminal, for example, and is connected to a printer when image printing is performed. A drive is also connected to the external interface unit 966 where necessary, and a removable medium such as a magnetic disk or an optical disk is mounted on the drive as appropriate. A computer program read from such a removable disk is installed where necessary. Further, the external interface unit 966 includes a network interface connected to a predetermined network, such as a LAN or the internet. The control unit 970 reads encoded data from the media drive 968 in accordance with an instruction from the user interface unit 971, for example, and can supply the encoded data from the external interface unit 966 to another apparatus connected thereto via a network. The control unit 970 can also obtain, via the external interface unit 966, encoded data or image data supplied from another apparatus via a network, and supply the encoded data or image data to the image data processing unit 964.

A recording medium to be driven by the media drive 968 may be a readable/rewritable removable medium such as a magnetic disk, a magnetooptical disk, an optical disk, or a semiconductor memory. In addition, the recording medium may be any type of removable medium, and may be a tape device, a disk, or a memory card. The recording medium may of course be a non-contact integrated circuit (IC) card or the like.

Alternatively, the media drive 968 and a recording medium may be integrated, and may be formed with an immobile storage medium, such as an internal hard disk drive or a solid state drive (SSD).

The control unit 970 is formed with a CPU. The memory unit 967 stores the program to be executed by the control unit 970, various kinds of data necessary for the control unit 970 to perform processing, and the like. The program stored in the memory unit 967 is read and executed by the control unit 970 at a predetermined time, such as the time of activation of the imaging apparatus 960. The control unit 970 executes the program to control the respective components so that the imaging apparatus 960 operates in accordance with a user operation.

In the imaging apparatus designed as above, the image data processing unit 964 has the functions of an encoding device and a decoding device (an encoding method and a decoding method) of this application. Thus, encoding efficiency in IntraBC can be improved in encoding or decoding of an encoded stream.

<Example Applications of Scalable Encoding>

(First System)

Next, specific examples of use of scalable encoded data subjected to scalable encoding (hierarchical encoding) are described. Scalable encoding is used for selecting data to be transmitted, as shown in the example in FIG. 40.

Figure 40:
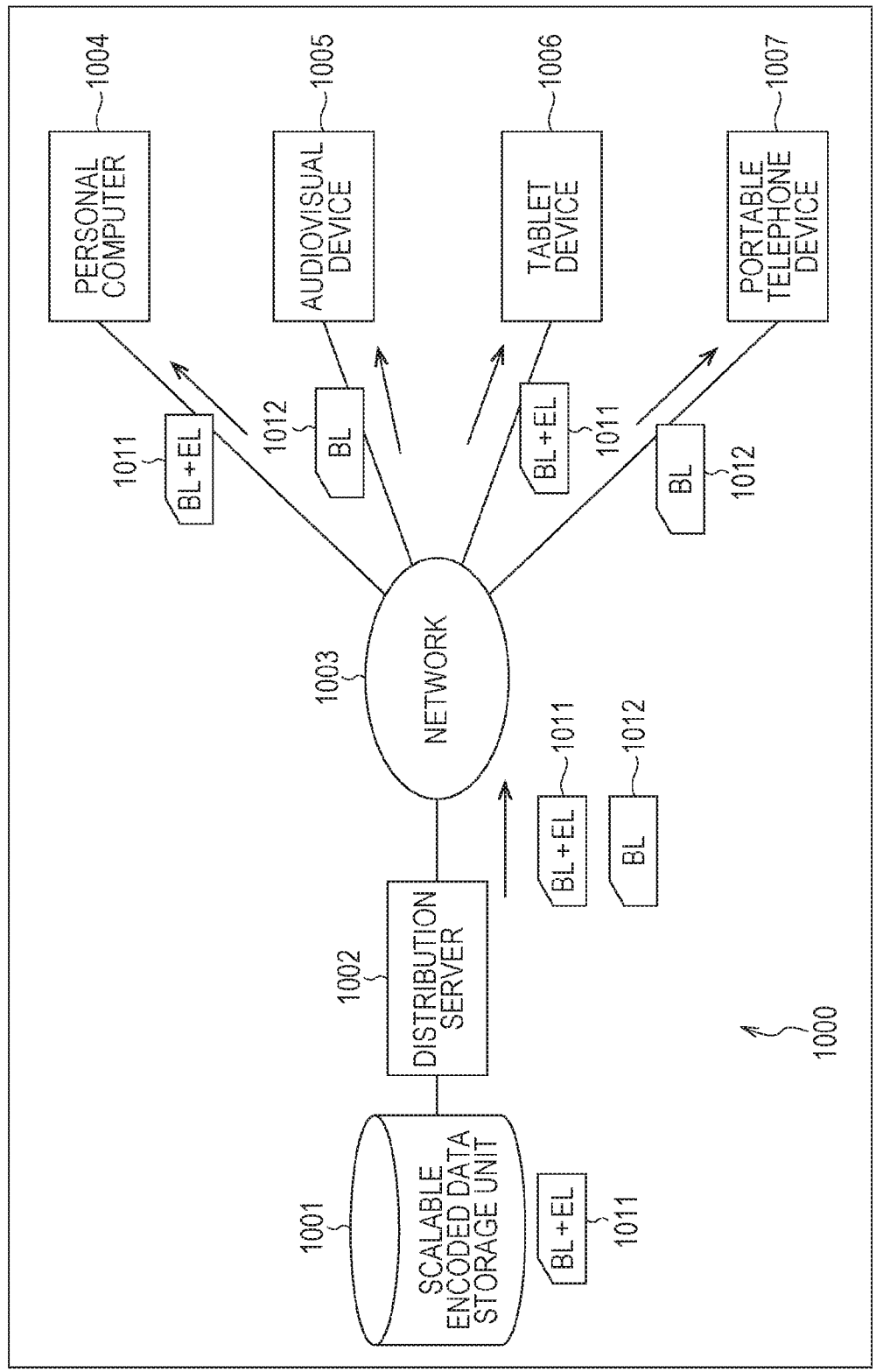
FIG. 40 is a block diagram showing an example of use of scalable encoding.

In the data transmission system 1000 shown in FIG. 40, a distribution server 1002 reads scalable encoded data stored in a scalable encoded data storage unit 1001, and distributes the scalable encoded data to a terminal, such as a personal computer 1004, an audiovisual (AV) device 1005, a tablet device 1006, or a portable telephone device 1007, via a network 1003.

In doing so, the distribution server 1002 selects and transmits encoded data of appropriate quality, in accordance with the capacity of the terminal device, the communication environment, and the like. If the distribution server 1002 transmits unnecessarily high-quality data, the terminal device does not necessarily obtain a high-quality image, and such high-quality data transmission might cause a delay or an overflow. Also, such high-quality data might unnecessarily occupy a communication band, or unnecessarily increase the load on the terminal device. If the distribution server 1002 transmits unnecessarily low-quality data, on the other hand, the terminal device might fail to obtain an image of sufficiently high quality. Therefore, the distribution server 1002 reads scalable encoded data stored in the scalable encoded data storage unit 1001, and transmits the read scalable encoded data as encoded data of appropriate quality for the capacity of the terminal device, the communication environment, and the like.

For example, the scalable encoded data storage unit 1001 stores scalable encoded data (BL+EL) 1011 that has been scalably encoded. The scalable encoded data (BL+EL) 1011 is encoded data containing both a base layer and an enhancement layer, and can provide both an image of the base layer and an image of the enhancement layer when decoded.

The distribution server 1002 selects an appropriate layer in accordance with the capacity of the terminal device to transmit data, the communication environment, and the like, and reads the data of the layer. For example, for the personal computer 1004 and the tablet device 1006 with high processing capacity, the distribution server 1002 reads the high-quality scalable encoded data (BL+EL) 1011 from the scalable encoded data storage unit 1001, and transmits the scalable encoded data (BL+EL) 1011 as it is. On the other hand, for the AV device 1005 and the portable telephone device 1007 with low processing capacity, for example, the distribution server 1002 extracts the data of the base layer from the scalable encoded data (BL+EL) 1011, and transmits the extracted data as scalable encoded data (BL) 1012 that is the data of the same content as the scalable encoded data (BL+EL) 1011 but is poorer in quality than the scalable encoded data (BL+EL) 1011.

As scalable encoded data is used in this manner, the data amount can be easily adjusted. Thus, a delay and an overflow can be prevented, and an unnecessary increase in the load on a terminal device or a communication medium can be prevented. Also, the scalable encoded data (BL+EL) 1011 has redundancy reduced between layers, and accordingly, the data amount can be made smaller than that in a case where the encoded layer of each layer is handled as separate data. Thus, the storage area of the scalable encoded data storage unit 1001 can be used with higher efficiency.

It should be noted that various devices can be used as terminal devices, such as the terminal devices from the personal computer 1004 to the portable telephone device 1007, and therefore, hardware performance varies among the terminal devices. Since the applications to be executed by the terminal devices vary, and software performance also varies. Further, the network 1003 serving as a communication medium may be a wired or wireless communication network such as the Internet or a Local Area Network (LAN), or any communication network system including both a wired network and a wireless network. Data transmission capacity varies among the communication networks. Data transmission capacity might further vary with other communications and the like.

In view of this, the distribution server 1002 may communicate with the terminal device as the data transmission destination before starting data transmission, and obtain information related to the capacity of the terminal device, such as the hardware performance of the terminal device and the performance of the applications (software) to be executed by the terminal device, and information related to the communication environment, such as the bandwidth that can be used by the network 1003. Further, in accordance with the information obtained here, the distribution server 1002 may select an appropriate layer.

It should be noted that the layer extraction may be performed in a terminal device. For example, the personal computer 1004 may decode the transmitted scalable encoded data (BL+EL) 1011, and display an image of the base layer and an image of the enhancement layer. Also, the personal computer 1004 may extract the scalable encoded data (BL) 1012 of the base layer from the transmitted scalable encoded data (BL+EL) 1011, and store the scalable encoded data (BL) 1012, transfer the scalable encoded data (BL) 1012 to another device, or decode the scalable encoded data (BL) 1012 to display an image of the base layer.

The numbers of scalable encoded data storage units 1001, distribution servers 1002, networks 1003, and terminal devices may of course be determined as appropriate. Also, in the above described example, the distribution server 1002 transmits data to terminal devices. However, examples of use are not limited to that. The data transmission system 1000 may be any appropriate system that selects an appropriate layer in accordance with the capacity of a terminal device, the communication environment, and the like, when transmitting encoded data subjected to scalable encoding to the terminal device.

(Second System)

Figure 41:
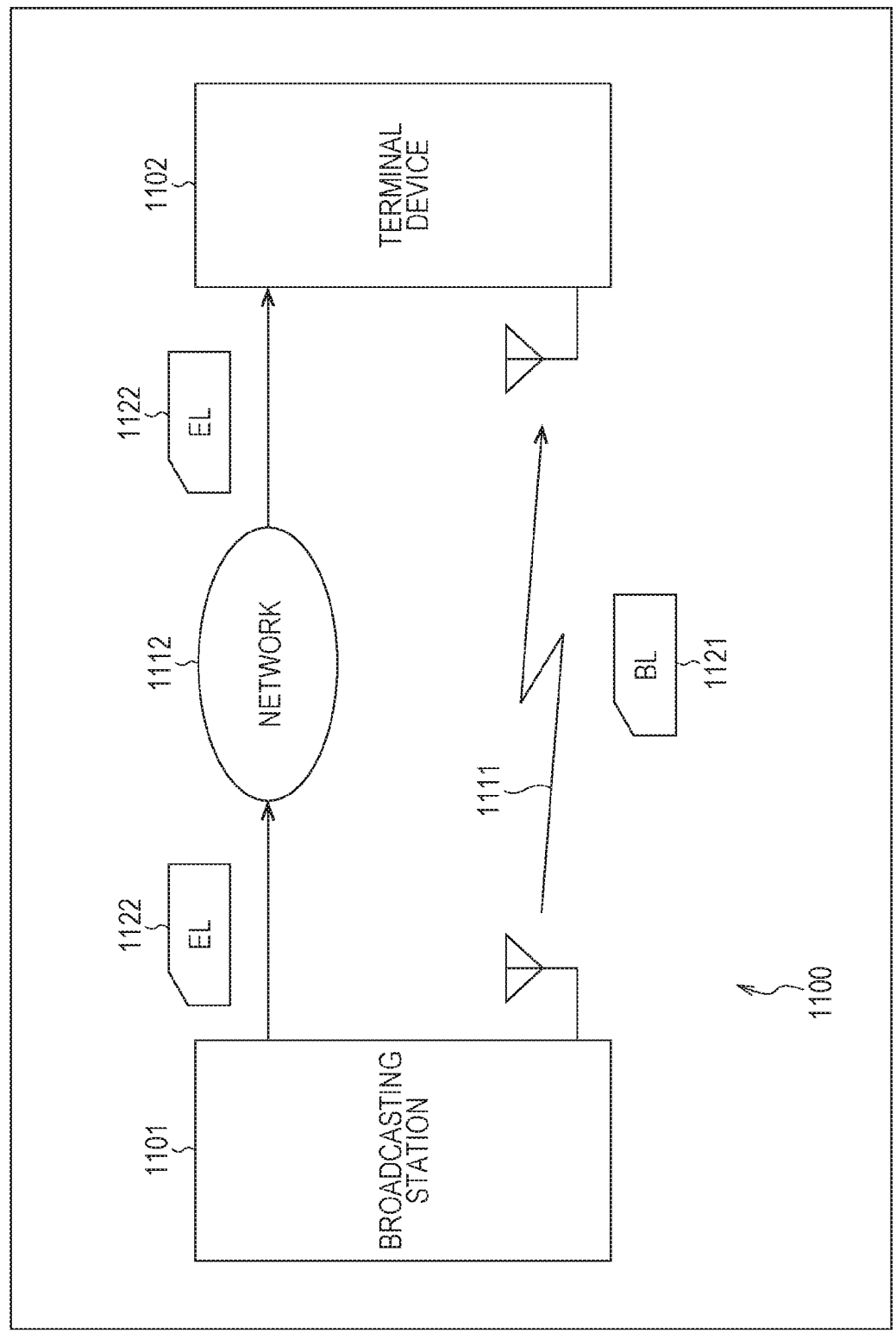
FIG. 41 is a block diagram showing another example of use of scalable encoding.

Scalable encoding is also used for transmission via communication media, as shown in the example in FIG. 41.

In the data transmission system 1100 shown in FIG. 41, a broadcasting station 1101 transmits the scalable encoded data (BL) 1121 of the base layer through a terrestrial broadcast 1111. The broadcasting station 1101 also transmits the scalable encoded data (EL) 1122 of an enhancement layer (after packetizing the scalable encoded data (EL) 1122) via a network 1112 that is formed with a wired and/or wireless communication network.

A terminal device 1102 has a function to receive the terrestrial broadcast 1111 from the broadcasting station 1101, and receives the scalable encoded data (BL) 1121 of the base layer transmitted through the terrestrial broadcast 1111. The terminal device 1102 further has a communication function to perform communication via the network 1112, and receives the scalable encoded data (EL) 1122 of the enhancement layer transmitted via the network 1112.

In accordance with the user instruction or the like, the terminal device 1102 obtains an image by decoding the scalable encoded data (BL) 1121 of the base layer obtained through the terrestrial broadcast 1111, stores the scalable encoded data (BL) 1121, or transmits the scalable encoded data (BL) 1121 to another device.

Also, in accordance with a user instruction or the like, the terminal device 1102 obtains scalable encoded data (BL+EL) by combining the scalable encoded data (BL) 1121 of the base layer obtained through the terrestrial broadcast 1111 and the scalable encoded data (EL) 1122 of the enhancement layer obtained via the network 1112, obtains an image of the enhancement layer by decoding the scalable encoded data (BL+EL), stores the scalable encoded data (BL+EL), or transmits the scalable encoded data (BL+EL) to another device.

As described above, scalable encoded data can be transmitted via a different communication medium for each layer, for example. Accordingly, the load can be scattered, and a delay and an overflow can be prevented.

Also, the communication medium to be used for transmission may be selected for each layer in accordance with circumstances. For example, the scalable encoded data (BL) 1121 of the base layer with a relatively large data amount may be transmitted via a communication medium with a wide bandwidth, and the scalable encoded data (EL) 1122 of the enhancement layer with a relatively small data amount may be transmitted via a communication medium with a narrow bandwidth. Also, the communication medium for transmitting the scalable encoded data (EL) 1122 of the enhancement layer may be switched between the network 1112 and the terrestrial broadcast 1111, in accordance with the bandwidth that can be used by the network 1112. The same of course applies to the data of any other layer.

As the control is performed in this manner, the increase in the load due to data transmission can be further reduced.

The number of layers may of course be determined as appropriate, and the number of communication media to be used for transmission may also be determined as appropriate. The number of terminal devices 1102 as data distribution destinations may also be determined as appropriate. Further, in the above described example, the broadcasting station 1101 provides a broadcast. However, examples of use are not limited to that. The data transmission system 1100 may be any appropriate system that divides encoded data subjected scalable encoding into layers, and performs transmission via two or more lines.

(Third System)

Figure 42:
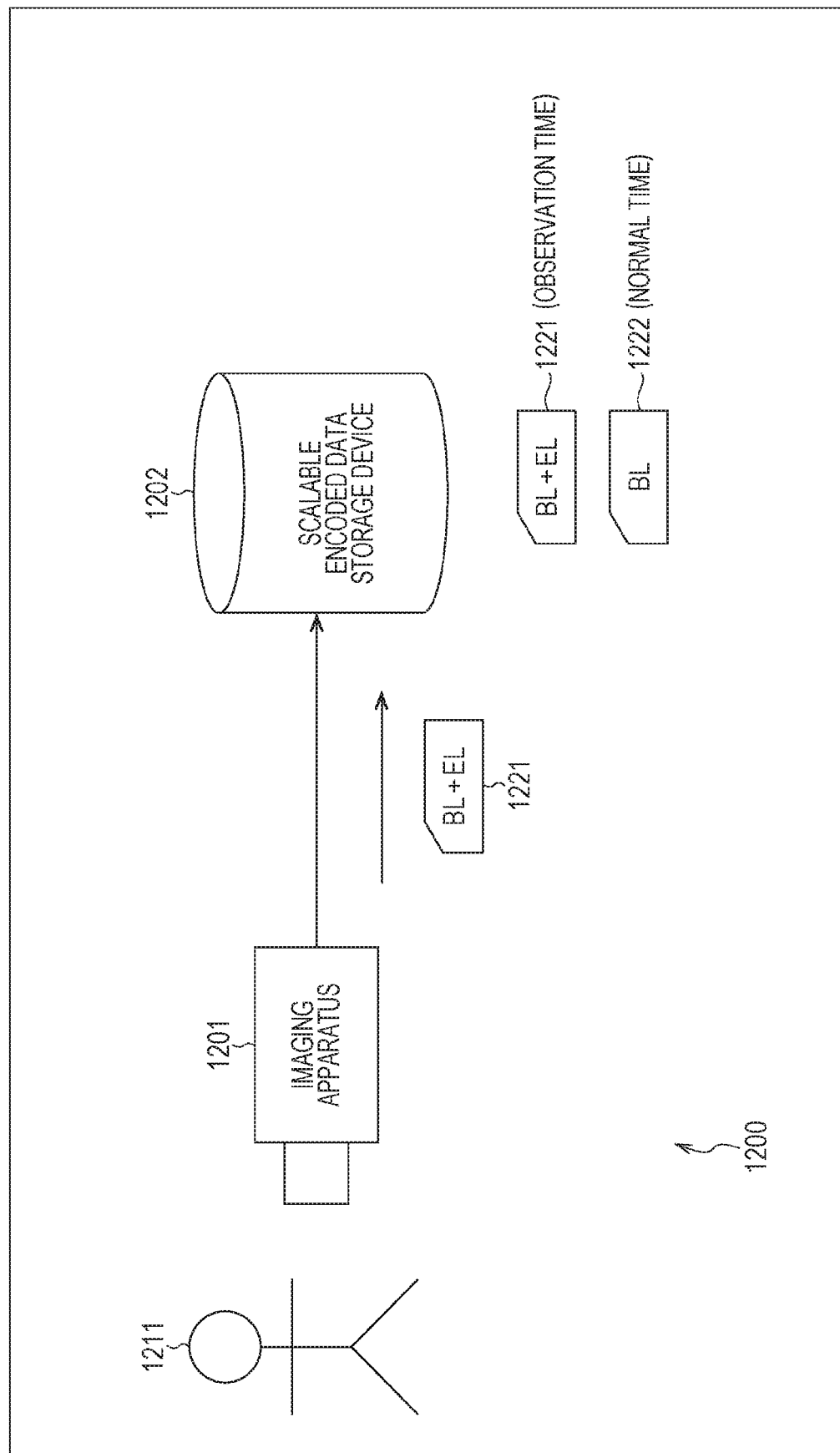
FIG. 42 is a block diagram showing yet another example of use of scalable encoding.

Scalable encoding is also used for storing encoded data, as shown in the example in FIG. 42.

In the imaging system 1200 shown in FIG. 42, an imaging apparatus 1201 performs scalable encoding on image data obtained by imaging an object 1211, and supplies the image data as scalable encoded data (BL+EL) 1221 to a scalable encoded data storage device 1202.

The scalable encoded data storage device 1202 stores the scalable encoded data (BL+EL) 1221 supplied from the imaging apparatus 1201 at an appropriate level of quality in the circumstances. For example, at a normal time, the scalable encoded data storage device 1202 extracts the data of the base layer from the scalable encoded data (BL+EL) 1221, and stores the extracted data as the scalable encoded data (BL) 1222 of the base layer of low quality and with a small data amount. At an observation time, on the other hand, the scalable encoded data storage device 1202 stores the high-quality scalable encoded data (BL+EL) 1221 with a large data amount as it is, for example.

In this manner, the scalable encoded data storage device 1202 can store high-quality images only when necessary. Accordingly, an increase in the data amount can be prevented while a reduction in the value of each image due to image quality degradation is prevented. Thus, the usability of the storage area can be improved.

The imaging apparatus 1201 is a surveillance camera, for example. In a case where any surveillance object (a trespasser, for example) is not caught in an image (at a normal time), the contents of the image are highly lightly to be unimportant. Therefore, priority is put on the reduction in the data amount, and the image data (scalable encoded data) is stored at a low level of quality. In a case where a surveillance object is caught as the object 1211 in an image (at an observation time), on the other hand, the contents of the image is highly likely to be important. Therefore, priority is put on image quality, and the image data (scalable encoded data) is stored at a high level of quality.

It should be noted that the scalable encoded data storage device 1202 may determine whether the current time is a normal time, or whether the current time is an observation time, by analyzing the image, for example. Alternatively, the imaging apparatus 1201 may perform the determination, and transmit a result of the determination to the scalable encoded data storage device 1202.

It should be noted that any appropriate criterion may be used as the criterion for determining whether the current time is a normal time, or whether the current time is an observation time, and the content of an image to be used as the criterion for determination may be determined as appropriate. A condition other than the contents of an image may of course be used as the criterion for determination. For example, a normal time and an observation time may be switched in accordance with the volume of recorded voice or waveforms, may be switched at predetermined time intervals, or may be switched in accordance with an external instruction such as a user instruction.

In addition, in the above described example, the state is switched between the two states of a normal time and an observation time. However, the number of states may be determined as appropriate. For example, the state may be switched among three or more states, such as a normal time, a low-level observation time, an observation time, and a high-level observation time. However, the upper limit number of the switchable states depends on the number of layers in scalable encoded data.

Also, the imaging apparatus 1201 may determine the number of layers in scalable encoding, in accordance with the circumstances. For example, at a normal time, the imaging apparatus 1201 may generate the scalable encoded data (BL) 1222 of the base layer of low quality and with a small data amount, and supply the scalable encoded data (BL) 1222 to the scalable encoded data storage device 1202. In addition, at an observation time, on the other hand, the imaging apparatus 1201 may generate the scalable encoded data (BL+EL) 1221 of the base layer of high quality and with a large data amount, and supply the scalable encoded data (BL+EL) 1221 to the scalable encoded data storage device 1202, for example.

In the above described example, a surveillance camera has been described. However, the imaging system 1200 can be used as appropriate, and is not limited to a surveillance camera.

Other Examples of Embodiments

Although examples of devices, systems, and the like to which the present disclosure is applied have been described above, the present disclosure is not limited to them, and can be embodied as any structure to be mounted on the above devices or as devices in the systems, such as a processor serving as a system Large Scale Integration (LSI) or the like, a module using processors or the like, a unit using modules or the like, and a set (or a structure in a device) having other functions added to the unit.

(Example Configuration of a Video Set)

Figure 43:
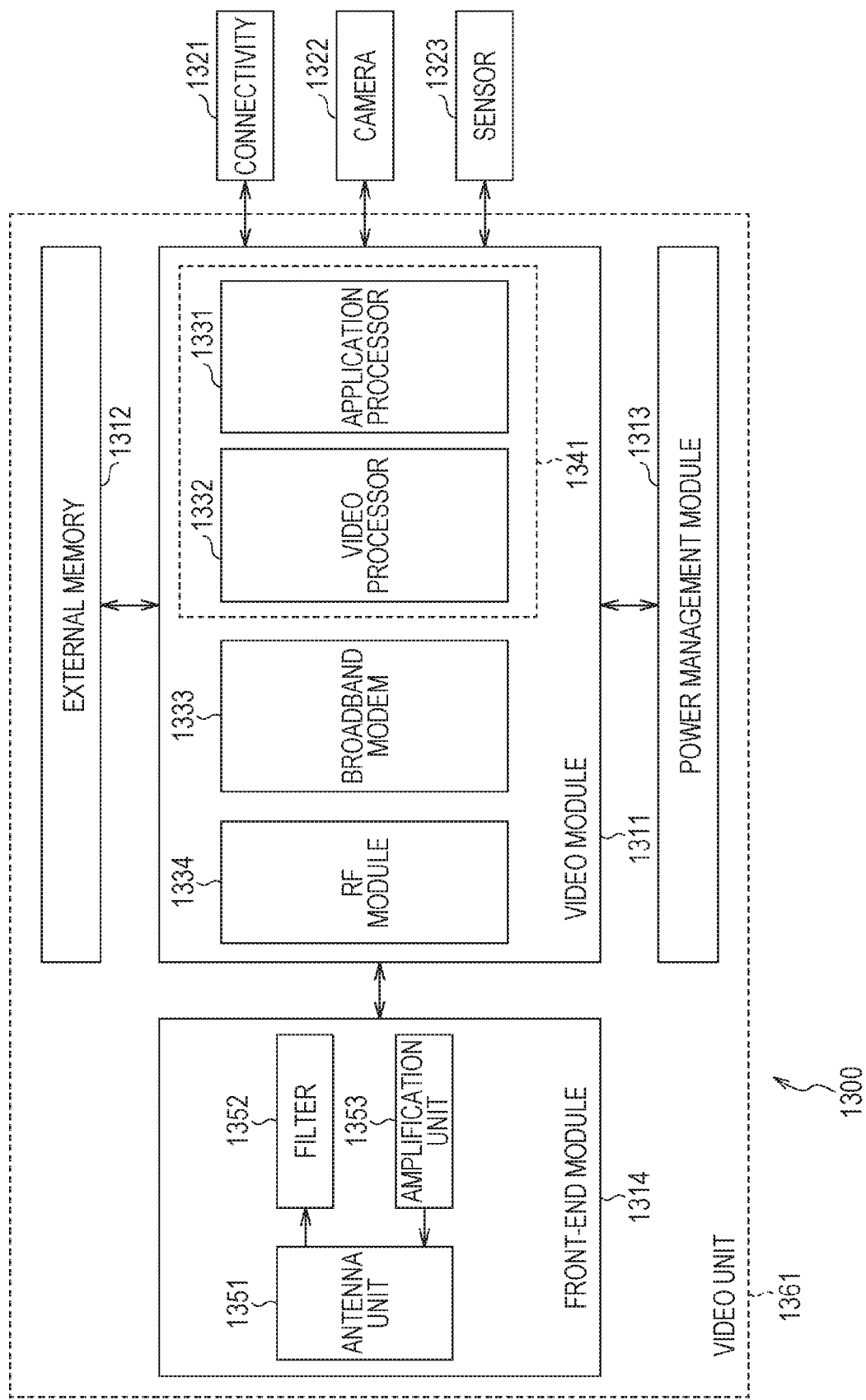
FIG. 43 schematically shows an example configuration of a video set to which the present disclosure is applied.

Referring now to FIG. 43, an example case where the present disclosure is embodied as a set is described. FIG. 43 schematically shows an example configuration of a video set to which the present disclosure is applied.

In recent years, electronic apparatuses have become multifunctional. In the process of development and manufacture of electronic apparatuses, not only one structure in such electronic apparatuses is to be sold or provided, or a structure having one function is manufactured, but also one set having various functions is manufactured by combining structures having relevant functions in many cases these days.

The video set 1300 shown in FIG. 43 is such a multifunctional structure, and is formed by combining a device having a function related to image encoding and decoding (or encoding or decoding, or both encoding and decoding) with another function related to the function.

As shown in FIG. 43, the video set 1300 includes modules such as a video module 1311, an external memory 1312, a power management module 1313, and a front-end module 1314, and devices having relevant functions, such as connectivity 1321, a camera 1322, and a sensor 1323.

A module is formed by integrating the functions of components related to one another, and serves as a component having the integrated functions. Although its specific physical structure is not limited, a module may be formed by placing electronic circuit elements such as processors, resistors, and capacitors having respective functions on a wiring board or the like, and be integrated thereon. Alternatively, a new module may be formed by combining a module with another module, a processor, or the like.

In the example case shown in FIG. 43, the video module 1311 is formed by combining structures having functions related to image processing, and includes an application processor, a video processor, a broadband modem 1333, and an RF module 1334.

A processor is formed by integrating a structure having predetermined functions into a semiconductor chip by System On a Chip (SoC), and some processors are called system Large Scale Integrations (LSI), for example. The structure having the predetermined functions may be a logic circuit (a hardware structure), may be a structure including a CPU, a ROM, and a RAM, and a program (a software structure) to be executed with these components, or may be a structure formed by combining the two structures. For example, a processor may include a logic circuit, a CPU, a ROM, and a RAM, one of the functions may be achieved by the logic circuit (hardware structure), and the other functions may be achieved by the program (software structure) executed by the CPU.

The application processor 1331 in FIG. 43 is a processor that executes an application related to image processing. The application to be executed by the application processor 1331 can not only perform an arithmetic process but also control structures inside and outside the video module 1311, such as the video processor 1332, as necessary, to achieve predetermined functions.

The video processor 1332 is a processor having functions related to image encoding and decoding (encoding and/or decoding).

The broadband modem 1333 is a processor (or a module) that performs processing related to wired or wireless (or wired and wireless) broadband communication being conducted via a broadband network such as the Internet or a public telephone network. For example, the broadband modem 1333 can convert data to be transmitted (a digital signal) into an analog signal by performing digital modulation on the data, and convert a received analog signal into data (a digital signal) by demodulating the analog signal. For example, the broadband modem 1333 can perform digital modulation/demodulation on desired information, such as image data to be processed by the video processor 1332, a stream generated by encoding image data, an application program, and setting data.

The RF module 1334 is a module that performs frequency conversion, modulation/demodulation, amplification, a filtering process, or the like on an radio frequency (RF) signal to be transmitted or received via an antenna. For example, the RF module 1334 generates an RF signal by performing frequency conversion or the like on a baseband signal generated by the broadband modem 1333. The RF module 1334 also generates a baseband signal by performing frequency conversion or the like on an RF signal received via the front-end module 1314, for example.

It should be noted that, as indicated by a dashed line 1341 in FIG. 43, the application processor 1331 and the video processor 1332 may be integrated and formed as one processor.

The external memory 1312 is a module that is provided outside the video module 1311 and has a storage device to be used by the video module 1311. The storage device of the external memory 1312 may be embodied by any physical structure. Normally, the storage device is often used for storing large volumes of data such as frame-based image data. Therefore, the storage device is preferably embodied by a relatively inexpensive, large-capacity semiconductor memory, such as a dynamic random access memory (DRAM).

The power management module 1313 manages and controls the power supply to the video module 1311 (the respective structures in the video module 1311).

The front-end module 1314 is a module that provides the RF module 1334 with front-end functions (circuits at the transmission and reception ends of the antenna). As shown in FIG. 35, the front-end module 1314 includes an antenna unit 1351, a filter 1352, and an amplification unit 1353, for example.

The antenna unit 1351 includes an antenna that transmits and receives radio signals, and peripheral structures around the antenna. The antenna unit 1351 transmits a signal supplied from the amplification unit 1353 as a radio signal, and supplies a received radio signal as an electrical signal (RF signal) to the filter 1352. The filter 1352 performs a filtering process or the like on an RF signal received via the antenna unit 1351, and supplies the processed RF signal to the RF module 1334. The amplification unit 1353 amplifies an RF signal supplied from the RF module 1334, and supplies the amplified RF signal to the antenna unit 1351.

The connectivity 1321 is a module that has a function related to connections to the outside. The connectivity 1321 may have any kind of physical structure. For example, the connectivity 1321 includes a structure that has a communication function compliant with standards other than the communication standards with which the broadband modem 1333 is compliant, and an external input/output terminal or the like.

For example, the connectivity 1321 may include a module having a communication function compliant with wireless communication standards such as Bluetooth (a registered trade name), IEEE 802.11 (such as Wireless Fidelity (Wi-Fi: a registered trade name), Near Field Communication (NFC), or InfraRed Data Association (IrDA), and an antenna or the like that transmits and receives signals compliant with the standards. Alternatively, the connectivity 1321 may include a module having a communication function compliant with cable communication standards such as Universal Serial Bus (USB) or High-Definition Multimedia Interface (a registered trade name) (HDMI), and a terminal compliant with the standards. Further, the connectivity 1321 may have some other data (signal) transmission function or the like, such as an analog input/output terminal.

The connectivity 1321 may include a device that is a data (signal) transmission destination. For example, the connectivity 1321 may include a drive (inclusive of not only a drive for removable media, but also a hard disk, a solid state drive (SSD), a network attached storage (NAS), or the like) that performs data reading and writing on a recording medium such as a magnetic disk, an optical disk, a magnetooptical disk, or a semiconductor memory. The connectivity 1321 may also include an image or sound output device (a monitor, a speaker, or the like).

The camera 1322 is a module that has the function to image an object and obtain image data of the object. The image data obtained through the imaging performed by the camera 1322 is supplied to the video processor 1332 and is encoded.

The sensor 1323 is a module having a sensor function, such as a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, an inclination sensor, a magnetic identification sensor, a shock sensor, or a temperature sensor. Data detected by the sensor 1323 is supplied to the application processor 1331, and is used by an application, for example.

The structures described as modules above may be embodied as processors, and the structures described as processors above may be embodied as modules.

In the video set 1300 designed as above, the present disclosure can be applied to the video processor 1332 as will be described later. Thus, the video set 1300 can be embodied as a set to which the present disclosure is applied.

(Example Configuration of the Video Processor)

Figure 44:
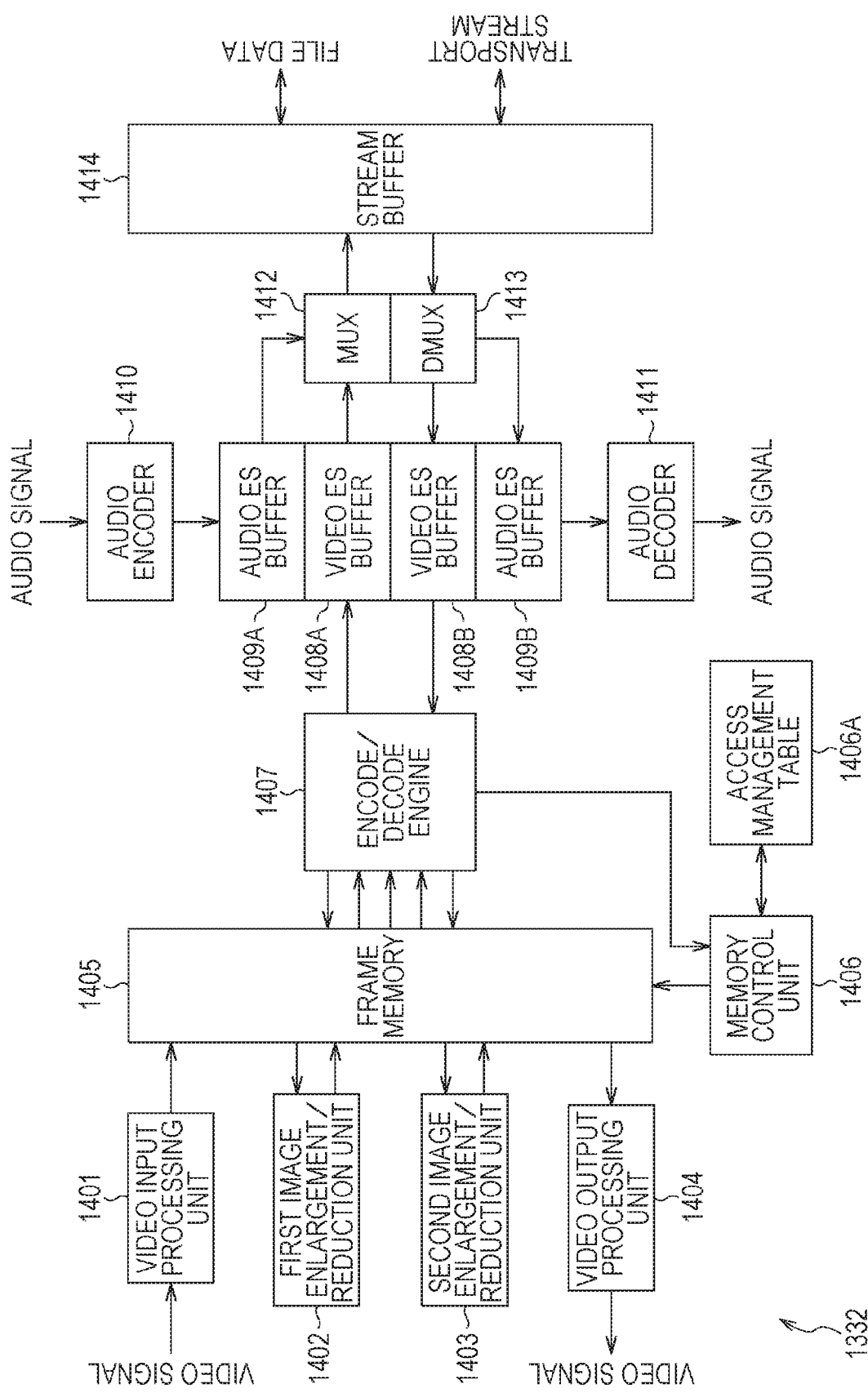
FIG. 44 schematically shows an example configuration of a video processor to which the present disclosure is applied.

FIG. 44 schematically shows an example configuration of the video processor 1332 (FIG. 43) to which the present disclosure is applied.

In the example case shown in FIG. 44, the video processor 1332 has a function to receive inputs of a video signal and an audio signal, and encode these signals by a predetermined method, and a function to decode encoded video data and audio data, and reproduce and output a video signal and an audio signal.

As shown in FIG. 44, the video processor 1332 includes a video input processing unit 1401, a first image enlargement/reduction unit 1402, a second image enlargement/reduction unit 1403, a video output processing unit 1404, a frame memory 1405, and a memory control unit 1406. The video processor 1332 also includes an encoding/decoding engine 1407, video elementary stream (ES) buffers 1408A and 1408B, and audio ES buffers 1409A and 1409B. The video processor 1332 further includes an audio encoder 1410, an audio decoder 1411, a multiplexer (MUX) 1412, a demultiplexer (DMUX) 1413, and a stream buffer 1414.

The video input processing unit 1401 acquires a video signal input from the connectivity 1321 (FIG. 43), for example, and converts the video signal into digital image data. The first image enlargement/reduction unit 1402 performs format conversion, an image enlargement/reduction process, or the like on image data. The second image enlargement/reduction unit 1403 performs an image enlargement/reduction process on image data in accordance with the format at the output destination via the video output processing unit 1404, or, like the first image enlargement/reduction unit 1402, performs format conversion, an image enlargement/reduction process, or the like. The video output processing unit 1404 performs format conversion, conversion to an analog signal, or the like on image data, and outputs the result as a reproduced video signal to the connectivity 1321 (FIG. 43), for example.

The frame memory 1405 is an image data memory that is shared among the video input processing unit 1401, the first image enlargement/reduction unit 1402, the second image enlargement/reduction unit 1403, the video output processing unit 1404, and the encoding/decoding engine 1407. The frame memory 1405 is designed as a semiconductor memory such as a DRAM.

The memory control unit 1406 receives a synchronization signal from the encoding/decoding engine 1407, and controls write and read access to the frame memory 1405 in accordance with a schedule of access to the frame memory 1405 written in an access management table 1406A. The access management table 1406A is updated by the memory control unit 1406 in accordance with processes performed by the encoding/decoding engine 1407, the first image enlargement/reduction unit 1402, the second image enlargement/reduction unit 1403, and the like.

The encoding/decoding engine 1407 performs an image data encoding process, and a process of decoding a video stream that is data generated by encoding image data. For example, the encoding/decoding engine 1407 encodes image data read from the frame memory 1405, and sequentially writes the encoded image data as a video stream into the video ES buffer 1408A. Also, the encoding/decoding engine 1407 sequentially reads and decodes a video stream from the video ES buffer 1408B, and sequentially writes the decoded video stream as image data into the frame memory 1405, for example. In the encoding and the decoding, the encoding/decoding engine 1407 uses the frame memory 1405 as a work area. The encoding/decoding engine 1407 also outputs a synchronization signal to the memory control unit 1406 when a process for a macroblock is started, for example.

The video ES buffer 1408A buffers a video stream generated by the encoding/decoding engine 1407, and supplies the video stream to the multiplexer (MUX) 1412. The video ES buffer 1408B buffers a video stream supplied from the demultiplexer (DMUX) 1413, and supplies the video stream to the encoding/decoding engine 1407.

The audio ES buffer 1409A buffers an audio stream generated by the audio encoder 1410, and supplies the audio stream to the multiplexer (MUX) 1412. The audio ES buffer 1409B buffers an audio stream supplied from the demultiplexer (DMUX) 1413, and supplies the audio stream to the audio decoder 1411.

The audio encoder 1410 performs digital conversion, for example, on an audio signal input from the connectivity 1321 (FIG. 43) or the like, and encodes the audio signal by a predetermined method such as an MPEG audio method or AudioCode number 3 (AC3). The audio encoder 1410 sequentially writes an audio stream that is the data generated by encoding the audio signal, into the audio ES buffer 1409A. The audio decoder 1411 decodes an audio stream supplied from the audio ES buffer 1409B, performs conversion to an analog signal, for example, and supplies the result as a reproduced audio signal to the connectivity 1321 (FIG. 43) and the like.

The multiplexer (MUX) 1412 multiplexes a video stream and an audio stream. Any method can be used in this multiplexing (or any format can be used for the bitstream to be generated by the multiplexing). In this multiplexing, the multiplexer (MUX) 1412 may also add predetermined header information or the like to the bitstream. That is, the multiplexer (MUX) 1412 can convert a stream format by performing multiplexing. For example, the multiplexer (MUX) 1412 multiplexes a video stream and an audio stream, to convert the format to a transport stream that is a bitstream in a format for transfer. Also, the multiplexer (MUX) 1412 multiplexes a video stream and an audio stream, to perform conversion to data (file data) in a file format for recording, for example.

The demultiplexer (DMUX) 1413 demultiplexes a bitstream generated by multiplexing a video stream and an audio stream, by a method compatible with the multiplexing performed by the multiplexer (MUX) 1412. Specifically, the demultiplexer (DMUX) 1413 extracts a video stream and an audio stream from a bitstream read from the stream buffer 1414 (or separates a video stream and an audio stream). That is, the demultiplexer (DMUX) 1413 can convert a stream format by performing demultiplexing (the reverse conversion of the conversion performed by the multiplexer (MUX) 1412). For example, the demultiplexer (DMUX) 1413 acquires, via the stream buffer 1414, a transport stream supplied from the connectivity 1321 or the broadband modem 1333 (both shown in FIG. 43), for example, and demultiplexes the transport stream, to convert the transport stream into a video stream and an audio stream. Also, the demultiplexer (DMUX) 1413 acquires, via the stream buffer 1414, file data read from a recording medium of any kind through the connectivity 1321 (FIG. 43), for example, and demultiplexes the file data, to convert the file data into a video stream and an audio stream.

The stream buffer 1414 buffers a bitstream. For example, the stream buffer 1414 buffers a transport stream supplied from the multiplexer (MUX) 1412, and supplies the transport stream to the connectivity 1321 or the broadband modem 1333 (both shown in FIG. 43), for example, at a predetermined time or in response to a request or the like from the outside.

Also, the stream buffer 1414 buffers file data supplied from the multiplexer (MUX) 1412, and supplies the file data to the connectivity 1321 (FIG. 43) or the like at a predetermined time or in response to a request or the like from the outside, to record the file data into a recording medium of any kind, for example.

Further, the stream buffer 1414 buffers a transport stream obtained via the connectivity 1321 or the broadband modem 1333 (both shown in FIG. 43), for example, and supplies the transport stream to the demultiplexer (DMUX) 1413 at a predetermined time or in response to a request or the like from the outside.

Also, the stream buffer 1414 buffers file data read from a recording medium of any kind in the connectivity 1321 (FIG. 43), for example, and supplies the file data to the demultiplexer (DMUX) 1413 at a predetermined time or in response to a request or the like from the outside.

Next, an example operation of the video processor 1332 having the above configuration is described. For example, a video signal that is input from the connectivity 1321 (FIG. 43) or the like to the video processor 1332 is converted into digital image data in a predetermined format such as the 4:2:2 Y/Cb/Cr format in the video input processing unit 1401, and the digital image data is sequentially written into the frame memory 1405. The digital image data is also read into the first image enlargement/reduction unit 1402 or the second image enlargement/reduction unit 1403, is subjected to format conversion to a predetermined format such as the 4:2:0 Y/Cb/Cr format and to an enlargement/reduction process, and is again written into the frame memory 1405. This image data is encoded by the encoding/decoding engine 1407, and is written as a video stream into the video ES buffer 1408A.

Meanwhile, an audio signal that is input from the connectivity 1321 (FIG. 43) or the like to the video processor 1332 is encoded by the audio encoder 1410, and is written as an audio stream into the audio ES buffer 1409A.

The video stream in the video ES buffer 1408A and the audio stream in the audio ES buffer 1409A are read into the multiplexer (MUX) 1412, are then multiplexed, and are converted into a transport stream or file data or the like. A transport stream generated by the multiplexer (MUX) 1412 is buffered by the stream buffer 1414, and is then output to an external network via the connectivity 1321 or the broadband modem 1333 (both shown in FIG. 43), for example. Also, file data generated by the multiplexer (MUX) 1412 is buffered by the stream buffer 1414, is output to the connectivity 1321 (FIG. 43), for example, and is recorded into a recording medium of any kind.

Meanwhile, a transport stream that is input from an external network to the video processor 1332 via the connectivity 1321 or the broadband modem 1333 (both shown in FIG. 43), for example, is buffered by the stream buffer 1414, and is then demultiplexed by the demultiplexer (DMUX) 1413. Also, file data that is read from a recording medium of any kind in the connectivity 1321 (FIG. 43) or the like and is input to the video processor 1332 is buffered by the stream buffer 1414, and is then demultiplexed by the demultiplexer (DMUX) 1413. That is, a transport stream or file data that is input to the video processor 1332 is divided into a video stream and an audio stream by the demultiplexer (DMUX) 1413.

The audio stream is supplied to the audio decoder 1411 via the audio ES buffer 1409B, and is then decoded, to reproduce an audio signal. Meanwhile, the video stream is written into the video ES buffer 1408B, is then sequentially read and decoded by the encoding/decoding engine 1407, and is written into the frame memory 1405. The decoded image data is subjected to an enlargement/reduction process by the second image enlargement/reduction unit 1403, and is written into the frame memory 1405. The decoded image data is then read into the video output processing unit 1404, is subjected to format conversion to a predetermined format such as the 4:2:2Y/Cb/Cr format, and is further converted into an analog signal, so that a video signal is reproduced and output.

In a case where the present disclosure is applied to the video processor 1332 designed as above, the present disclosure according to any of the above described embodiments may be applied to the encoding/decoding engine 1407. That is, the encoding/decoding engine 1407 may have the functions of the encoding device and the decoding device according to the first embodiment, for example. With this, the video processor 1332 can achieve effects similar to those described above with reference to FIGS. 1 through 25.

It should be noted that, in the encoding/decoding engine 1407, the present disclosure (or the functions of the image encoding device and the image decoding device according to one of the above described embodiments) may be embodied by hardware such as a logic circuit, may be embodied by software such as an embedded program, or may be embodied by both hardware and software.

(Another Example Configuration of the Video Processor)

Figure 45:
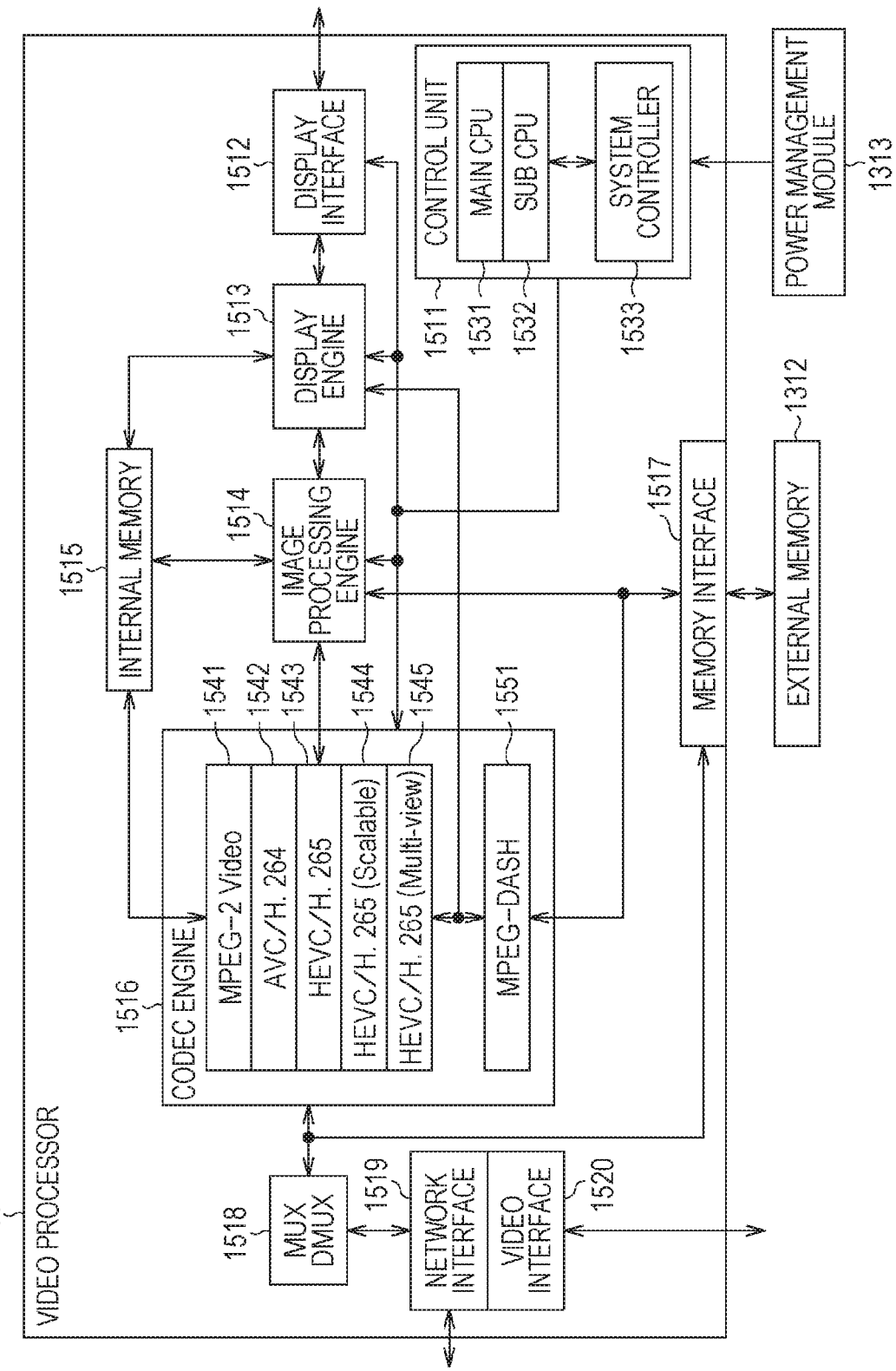
FIG. 45 schematically shows another example configuration of a video processor to which the present disclosure is applied.

FIG. 45 schematically shows another example configuration of the video processor 1332 (FIG. 43) to which the present disclosure is applied. In the example case shown in FIG. 45, the video processor 1332 has a function to encode and decode video data by a predetermined method.

More specifically, as shown in FIG. 45, the video processor 1332 includes a control unit 1511, a display interface 1512, a display engine 1513, an image processing engine 1514, and an internal memory 1515. The video processor 1332 also includes a codec engine 1516, a memory interface 1517, a multiplexer/demultiplexer (MUX DMUX) 1518, a network interface 1519, and a video interface 1520.

The control unit 1511 controls operations of the respective processing units in the video processor 1332, such as the display interface 1512, the display engine 1513, the image processing engine 1514, and the codec engine 1516.

As shown in FIG. 45, the control unit 1511 includes a main CPU 1531, a sub CPU 1532, and a system controller 1533, for example. The main CPU 1531 executes a program or the like for controlling operations of the respective processing units in the video processor 1332. The main CPU 1531 generates a control signal in accordance with the program or the like, and supplies the control signal to the respective processing units (or controls operations of the respective processing units). The sub CPU 1532 plays an auxiliary role for the main CPU 1531. For example, the sub CPU 1532 executes a child process, a subroutine, or the like of the program or the like to be executed by the main CPU 1531. The system controller 1533 controls operations of the main CPU 1531 and the sub CPU 1532, such as designating programs to be executed by the main CPU 1531 and the sub CPU 1532.

Under the control of the control unit 1511, the display interface 1512 outputs image data to the connectivity 1321 (FIG. 43), for example. The display interface 1512 converts digital image data into an analog signal, and outputs the image data as a reproduced video signal or the digital image data as it is to a monitor device or the like of the connectivity 1321 (FIG. 43), for example.

Under the control of the control unit 1511, the display engine 1513 performs various conversion processes such as format conversion, size conversion, and color gamut conversion on image data, so as to conform to the hardware specifications of the monitor device or the like that will display the image.

Under the control of the control unit 1511, the image processing engine 1514 performs predetermined image processing, such as a filtering process for improving image quality, on image data.

The internal memory 1515 is a memory that is shared among the display engine 1513, the image processing engine 1514, and the codec engine 1516, and is provided in the video processor 1332. The internal memory 1515 is used in data exchange among the display engine 1513, the image processing engine 1514, and the codec engine 1516, for example. The internal memory 1515 stores data supplied from the display engine 1513, the image processing engine 1514, or the codec engine 1516, and supplies the data to the display engine 1513, the image processing engine 1514, or the codec engine 1516 as necessary (in response to a request, for example). The internal memory 1515 may be formed with any storage device. Normally, the internal memory 1515 is often used for storing small volumes of data such as block-based image data and parameters. Therefore, the internal memory 1515 is preferably formed with a semiconductor memory that has a relatively small capacity (compared with the external memory 1312) but has a high response speed, such as a static random access memory (SRAM).

The codec engine 1516 performs processing related to encoding and decoding of image data. The codec engine 1516 is compatible with any encoding/decoding method, and the number of compatible methods may be one, or may be two or greater. For example, the codec engine 1516 has a codec function compatible with encoding/decoding methods, and may encode image data or decode encoded data by a method selected from among those methods.

In the example shown in FIG. 45, the codec engine 1516 includes MPEG-2 Video 1541, AVC/H.264 1542, HEVC/H.265 1543, HEVC/H.265 (Scalable) 1544, HEVC/H.265 (Multi-view) 1545, and MPEG-DASH 1551, as functional blocks for processing related to codec.

The MPEG-2 Video 1541 is a functional block that encodes or decodes image data by MPEG-2. The AVC/H.264 1542 is a functional block that encodes or decodes image data by AVC. The HEVC/H.265 1543 is a functional block that encodes or decodes image data by HEVC. The HEVC/H.265 (Scalable) 1544 is a functional block that performs scalable encoding or scalable decoding on image data by HEVC. The HEVC/H.265 (Multi-view) 1545 is a functional block that performs multi-view encoding or multi-view decoding on image data by HEVC.

The MPEG-DASH 1551 is a functional block that transmits and receives image data by MPEG-Dynamic Adaptive Streaming over HTTP (MPEG-DASH). MPEG-DASH is a technology for conducting video streaming using HyperText Transfer Protocol (HTTP), and one of the features thereof lies in selecting and transmitting, for each segment, an appropriate piece of encoded data from among predetermined pieces of encoded data having different resolutions from one another. The MPEG-DASH 1551 generates a stream compliant with the standards and performs control or the like on transmission of the stream. As for encoding/decoding image data, the MPEG-DASH 1551 uses the MPEG-2 Video 1541 through the HEVC/H.265 (Multi-view) 1545 described above.

The memory interface 1517 is an interface for the external memory 1312. Data supplied from the image processing engine 1514 and the codec engine 1516 is supplied to the external memory 1312 via the memory interface 1517. Meanwhile, data read from the external memory 1312 is supplied to the video processor 1332 (the image processing engine 1514 or the codec engine 1516) via the memory interface 1517.

The multiplexer/demultiplexer (MUX DMUX) 1518 multiplexes or demultiplexes various kinds of data related to images, such as a bitstream of encoded data, image data, and a video signal. Any method may be used in this multiplexing/demultiplexing. For example, at a time of multiplexing, the multiplexer/demultiplexer (MUX DMUX) 1518 may not only integrate pieces of data into one, but also add predetermined header information or the like to the data. At a time of demultiplexing, the multiplexer/demultiplexer (MUX DMUX) 1518 may not only divide one set of data into pieces, but also add predetermined header information or the like to each piece of the divided data. That is, the multiplexer/demultiplexer (MUX DMUX) 1518 can convert a data format by performing multiplexing/demultiplexing. For example, the multiplexer/demultiplexer (MUX DMUX) 1518 can convert a bitstream into a transport stream that is a bitstream in a format for transfer, or into data (file data) in a file format for recording, by multiplexing the bitstream. The reverse conversion is of course also possible through demultiplexing.

The network interface 1519 is an interface for the broadband modem 1333 and the connectivity 1321 (both shown in FIG. 43), for example. The video interface 1520 is an interface for the connectivity 1321 and the camera 1322 (both shown in FIG. 43), for example.

Next, an example operation of this video processor 1332 is described. When a transport stream is received from an external network via the connectivity 1321 or the broadband modem 1333 (both shown in FIG. 43), for example, the transport stream is supplied to the multiplexer/demultiplexer (MUX DMUX) 1518 via the network interface 1519, is demultiplexed, and is decoded by the codec engine 1516. The image data obtained through the decoding performed by the codec engine 1516 is subjected to predetermined image processing by the image processing engine 1514, for example, is subjected to predetermined conversion by the display engine 1513, and is supplied to the connectivity 1321 (FIG. 43) or the like via the display interface 1512, so that the image is displayed on a monitor. Also, the image data obtained through the decoding performed by the codec engine 1516 is again encoded by the codec engine 1516, is multiplexed and converted into file data by the multiplexer/demultiplexer (MUX DMUX) 1518, is output to the connectivity 1321 (FIG. 43) or the like via the video interface 1520, and is recorded into a recording medium of any kind.

Further, file data of encoded data that is generated by encoding image data and is read from a recording medium (not shown) by the connectivity 1321 (FIG. 43) or the like is supplied to the multiplexer/demultiplexer (MUX DMUX) 1518 via the video interface 1520, is demultiplexed, and is decoded by the codec engine 1516. The image data obtained through the decoding performed by the codec engine 1516 is subjected to predetermined image processing by the image processing engine 1514, is subjected to predetermined conversion by the display engine 1513, and is supplied to the connectivity 1321 (FIG. 43) or the like via the display interface 1512, so that the image is displayed on a monitor. Also, the image data obtained through the decoding performed by the codec engine 1516 is again encoded by the codec engine 1516, is multiplexed and converted into a transport stream by the multiplexer/demultiplexer (MUX DMUX) 1518, is supplied to the connectivity 1321 or the broadband modem 1333 (both shown in FIG. 43), for example, via the network interface 1519, and is transmitted to another apparatus (not shown).

It should be noted that exchange of image data and other data among the respective processing units in the video processor 1332 is conducted with the use of the internal memory 1515 or the external memory 1312, for example. In addition, the power management module 1313 controls the power supply to the control unit 1511, for example.

In a case where the present disclosure is applied to the video processor 1332 designed as above, the present disclosure according to any of the above described embodiments may be applied to the codec engine 1516. That is, the codec engine 1516 may have the functional blocks that form the encoding device and the decoding device according to the first embodiment, for example. Further, as the codec engine 1516 is designed as above, the video processor 1332 can achieve effects similar to those described above with reference to FIGS. 1 through 25.

It should be noted that, in the codec engine 1516, the present disclosure (or the functions of an image encoding device and an image decoding device according to any of the above described embodiments) may be embodied by hardware such as a logic circuit, may be embodied by software such as an embedded program, or may be embodied by both hardware and software.

Although two example configurations for the video processor 1332 have been described above, the video processor 1332 may have any appropriate configuration other than the two example configurations described above. Also, the video processor 1332 may be formed as a single semiconductor chip, or may be formed as semiconductor chips. For example, the video processor 1332 may be formed as a three-dimensional stacked LSI in which semiconductors are stacked. Alternatively, the video processor 1332 may be formed with LSIs.

(Example Applications to Apparatuses)

The video set 1300 can be incorporated into various apparatuses that process image data. For example, the video set 1300 can be incorporated into the television apparatus 900 (FIG. 36), the portable telephone apparatus 920 (FIG. 37), the recording/reproducing apparatus 940 (FIG. 38), the imaging apparatus 960 (FIG. 39), and the like. As the video set 1300 is incorporated into an apparatus, the apparatus can achieve effects similar to those described above with reference to FIGS. 1 through 25.

The video set 1300 can also be incorporated into terminal devices such as the personal computer 1004, the AV device 1005, the tablet device 1006, and the portable telephone device 1007 in the data transmission system 1000 shown in FIG. 40, the broadcasting station 1101 and the terminal device 1102 in the data transmission system 1100 shown in FIG. 41, and the imaging apparatus 1201 and the scalable encoded data storage device 1202 in the imaging system 1200 shown in FIG. 42, for example. As the video set 1300 is incorporated into an apparatus, the apparatus can achieve effects similar to those described above with reference to FIGS. 1 through 25.

It should be noted that even one of the components in the above described video set 1300 can be embodied as a structure to which the present disclosure is applied, as long as the one component includes the video processor 1332. For example, the video processor 1332 can be embodied as a video processor to which the present disclosure is applied. Also, the processor indicated by the above mentioned dashed line 1341, the video module 1311, and the like can be embodied as a processor, a module, and the like to which the present disclosure is applied. Further, the video module 1311, the external memory 1312, the power management module 1313, and the front-end module 1314, for example, may be combined into a video unit 1361 to which the present disclosure is applied. With any of the above structures, effects similar to those described above with reference to FIGS. 1 through 25 can be achieved.

That is, like the video set 1300, any structure including the video processor 1332 can be incorporated into various kinds of apparatuses that process image data. For example, the video processor 1332, the processor indicated by the dashed line 1341, the video module 1311, or the video unit 1361 can be incorporated into the television apparatus 900 (FIG. 36), the portable telephone apparatus 920 (FIG. 37), the recording/reproducing apparatus 940 (FIG. 38), the imaging apparatus 960 (FIG. 39), terminal devices such as the personal computer 1004, the AV device 1005, the tablet device 1006, and the portable telephone device 1007 in the data transmission system 1000 shown in FIG. 40, the broadcasting station 1101 and the terminal device 1102 in the data transmission system 1100 shown in FIG. 41, and the imaging apparatus 1201 and the scalable encoded data storage device 1202 in the imaging system 1200 shown in FIG. 42. As one of the structures to which the present disclosure is applied is incorporated into an apparatus, the apparatus can achieve effects similar to those described above with reference to FIGS. 1 through 25, as in the case of the video set 1300.

It should be noted that, in this specification, examples in which various information pieces such as a VPS and an SPS are multiplexed with encoded data and are transmitted from the encoding side to the decoding side have been described. However, the method of transmitting the information is not limited to the above examples. For example, the information pieces may be transmitted or recorded as separate data associated with encoded data, without being multiplexed with the encoded data. Here, the term "associate" means to allow images (which may be part of images such as slices or blocks) contained in a bitstream to be linked to the information corresponding to the images at the time of decoding. That is, the information may be transmitted via a transmission path different from that for the encoded data. Alternatively, the information may be recorded in a recording medium (or in a different area in the same recording medium) other than the recording medium for the encoded data. Furthermore, the information and the encoded data may be associated with each other in any units such as in units of some frames, one frame, or part of a frame.

In addition, in this specification, a system means an assembly of components (apparatuses, modules (parts), and the like), and not all the components need to be provided in the same housing. In view of this, apparatuses that are housed in different housings and are connected to each other via a network form a system, and one apparatus having modules housed in one housing is also a system.

The advantageous effects described in this specification are merely examples, and the advantageous effects of the present technology are not limited to them and may include other effects.

It should be noted that embodiments of the present disclosure are not limited to the above described embodiments, and various modifications may be made to them without departing from the scope of the present disclosure.

For example, the present disclosure can also be applied to an encoding device and a decoding device that implement an encoding method other than HEVC, and can perform transform skipping.

The present disclosure can also be applied to an encoding device and a decoding device that are used for receiving an encoded stream via a network medium such as satellite broadcasting, cable TV, the Internet, or a portable telephone, or for processing an encoded stream in a storage medium such as an optical or magnetic disk or a flash memory.

Further, the present disclosure can be embodied in a cloud computing configuration in which one function is shared among devices via a network, and processing is performed by the devices cooperating with one another.

In addition, the respective steps described with reference to the above described flowcharts can be carried out by one device or can be shared among devices.

In a case where more than one process is included in one step, the processes included in the step can be performed by one device or can be shared among devices.

While preferred embodiments of the present disclosure have been described above with reference to the accompanying drawings, the present disclosure is not limited to those examples. It is apparent that those who have ordinary skills in the art can make various changes or modifications within the scope of the technical spirit claimed herein, and it should be understood that those changes or modifications are within the technical scope of the present disclosure.

It should be noted that the present technology may also be embodied in the structures described below.

(1)
An image encoding device including:
a setting unit that sets control information for controlling in-screen motion prediction across slices;
an encoding unit that encodes an image to generate a bitstream in accordance with the control information set by the setting unit; and
a transmission unit that transmits the control information set by the setting unit and the bitstream generated by the encoding unit.

(2)
The image encoding device of (1), wherein the setting unit sets a reference permission flag as the control information, the reference permission flag indicating a permission for reference to a result of decoding of a current slice and a slice before the current slice in a raster scan order.

(3)
The image encoding device of (2), wherein the setting unit sets the reference permission flag in a picture parameter set (PPS).

(4)
The image encoding device of any of (1) through (3), wherein the setting unit sets a parameter as the control information, the parameter indicating the number of previous slices having referable decoding results.

(5)
The image encoding device of any of (1) through (4), wherein the setting unit sets an on/off flag as the control information, the on/off flag indicating whether the in-screen motion prediction across the slices can be performed.

(6)
The image encoding device of (5), wherein the setting unit sets the on/off flag in one of a sequence parameter set (SPS) and a video parameter set (VPS).

(7)
The image encoding device of any of (2) through (6), wherein, when wavefront parallel processing (WPP) is "on", the setting unit limits a range of the reference, and sets the reference permission flag.

(8)
The image encoding device of any of (2) through (6), wherein, when tile dividing is "on", the setting unit sets the reference permission flag.

(9)
The image encoding device of any of (2) through (6), wherein, when temporal motion constrained tile set SEI (MCTS-SEI) is "on", the setting unit sets the reference permission flag to "off".

(10)
An image encoding method implemented by an image encoding device,
the image encoding method including:
setting control information for controlling in-screen motion prediction across slices;
encoding an image to generate a bitstream in accordance with the set control information; and
transmitting the set control information and the generated bitstream.

(11)
An image decoding device including:
a reception unit that receives a bitstream generated by encoding an image;
an extraction unit that extracts control information from the bitstream received by the reception unit, the control information being designed for controlling in-screen motion prediction across slices; and
a decoding unit that decodes the bitstream received by the reception unit, to generate an image, using the control information extracted by the extraction unit.

(12)
The image decoding device of (11), wherein the extraction unit extracts a reference permission flag as the control information, the reference permission flag indicating a permission for reference to a result of decoding of a current slice and a slice before the current slice in a raster scan order.

(13)
The image decoding device of (12), wherein the extraction unit extracts the reference permission flag from a picture parameter set (PPS).

(14)
The image decoding device of any of (11) through (13), wherein the extraction unit extracts a parameter as the control information, the parameter indicating the number of previous slices having referable decoding results.

(15)
The image decoding device of any of (11) through (14), wherein the extraction unit extracts an on/off flag as the control information, the on/off flag indicating whether the in-screen motion prediction across the slices can be performed.

(16)
The image decoding device of (15), wherein the extraction unit extracts the on/off flag from one of a sequence parameter set (SPS) and a video parameter set (VPS).

(17)
The image decoding device of any of (12) through (16), wherein, when wavefront parallel processing (WPP) is "on", the extraction unit limits a range of the reference, and extracts the reference permission flag.

(18)
The image decoding device of any of (12) through (16), wherein, when tile dividing is "on", the extraction unit extracts the reference permission flag.

(19)
The image decoding device of any of (12) through (16), wherein, when temporal motion constrained tile set SEI (MCTS-SEI) is "on", the extraction unit extracts the reference permission flag set to "off".

(20) An image decoding method implemented by an image decoding device,
the image decoding method including:
receiving a bitstream generated by encoding an image;
extracting control information from the received bitstream, the control information being designed for controlling in-screen motion prediction across slices; and
decoding the received bitstream to generate an image, using the extracted control information.

REFERENCE SIGNS LIST

10 Encoding device
11 Setting unit
12 Encoding unit
13 Transmission unit
46 Intra prediction unit
110 Decoding device
111 Reception unit
112 Extraction unit
113 Decoding unit
143 Intra prediction unit

The invention claimed is:

1. An image encoding device, comprising:
a processor configured to:
execute intra block copy on a current coding tree unit (CTU) in a current slice based on a reference range, wherein
the reference range is limited to CTUs up to a CTU on an upper right side of the current CTU, and
the CTU is in an upper slice above the current slice;
generate a predicted block based on the execution of the intra block copy on the current CTU; and
encode the current CTU based on the predicted block to generate a bitstream.

2. The image encoding device according to claim 1, wherein
the processor is further configured to set a reference permission flag as control information,
the control information controls the intra block copy, and
the reference permission flag indicates a permission for reference to a result of decoding of the current slice and a previous slice in a raster scan order.

3. The image encoding device according to claim 2, wherein the processor is further configured to set the reference permission flag in a picture parameter set (PPS).

4. The image encoding device according to claim 2, wherein
the processor is further configured to set a parameter as the control information, and
the parameter indicates a number of previous slices having referable decoding results.

5. The image encoding device according to claim 2, wherein
the processor is further configured to set an on/off flag as the control information, and
the on/off flag indicates whether the intra block copy is executable across a plurality of slices.

6. The image encoding device according to claim 5, wherein the processor is further configured to set the on/off flag in one of a sequence parameter set (SPS) or a video parameter set (VPS).

7. The image encoding device according to claim 2, wherein the processor is further configured to:
determine that wavefront parallel processing (WPP) is "on"; and
limit the reference range and set the reference permission flag based on the determination that the wavefront parallel processing (WPP) is "on".

8. The image encoding device according to claim 2, wherein the processor is further configured to:
determine that a tile dividing process is "on"; and
set the reference permission flag based on the determination that the tile dividing process is "on".

9. The image encoding device according to claim 2, wherein the processor is further configured to:
determine that temporal motion constrained tile set SEI (MCTS-SEI) is "on"; and
set the reference permission flag to "off" based on the determination that the temporal motion constrained tile set SEI (MCTS-SEI) is "on".

10. The image encoding device according to claim 2, wherein the processor is further configured to:
determine that wavefront parallel processing (WPP) is "on"; and
set the control information to control the intra block copy in the reference range,
wherein the control information is set based on the determination that the wavefront parallel processing (WPP) is "on".

11. The image encoding device according to claim 2, wherein the reference range exists in slices.

12. An image encoding method, comprising:
in an image encoding device:
executing intra block copy on a current coding tree unit (CTU) in a current slice based on a reference range, wherein
the reference range is limited to CTUs up to a CTU on an upper right side of the current CTU, and
the CTU is in an upper slice above the current slice;
generating a predicted block based on the execution of the intra block copy on the current CTU; and
encoding the current CTU based on the predicted block to generate a bitstream.

13. An image encoding device, comprising:
a processor configured to:
set a parameter as control information, wherein
the control information controls intra block copy, and
the parameter indicates a number of previous slices having referable decoding results;
execute the intra block copy on a current coding tree unit (CTU) in a current slice based on the control information and a reference range, wherein
the reference range comprises a first CTU that is above the current CTU and in an upper slice of the current slice, and a second CTU that is an upper right CTU,
the upper right CTU is on an upper right side of the current CTU, and
the upper right CTU is in the upper slice of the current slice;
generate a predicted block based on the execution of the intra block copy on the current CTU; and
encode the current CTU based on the predicted block to generate a bitstream.

* * * * *